United States Patent [19]

Walker, Sr. et al.

[11] Patent Number: 5,063,775

[45] Date of Patent: Nov. 12, 1991

[54] METHOD AND SYSTEM FOR CONTROLLING A MECHANICAL PUMP TO MONITOR AND OPTIMIZE BOTH RESERVOIR AND EQUIPMENT PERFORMANCE

[76] Inventors: Frank J. Walker, Sr., 8340 Northeast 2nd Ave., Miami, Fla. 33138; Frank J. Walker, Jr., 5711 S. Utica Ave., Tulsa, Okla. 74105

[21] Appl. No.: 494,413

[22] Filed: Mar. 16, 1990

Related U.S. Application Data

[63] Continuation of Ser. No. 87,505, Aug. 19, 1987, abandoned, which is a continuation-in-part of Ser. No. 901,692, Aug. 29, 1986, now Re.

[51] Int. Cl.5 .................................................. G01F 1/28

[52] U.S. Cl. ..................................... 73/155; 73/861.75

[58] Field of Search ........... 73/861.53, 861.71, 861.75, 73/861.76, 155, 861.02, 861.03, 861.04, 199, DIG. 3

[56] References Cited

U.S. PATENT DOCUMENTS

| | | | |
|---|---|---|---|
| 335,213 | 2/1886 | Brown | 73/861.75 |
| 1,063,255 | 6/1913 | Hanks | 73/861.75 |
| 2,423,944 | 7/1947 | Moore | 166/2 |
| 2,550,093 | 4/1951 | Smith | 103/25 |
| 2,697,984 | 2/1954 | Pankratz | 417/43 |
| 2,707,440 | 5/1955 | Long et al. | 103/25 |
| 2,917,922 | 2/1955 | Morse | 73/861.71 |
| 2,989,866 | 6/1961 | Widell et al. | 73/861.53 |
| 3,021,684 | 2/1962 | Berck | 73/199 |
| 3,085,432 | 4/1963 | Bloom et al. | 73/861.75 |
| 3,091,179 | 5/1963 | Echols | 417/43 |
| 3,105,443 | 10/1963 | Johnson | 417/43 |
| 3,112,464 | 11/1963 | Ratajski | 73/DIG. 3 |
| 3,162,042 | 12/1964 | Hart | 73/155 |
| 3,219,107 | 11/1965 | Brown, Jr. et al. | 166/8 |
| 3,247,798 | 4/1966 | Glasgow et al. | 103/6 |
| 3,276,380 | 10/1966 | Stevenson | 103/25 |
| 3,453,962 | 7/1969 | Strader | 103/25 |
| 3,731,533 | 5/1973 | Geery | 73/231 R |
| 3,851,995 | 12/1974 | Mills | 4.7/12 |
| 3,854,846 | 12/1974 | Douglas | 417/12 |
| 3,857,277 | 12/1974 | Moore | 73/861.74 |
| 3,910,112 | 10/1975 | Gerlach | 73/861.53 |
| 3,930,752 | 1/1976 | Douglas | 417/12 |
| 3,936,231 | 2/1976 | Douglas | 417/12 |
| 3,938,910 | 2/1976 | Douglas | 417/12 |
| 3,953,819 | 4/1976 | Keerie et al. | 73/861.77 |
| 3,963,374 | 6/1976 | Sullivan | 417/12 |
| 3,965,983 | 6/1976 | Watson | 166/250 |
| 4,006,252 | 2/1977 | De Vale | 137/101.21 |
| 4,010,645 | 3/1977 | Herzl | 73/861.03 |
| 4,034,808 | 7/1977 | Patterson | 166/250 |
| 4,072,051 | 2/1978 | Peterson | 73/861.03 |
| 4,073,189 | 2/1978 | Draper | 73/861.76 |
| 4,118,148 | 10/1978 | Allen | 417/12 |
| 4,143,255 | 3/1979 | Herscovitz | 200/81.9 M |
| 4,171,185 | 10/1979 | Duke et al. | 417/12 |
| 4,180,374 | 12/1979 | Bristow | 417/12 |
| 4,275,291 | 6/1981 | Feller | 73/861.77 |
| 4,302,157 | 11/1981 | Welton et al. | 417/12 |

(List continued on next page.)

FOREIGN PATENT DOCUMENTS

| | | | |
|---|---|---|---|
| 2309872 | 11/1976 | France | 73/DIG. 3 |

*Primary Examiner*—Herbert Goldstein

*Attorney, Agent, or Firm*—Mason, Fenwick & Lawrence

[57] ABSTRACT

Method and apparatus for optimizing the overall production efficiency of any pumping well based on accurate measurements of the time-averaged rate that fluid exists the wellhead. The improved apparatus includes temperature compensated, hermetically sealed electronic sensors that accurately measure the instantaneous rate of both pulsating and steady-state flow, and devices for processing measured flow-rate information to ascertain the performance of downhole equipment and fluid reservoirs. The apparatus is self-calibrating on any well, and automatically compensates for normal changes in both downhole equipment and reservoir performances that typically limit the operation of conventional well-control devices. The apparatus may be easily installed at ground level without major changes to existing well-head equipment, and readily adapts to the efficient control of pumping equipment utilized with any other type of fluid reservoir.

18 Claims, 14 Drawing Sheets

U.S. PATENT DOCUMENTS

| | | | |
|---|---|---|---|
| 4,309,909 | 1/1982 | Grebe, Jr. et al. | 73/861.77 |
| 4,311,438 | 11/1982 | Comstedt | 417/12 |
| 4,318,674 | 3/1982 | Godbeg et al. | 417/36 |
| 4,329,120 | 5/1982 | Walters | 417/12 |
| 4,413,676 | 11/1983 | Kervin | 166/53 |
| 4,473,338 | 9/1984 | Garmong | 417/12 |
| 4,480,960 | 11/1984 | Streib | 417/12 |
| 4,502,325 | 3/1985 | Klomp | 73/861.02 |
| 4,569,233 | 2/1986 | Rosaen | 73/861.71 |
| 4,628,743 | 12/1986 | Miller, Jr., et al. | 73/861.95 |
| 7,918,843 | 11/1975 | Douglas et al. | 417/12 |

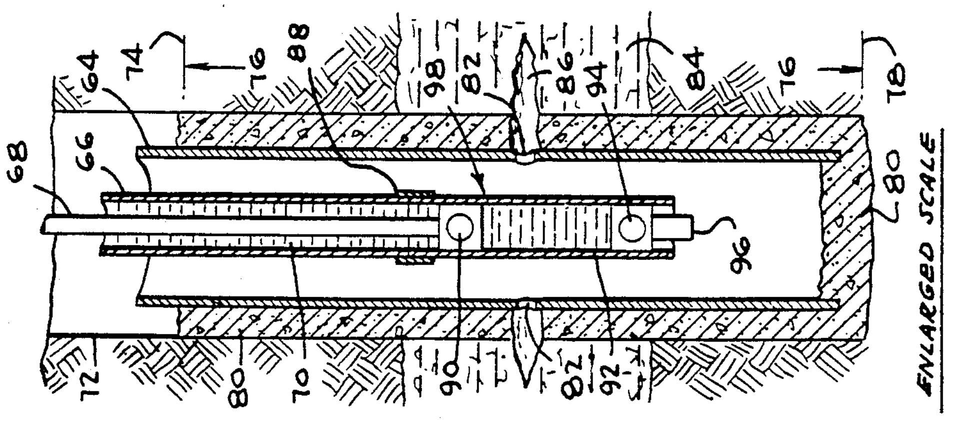
FIG-1-B
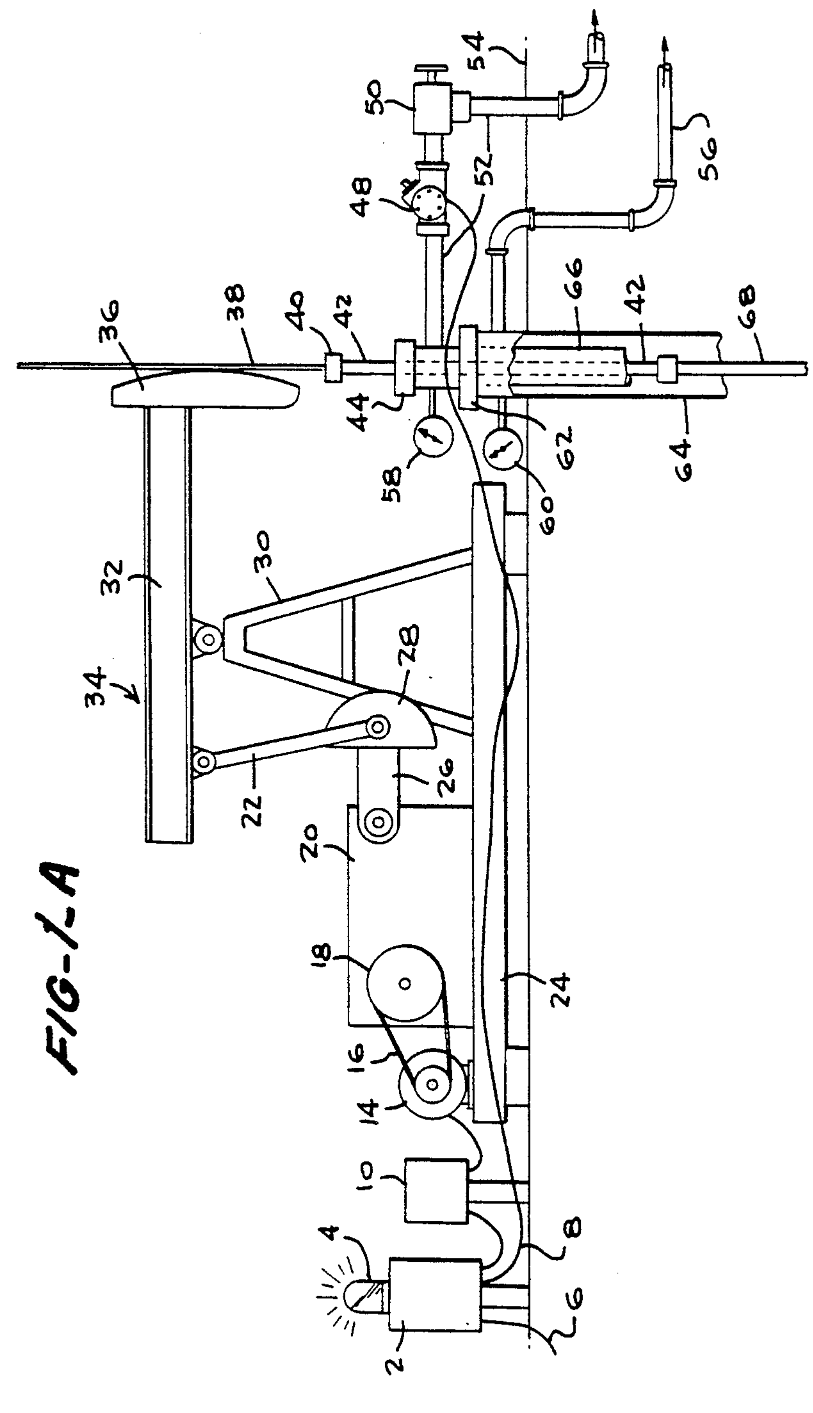
FIG-1-A

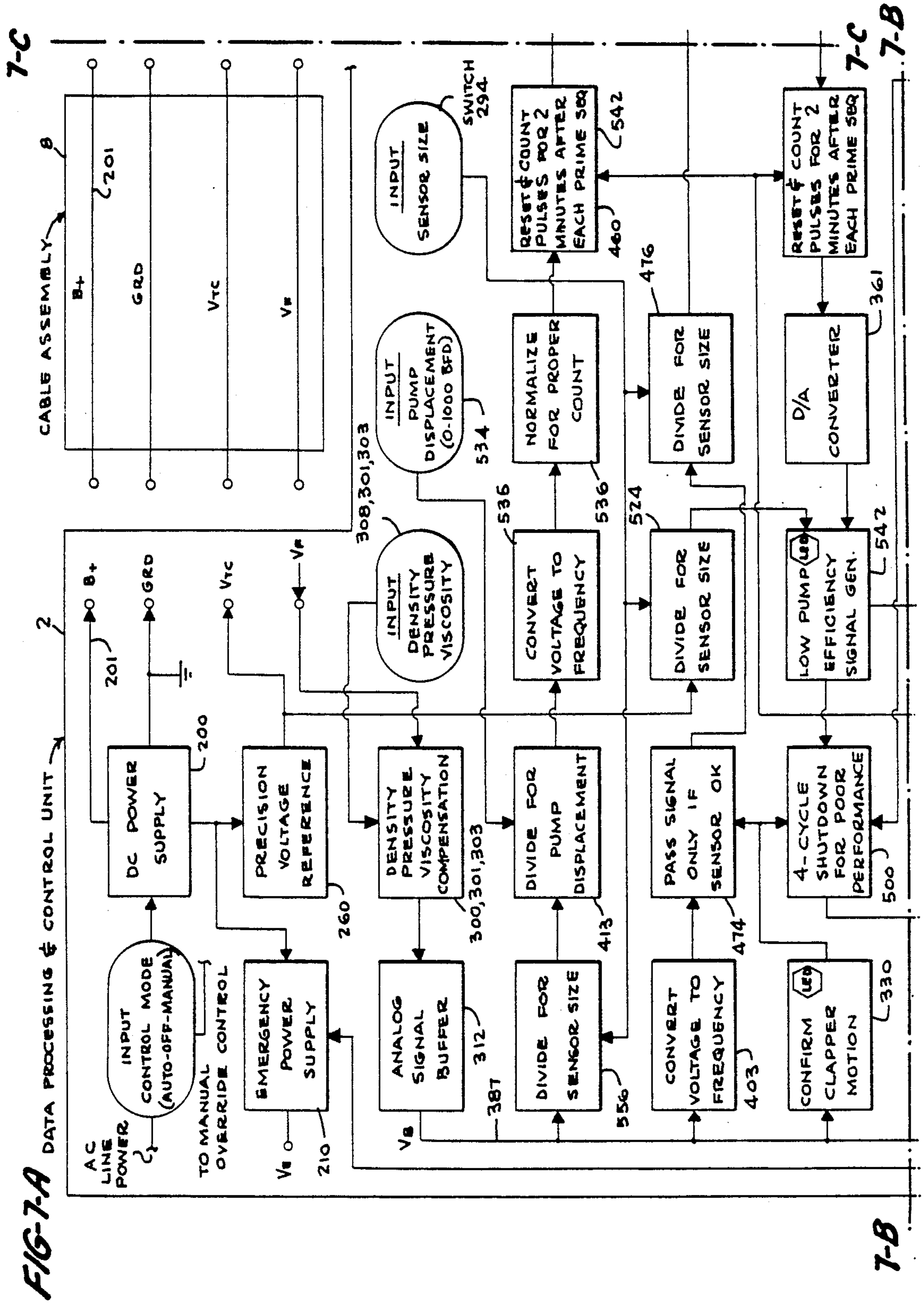
FIG-7-A
7-C
7-B
CABLE ASSEMBLY
8
201
B+
GRD
VTC
VF
DATA PROCESSING & CONTROL UNIT
2
AC LINE POWER
INPUT CONTROL MODE (AUTO-OFF-MANUAL)
TO MANUAL OVERRIDE CONTROL
DC POWER SUPPLY
200
EMERGENCY POWER SUPPLY
210
VB
PRECISION VOLTAGE REFERENCE
260
INPUT DENSITY PRESSURE VISCOSITY
308,301,303
DENSITY PRESSURE VISCOSITY COMPENSATION
300,301,303
ANALOG SIGNAL BUFFER
312
387
INPUT PUMP DISPLACEMENT (0-1000 BFD)
534
CONVERT VOLTAGE TO FREQUENCY
535
DIVIDE FOR PUMP DISPLACEMENT
413
DIVIDE FOR SENSOR SIZE
556
NORMALIZE FOR PROPER COUNT
536
INPUT SENSOR SIZE
SWITCH 294
RESET & COUNT PULSES FOR 2 MINUTES AFTER EACH PRIME SEQ
542
460
DIVIDE FOR SENSOR SIZE
476
524
PASS SIGNAL ONLY IF SENSOR OK
474
CONVERT VOLTAGE TO FREQUENCY
403
D/A CONVERTER
361
LOW PUMP EFFICIENCY SIGNAL GEN.
542
4-CYCLE SHUTDOWN FOR POOR PERFORMANCE
500
CONFIRM CLAPPER MOTION
330

FIG-7-B
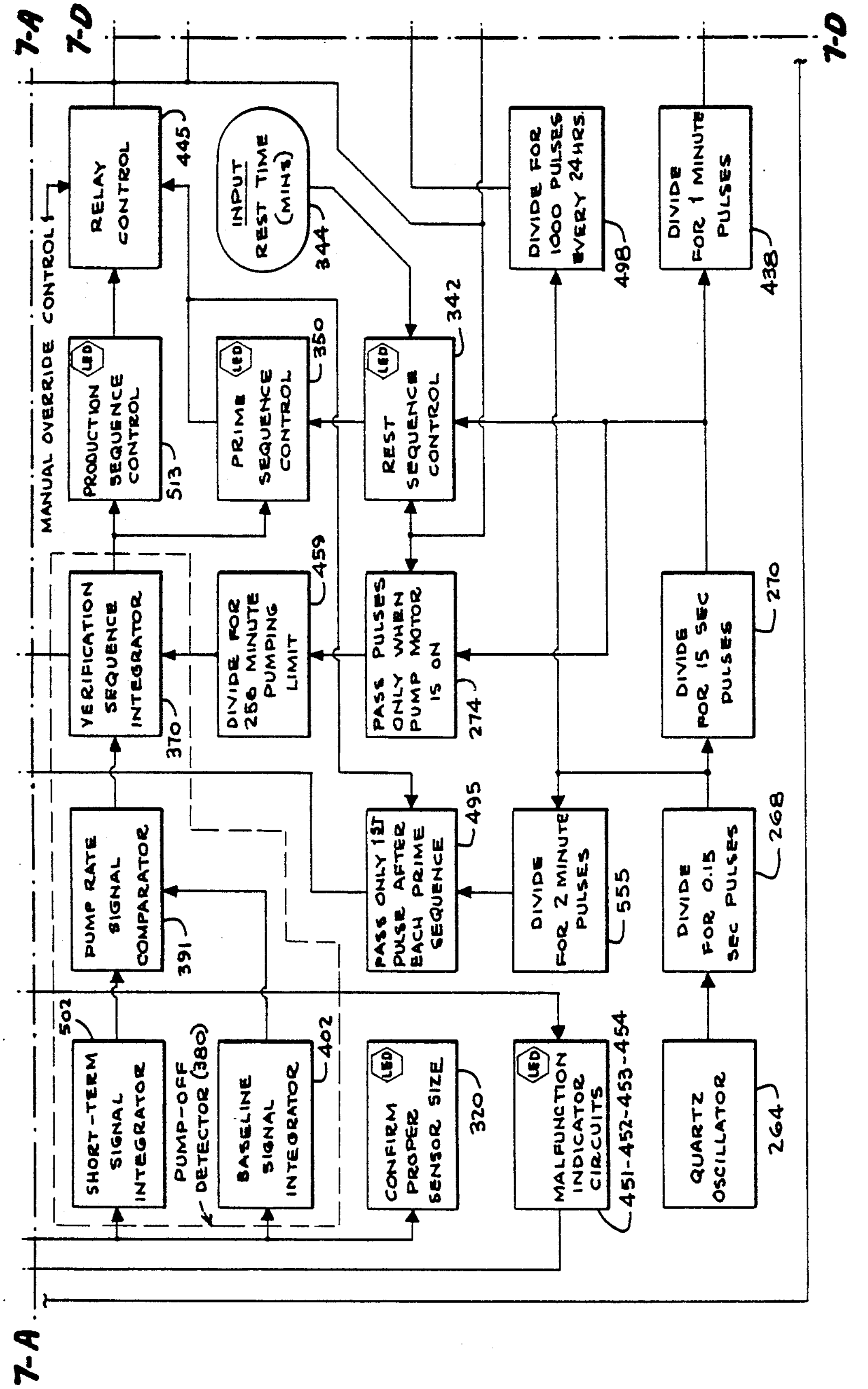

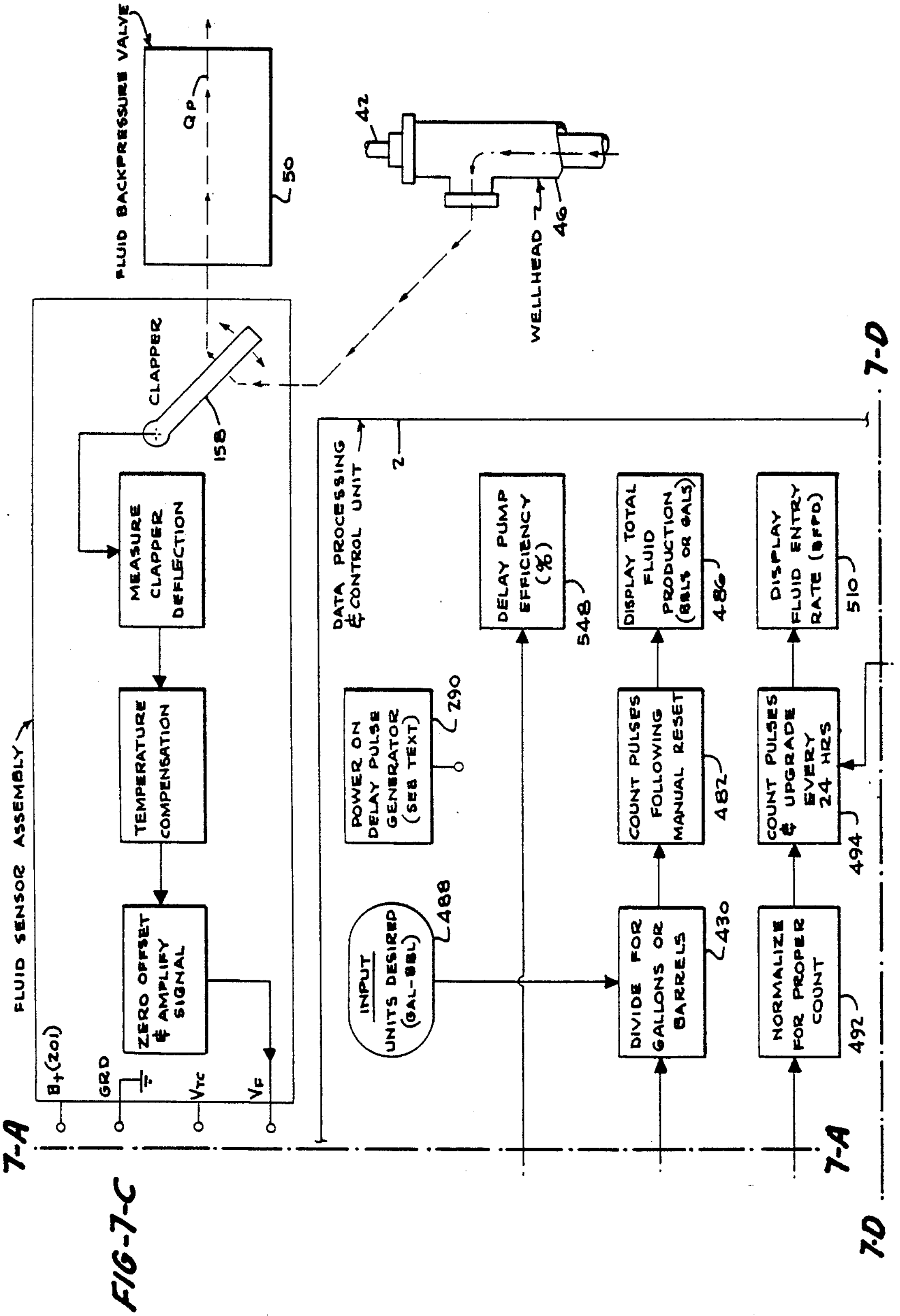
FIG-7-C

FIG-7-D
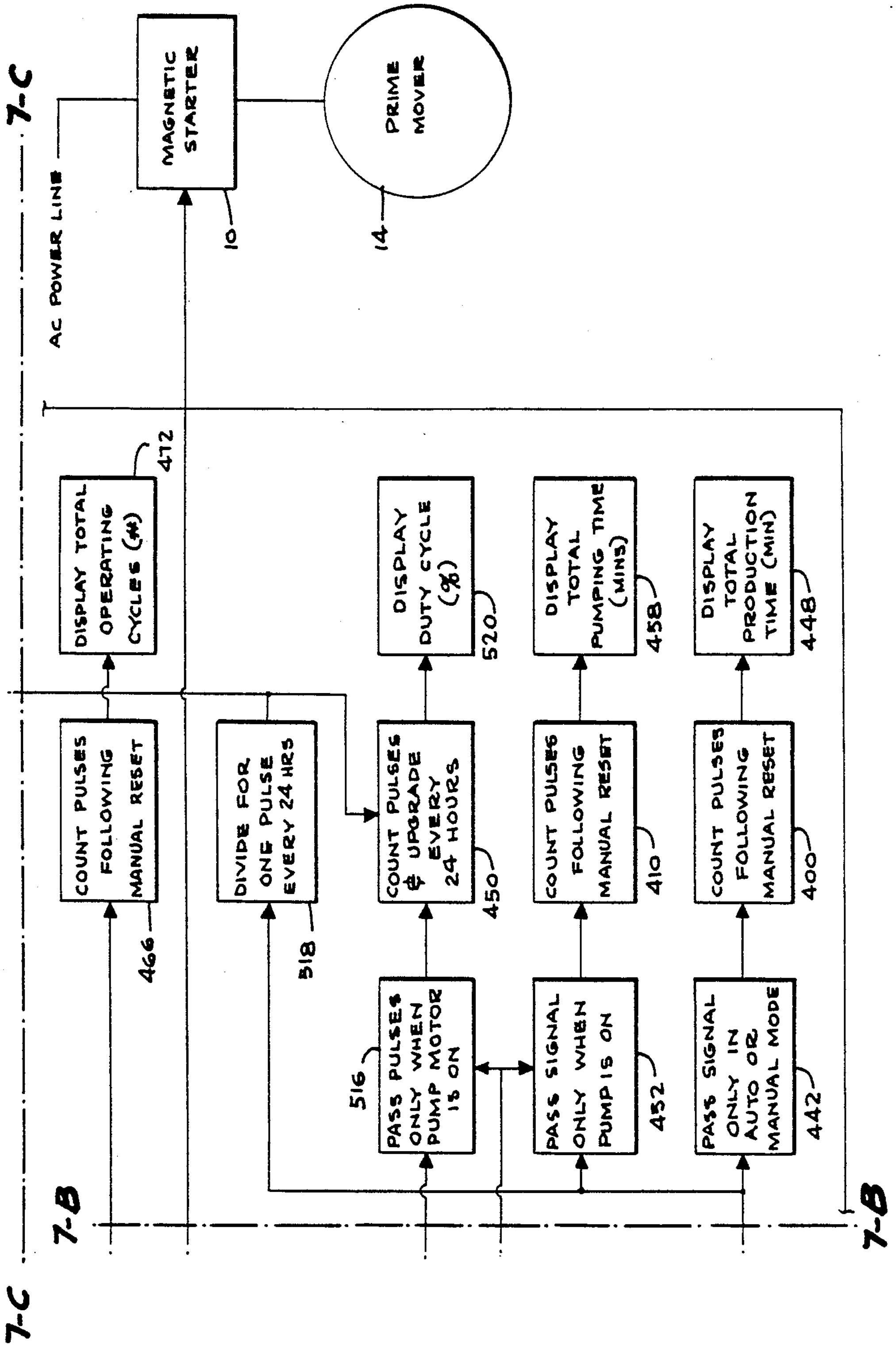

FIG-8-A
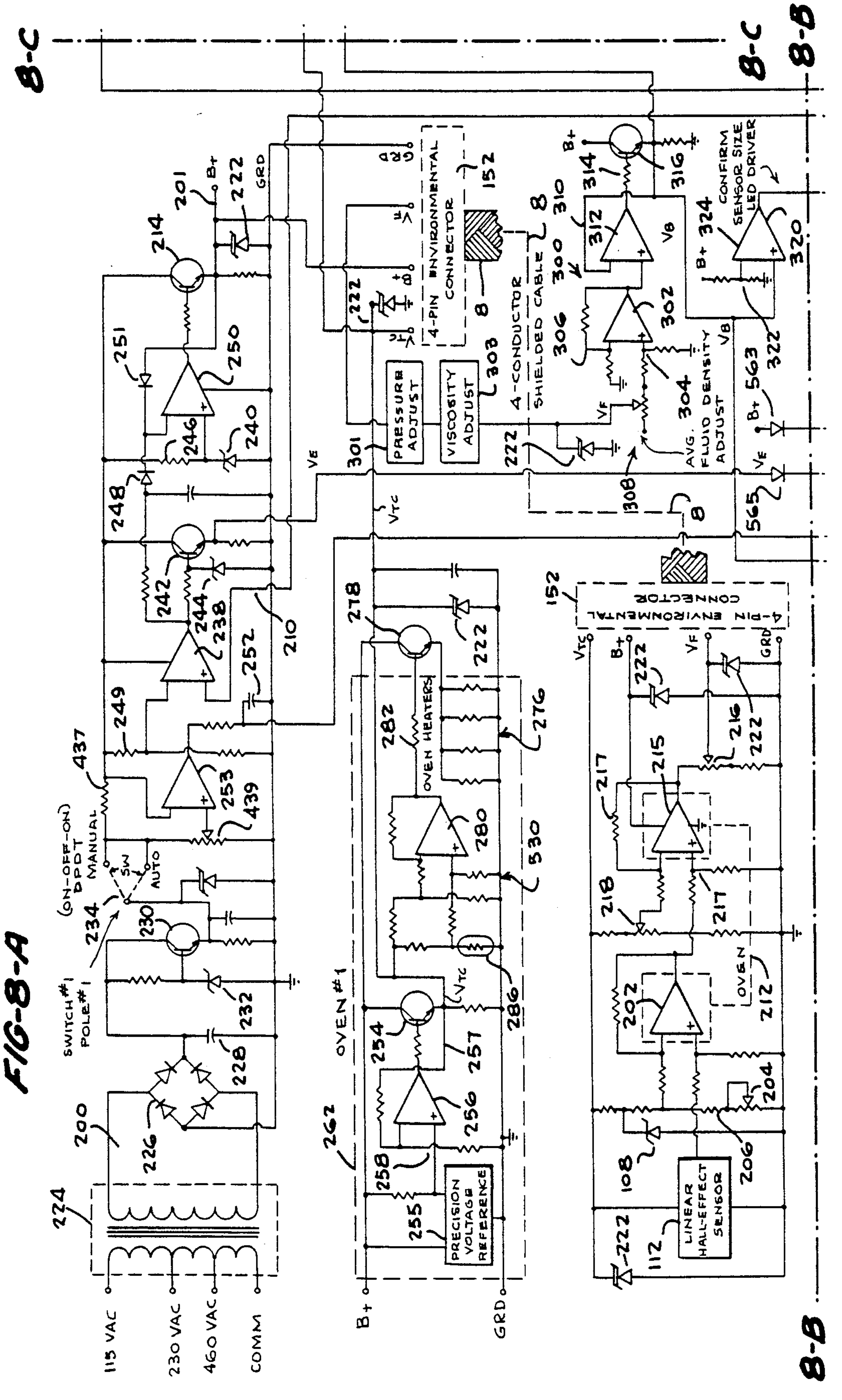

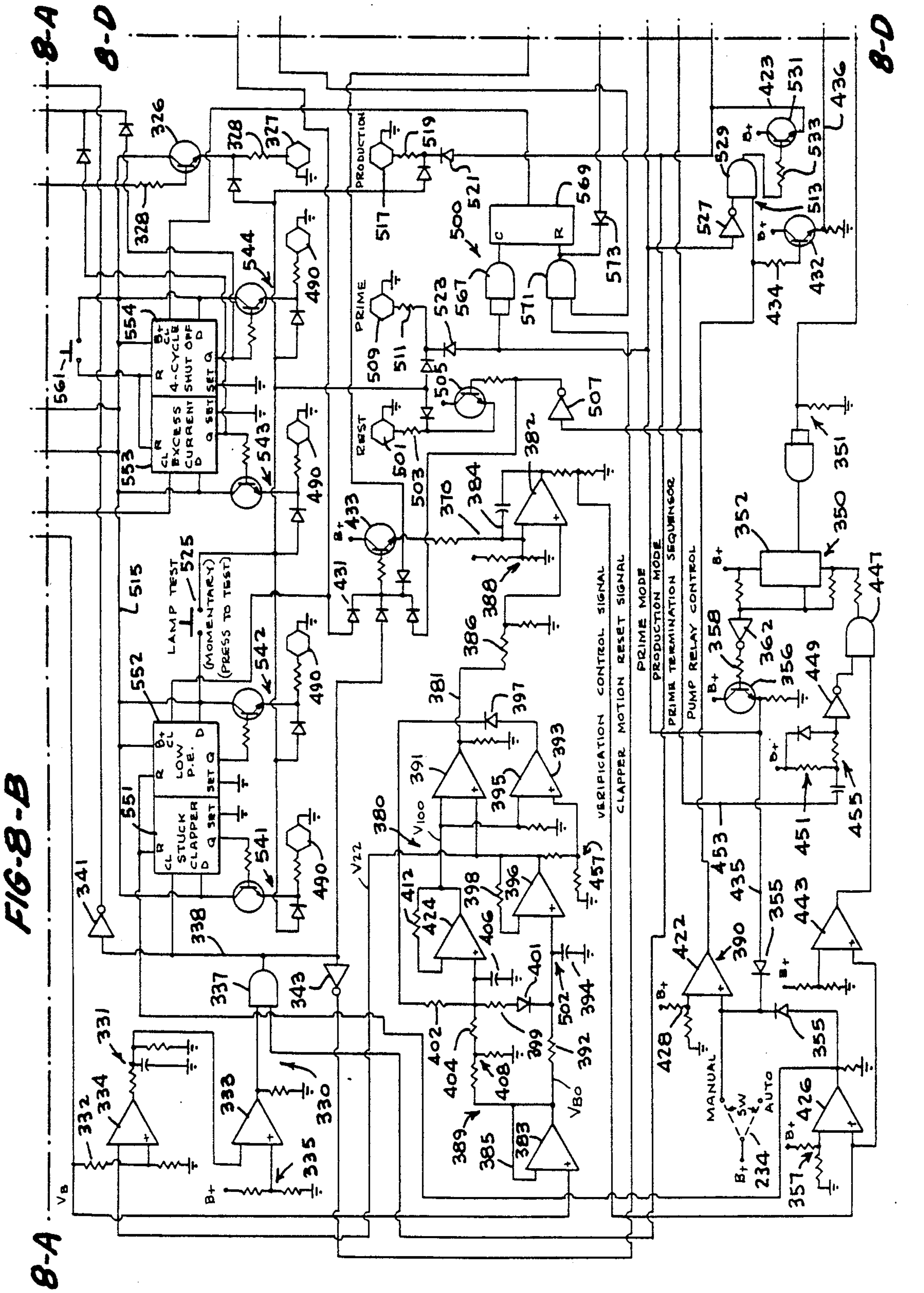
FIG-8-B

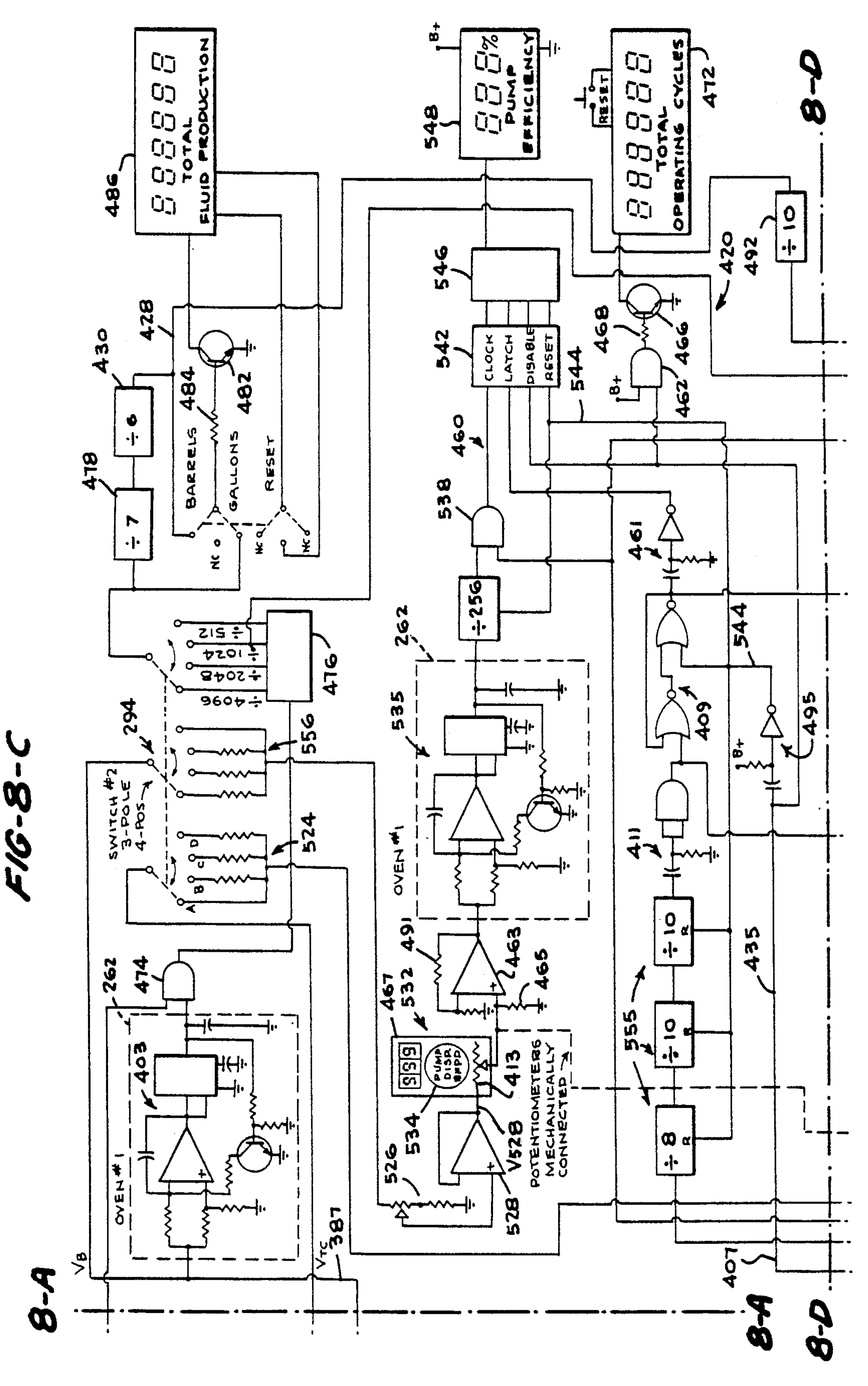
FIG-8-C

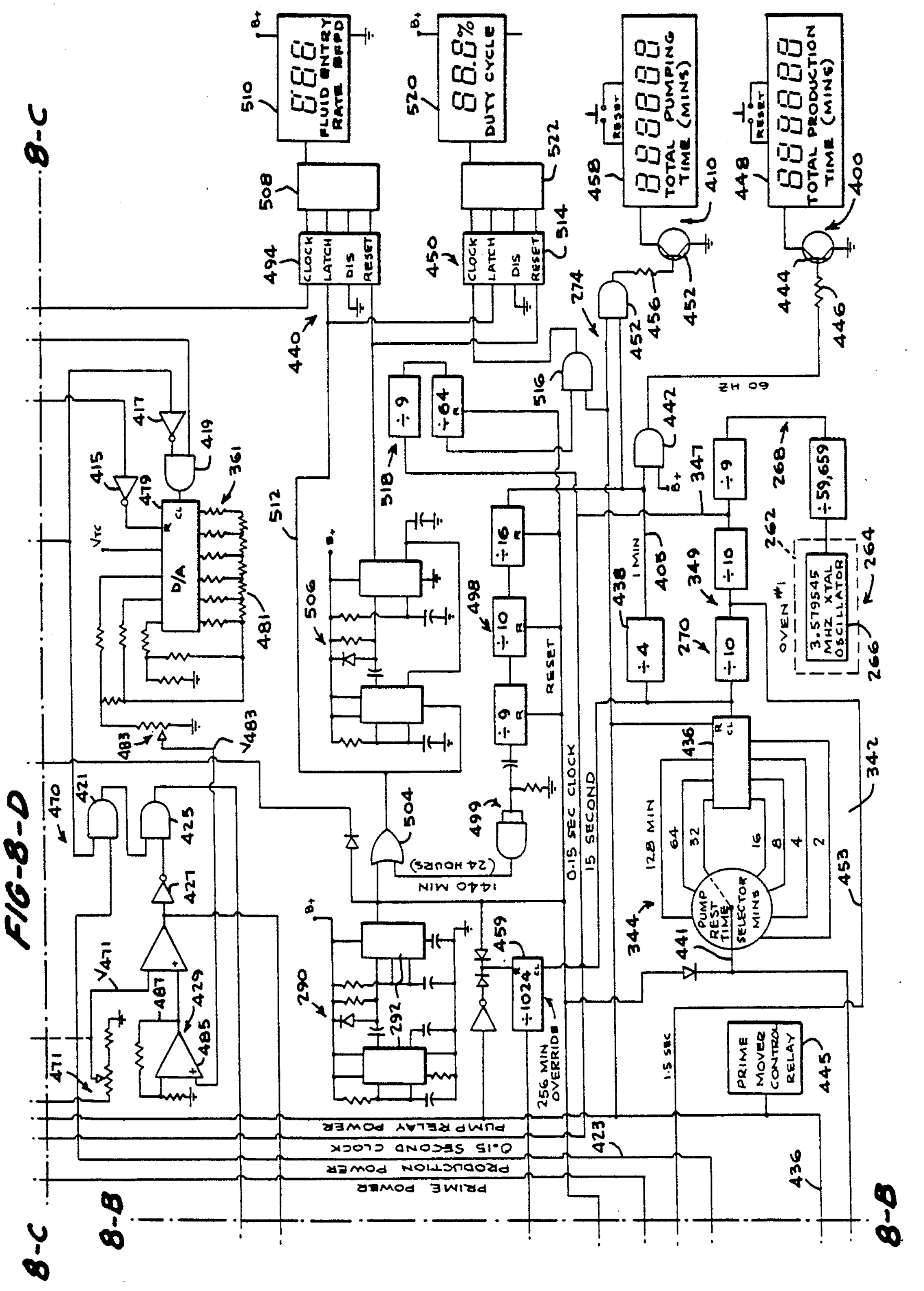
FIG-8-D

METHOD AND SYSTEM FOR CONTROLLING A MECHANICAL PUMP TO MONITOR AND OPTIMIZE BOTH RESERVOIR AND EQUIPMENT PERFORMANCE

This application is a continuation of application U.S. Ser. No. 087,505, filed Aug. 19, 1987, now abandoned, which is a continuation-in-part of U.S. Ser. No. 901,692, filed Aug. 29, 1986, now abandoned.

FIELD OF THE INVENTION

The invention relates generally to the control of mechanical pumps used to transfer liquids from any fluid reservoir, and more particularly toward methods and systems for optimizing the overall production efficiency of any pumping well, based upon accurate measurement of the time-averaged rate that incompressible liquids exit the pump discharge. The invention also relates to the design of electromechanical sensors that accurately measure the instantaneous rate of both pulsating and steady-state fluid flow, and to methods and apparatus for processing measured flow-rate information to detect liquid "pump-off" and to ascertain the performance of both pumping equipment and fluid reservoir. Such information may be utilized to identify production degradation, and to solicit servicing of the reservoir and equipment as required to maintain optimum production efficiency.

BACKGROUND OF THE INVENTION

Since the first commercial oil well was drilled in Pennsylvania by Colonel Drake in 1859, more than two million wells have been completed in the United States for the production of crude oil and natural gas. While most of these wells have now been abandoned, American Petroleum Institute records currently indicate that by the end of 1985 there were approximately 880,000 producing hydrocarbon wells still operating within the territorial limits of our nation. Unfortunately, most of these wells are now marginal producers due to their natural production decline, and will soon be abandoned as they become unprofitable to operate. Thus, to satisfy its increasing demand for energy, America has no choice but to locate and develop additional petroleum reserves each year. Since most readily accessible reserves have previously been developed, however, new production can now only be obtained at great risk and expense to the operator. This same general trend of declining production and escalating expense prevails throughout the free-world today.

With these facts in mind, the importance of obtaining maximum production efficiency from every available well site becomes increasingly more apparent with the passage of time. Since hydrocarbons are essentially a non-renewable resource, the world's total supply of available energy is greatly dependent upon the operator's ability to establish and maintain a positive income stream from each existing well site. Once a well has been completed, its economic life will thereafter be determined by its ability to produce hydrocarbons at a profit. When operating expenses exceed production revenues, most wells will be plugged and abandoned even though they are perfectly capable of producing additional reserves under pump. By increasing the efficiency of such pumping operations, the commercial life of a typical well can usually be extended for many years to economically extract additional reserves from the ground. In many situations the additional reserves that may be obtained by optimization of the pumping process will comprise a substantial share of the ultimate production potential of a well. Such optimization is especially important for stripper wells that, by definition, produce less than 10 barrels of oil per day, since the expense of operating such wells typically offsets a substantial share of the resulting production revenue.

Most wells are currently drilled by high-speed rotary methods that utilize special drilling fluids to lubricate and cool the drill bit, circulate cuttings out of the hole and control naturally occurring formation pressures. During the course of drilling, one or more tests are typically conducted to measure the fluid content, pressure, temperature and/or productivity of each zone of interest. Open hole logs and drill-stem tests are frequently run, and cores may be taken of some intervals, to determine matrix composition, porosity, permeability and hydrocarbon saturation.

Once a well has been drilled and tested, the well-bore is typically lined with one or more strings of heavy steel casing to prevent the hole from collapsing under pressure. A section of casing is then cemented in place by pumping a high-strength cement slurry down its interior and circulating it back towards the surface through cementing ports to fill a portion of the annulus between the well-bore and the liner. Various known methods, including cementing packers and staged cementing, are frequently used to keep the cementing materials from contacting and infiltrating the most productive reservoirs. By completing a well in this manner, the casing and cement also serve to shut-off the flow of unwanted water into the well from porous formations that lie above or below the productive zones of interest.

After the well has been cased and cemented, the liner is perforated at selected locations to allow for the entry of desired formation fluids. This operation is typically accomplished by means of explosive charges. Abrasive jets of pressurized sand and liquid are sometimes used to establish communication with the formation, and open-hole completion techniques eliminate the need for such operations by keeping both casing and cement away from the formation altogether.

Following perforation of the casing, artificial stimulation of each productive interval is typically required to enhance the rate of fluid entry into the well-bore. If the formation is composed of sandstone, stimulation is usually accomplished by pumping large volumes of viscous fluids into the reservoir under pressure to hydraulically fracture the formation matrix. Such an operation typically creates a large vertical fracture that extends outward from the casing, although in some situations this fracture will be horizontal, depending on the weight of overburden. To prevent the flow channel from closing once the treating pressure has been removed, a propant (usually coarse sand or spherical ceramic balls) is pumped into the formation during this process to hold the fractured formation walls apart. Limestone formations, unlike sandstone, are typically stimulated by pumping large volumes of acid into the matrix under pressure to create a maze of permeable flow channels that extend outwardly from the casing for a considerable distance into the formation.

Once artificially stimulated, a well is ready to be completed into a tank or pipeline. This is done by equipping the well with the necessary downhole and surface equipment for the removal of formation liquids from the casing. Although many wells have sufficient reservoir pressure to flow naturally to the surface, most require the use of a downhole pump to mechanically lift both water and oil above ground. Several basic types of pumps are employed for this purpose, including positive displacement reciprocating pumps, electrically operated downhole submersible pumps, rotary screw pumps, and gas or hydraulically operated plunger lift or jet velocity systems. Because conventional surface mounted pumping units are of simple and rugged design, most wells are currently equipped with this type of equipment that converts the rotating motion of an electric motor or gas/diesel engine into a reciprocating up and down motion. This motion is used to activate a piston pump that is located downhole near the end of a string of production tubing. The downhole piston pump typically has a single acting ball check valve known as the "standing valve" located within the lower inlet side of a polished steel or brass cylinder called the "barrel". Contained within the upper portion of this barrel is a moving check valve known as the "traveling valve", which is actuated from the surface by a string of "sucker rods" that connect the valve to the pumping unit. To prevent fluid from leaking back to its suction side, the traveling valve is often equipped with a plurality of "valve cups" which seal the clearance between the traveling valve and the working barrel. These cups are made out of nylon, leather or other pliable composition materials, and require periodic replacement together with the polished balls and seats when they become worn or corroded. Metal-to-metal piston pumps operate essentially the same, but do not make use of valve cups; instead, they rely on a very small clearance between the polished metal plunger and cylinder to restrict the bypass of liquid.

A second type of downhole pump which is currently used on a small percentage of U.S. and foreign wells is the "electric submersible pump". This pump consists of a multistage centrifugal pump assembly in combination with a high-efficiency electric motor that is attached to the end of the string of production tubing. The only surface equipment required for this type of installation is a motor control panel that regulates power applied to the downhole motor by means of electric wires that are run downhole with the tubing string and pump. These pumps are used for high volume applications, and are quite expensive to install and operate. In such installations all downhole electric equipment is cooled by the fluids that are pumped.

Gas and hydraulic plunger lift systems require the use of high-pressure pumping equipment located above ground, and a free traveling plunger located within the tubing string that is periodically pumped to the surface to purge the tubing of formation liquids. Once the plunger reaches the wellhead, it is then allowed to freefall back to bottom in preparation for the next operating cycle. Rotary screw pumps, on the other hand, utilize the rotating motion of an aboveground motor that drives the sucker rod string to turn a polished steel mandrel within a rubber stator fixed to the bottom of the tubing. This rotary screw motion "squeezes" liquid to the surface, and is quite efficient when used at depths of less than 2000 feet. Other pumping means utilize the lifting action of a high-velocity stream of pressurized gas or liquid injected into the tubing at formation depth to cause fluid to flow continuously to the surface by means of a pressure or density gradient.

Turning now to the dynamics of well performance, it is important to realize that a producing well is essentially a low pressure region that has been artificially introduced into a naturally occurring geologic reservoir for the purpose of removing resident formation fluids such as water, oil and natural gas. By maintaining the well-bore at a hydrostatic pressure lower than the prevailing reservoir pressure, formation fluids will continuously flow into the bore hole at a rate that is essentially proportional to the established pressure differential between formation and casing. For production to be sustained, casing fluids must be continually removed and transported to either surface tanks or pipelines by natural or artificial means to prevent the bore hole pressure from returning to equilibrium with the reservoir.

Initially, many wells have sufficient bottom hole pressure to flow naturally to the surface without the assistance of mechanical pumping means; these wells are said to exhibit "artesian flow". As reservoir pressures become depleted with time, however, all wells eventually require mechanical pumping means to lift formation liquids to the surface. Since the reciprocating piston pump is the type of equipment most commonly used for this purpose, the discussion that follows is primarily directed towards those applications that make use of this class of hardware. The ensuing comments should be considered generic in nature unless otherwise stated, however, since the same operating characteristics and problem areas will typically be observed with any other type of mechanical pumping equipment.

Most wells produce a combination of water, oil and natural gas, together with a small amount of solid particular contaminants that are transported into the well-bore by the stream of flowing fluids. Such materials will only flow into the casing when the hydrostatic pressure of liquid and gas contained there is reduced below the naturally occurring or artificially enhanced formation pressure. For the purpose of this discussion it will be assumed that all transported solid contaminants remain in suspension within the column of produced liquids, and that the total volume of such contaminants is small relative to the total volume of flowing liquids. It will also be assumed that this mixture of solids and liquids behaves exactly the same as a column of pure water and oil, from a fluid mechanics standpoint, and that all completed zones are commingled and serviced by a common downhole pump.

Whenever a well is completed to simultaneously produce from more than one production interval, the total rate of fluid entry into the casing is governed by the individual rates of fluid entry from each completed reservoir. From a theoretical standpoint, the instantaneous rate of fluid entry into the casing from any one reservoir is a function of many variables such as formation pressure "$P_f$", casing pressure "$P_c$", reservoir permeability "H", fluid viscosity "V" and flowing surface area "A" of the stimulated formation. For compressible fluids such as natural gas ad condensate, the equation which relates these variables to describe the daily fluid entry rate can be quite complicated depending on the actual pressures and temperatures involved. For relatively incompressible liquids such as water and oil, however, the combined fluid entry rate "$Q_F$" of both liquids may be described with reasonable accuracy over a wide range of operating conditions by the following mathematical expression that is derived from the Darcey Equation for laminar flow:

$$Q_F=(kA)(H/V)(P_f-P_c) \quad (1)$$

Since the total instantaneous rate of incompressible fluid entry from any one reservoir is equal to the combined entry rates of water and oil, the correct fluid production factor (H/V) to use in this equation is a function of the absolute viscosities and relative permeabilities of both water and oil contained within the formation. This factor depends on the current saturation level of each liquid, and may be expressed mathematically as $(H/V)=(H/V)_w+(H/V)_o$. Although the actual value of (H/V) will change slowly with time as fluid is extracted from the reservoir, its prevailing magnitude is essentially constant at any particular time regardless of the pressure drive established between formation and casing. Likewise, the constant "k" depends only on the units of flow desired, such as gallons per minute (GPM) or barrels of fluid per day (BFPD), and the constant "A" depends only on the naturally occurring reservoir porosity and stimulation techniques utilized. Thus, once a reservoir has been completed, the only factor in equation (1) over which the operator has any day-to-day control is the pressure drive ($P_f-P_c$). Since the remaining factors (kA)(H/V) are essentially constant and independent of pressure drive, on a daily basis, equation (1) may be rewritten as follows:

$$Q_F=(K)^*(P_f-P_c) \quad (2)$$

When a well is first drilled, its naturally occurring reservoir pressure is typically on the order of 350 psi to 450 psi for every 1000 feet of depth below ground level, although significantly greater pressure gradients may frequently be encountered. If several productive zones are encountered, each zone usually has its own reservoir pressure which depends only on the depth and content of that particular formation. During the initial period of "Primary Recovery", the natural pressure of each producing interval declines exponentially with time as fluids are extracted by the natural pressure drive ($P_f-P_c$). This means that the fluid entry rate "$Q_F$" into the casing from each zone also declines exponentially with time. Following the natural depletion of any reservoir, its remaining formation pressure may then be artificially enhanced by the introduction of repressuring agents such as water, carbon dioxide or nitrogen to allow for the continued production of hydrocarbons during a period of "Secondary Recovery".

From the above discussion it should be obvious that the total rate of fluid entry into a well is equal to the summation of the individual fluid entry rates "$Q_F$" from each zone completed. Although each formation may have its own reservoir pressure "$P_f$", production factor (H/V) and flowing surface area "A", their individual fluid entry rates are all governed by the same basic equation (1) presented above. This equation indicates that the total fluid production rate "$Q_F$" obtained from each producing interval is proportional to the pressure drive ($P_f-P_c$) established across that formation. Thus, to achieve the greatest total rate of fluid entry into the casing for any given set of reservoir conditions, it is only necessary to reduce the hydrostatic pressure within the casing to the lowest value possible. This may be accomplished by pumping all of the liquid from the casing, and by keeping the casing gas pressure as low as possible.

It is important to note that the casing pressure "$P_c$" which affects fluid entry rate "$Q_F$" is equal to the arithmetic sum of the casing gas pressure at wellhead plus the hydrostatic pressure of contained liquids at formation depth. Since casing gas is either vented to atmosphere or delivered into the pipeline, the required wellhead gas pressure is usually fixed by marketing considerations over which the operator has very little control. Thus, by removing all liquids from the casing, the greatest production is achieved for any specified gas delivery pressure. Whenever water and oil are allowed to accumulate above the productive interval, the actual rate of fluid entry into the casing is less than optimum since the pressure drive ($P_f-P_c$) is reduced by the combined hydrostatic head of these liquids. Since the ratio of oil and gas production to total fluid production (i.e. "oil cut" and "gas/oil ratio") remains essentially constant, the total daily production of hydrocarbons will also be less than optimum whenever liquids are allowed to accumulate within the casing.

Except in instances of an artesian well, the maximum rate that fluid can be removed from the casing is controlled by the capacity of the pumping equipment installed. This capacity "$Q_p$" may be computed as the theoretical displacement of the downhole pump multiplied by the overall volumetric efficiency of all associated downhole equipment. Thus, if a particular downhole pump has a displacement of 200 BFPD, and if it operates at 80% volumetric efficiency as observed on the surface, then its actual pumping rate "$Q_p$" into the tank or pipeline will be 160 BFPD. This rate is the combined pumping rate for all incompressible fluids being transported, and assumes that a full head of liquid is available to the suction inlet on each successive stroke or revolution of the pump. The actual pumping capacity of any centrifugal, rotary screw or piston pump may be computed as follows:

$$Q_p=(\text{Displacement})^*(\text{Volumetric Efficiency}) \quad (3)$$

For purposes of this discussion, the physical displacement of any mechanical pump installation is considered to be a function only of its geometry and speed of operation, and is not dependent on such factors as rod stretch or internal fluid leakage. These inefficiencies, together with all other factors which affect the net production efficiency of a well, are conveniently grouped together and accounted for under the general heading of "overall volumetric efficiency". This efficiency is defined as "The ratio of actual fluid delivery rate to the surface, divided by the theoretical volumetric displacement of the downhole pump", and has nothing to do with the overall thermodynamic efficiency of surface equipment from a mechanical or electrical standpoint.

Whenever fluid is sucked into a downhole pump, its volumetric efficiency is first reduced by the effects of viscosity, friction and inertia that combine to restrict the entry of fluid into the suction chamber. Typically this "suction efficiency" is near 100% for mechanical pumps operating at slow pumping speeds, and decreases as the pumping speed is increased. As the fluid level within the casing is lowered, suction efficiency continuously declines since there is progressively less hydrostatic pressure at the pump inlet to drive liquid past the standing valve and into the pumping chamber. This decline typically is on the order of a few percentage points, and is essentially linear with time. When all stored water is finally depleted from within the casing, the suction efficiency will further decline by a few additional percentage points as the pump begins to ingest the pad of high viscosity oil that floats on top of the water. This last change is rather abrupt since the water/oil interface within the casing is quite well defined. The importance of these two slight but perceptible changes in the overall volumetric efficiency of downhole pumping equipment will be more fully described hereinafter.

Once in the chamber of a piston pump, liquid must first pass through the traveling valve on its downstroke before it can be lifted towards the surface on the following upstroke. During this fluid charging period, the hydrostatic pressure of liquids within the tubing string will be supported by the standing valve, which typically leaks some fluid back into the casing due to an imperfect seal between its ball and seat. Throughout the following upstroke, the weight of liquid transfers to the traveling valve, and some fluid will then leak past the cups or metal plunger and the seated traveling ball to return to the suction side of the valve. Rod stretch reduces piston travel to less than the input stroke of surface equipment, and small leaks in the tubing joints allow pressurized liquid to return to the casing rather than being pumped to the surface. All told, the combination of these various factors work together to reduce the overall volumetric efficiency of all downhole pumping equipment below the theoretical limit of 100%.

Based on the above definition of volumetric efficiency, the theoretical capacity of any reciprocating piston pump may be readily calculated since its mechanical displacement then becomes a simple function of pump diameter, stroke and frequency of operation. Initially, the volumetric efficiency of this type of equipment is typically on the order of 80–95% depending on the particular application and equipment configuration involved. With time, this efficiency declines significantly as the various mechanical components wear with use. At times, this degradation can be quite rapid due to the effect of sand or other contaminants flowing through the pump, and sucker rod failure or large tubing leaks will usually result in the immediate cessation of fluid being transported to the surface. The continuous operation of such equipment without a full head of liquid available to its inlet also causes a rapid degradation of performance since the metal plunger or traveling valve cups are then not properly lubricated. Most of these same factors also affect the performance of centrifugal or rotary screw pumps, which have a theoretical capacity that is similarly determined by their physical geometry and speed of operation. Because of these considerations, the actual volumetric efficiency of a downhole pump is rarely known with any degree of accuracy once such equipment has been operated for any length of time It is a common misconception that a downhole piston pump will only move fluid to the surface on the upstroke. This assumption is not always correct, as confirmed by strip-chart recordings (made with the assistance of the herein disclosed invention) of the instantaneous fluid exit rates from many pumping wells that have ranged in depth from 600 to 7600 feet. It is of particular interest to note that this erroneous assumption actually provided the design basis for some prior art motor control devices that reportedly operate based upon the detection of fluid "pump-off"

In order to understand why a piston pump can displace fluid to the surface on both the upstroke and the downstroke, it is only necessary to study the geometry of the working barrel and tubing string when the polish rod, sucker rods and traveling valve are at their maximum and minimum vertical limits of travel. It will first be noted that when the polish rod is at the upper limit of its stroke, there exists within the working barrel a volume of liquid that will soon be displaced through the traveling valve as it makes its downward stroke. Assuming that the well is not "pumped-off", this volume of fluid is very nearly equal to the cross-sectional area of the working barrel multiplied by the length of the pumping stroke. Once on top of the traveling valve, however, this same volume of liquid must occupy a greater height within the working barrel since the cylinder volume above this valve is now reduced by the volume of the sucker rods which actuate said valve. The net effect of this change in geometry is that fluid is usually displaced upward within the tubing string by the downstroke of the traveling valve.

With regard to the capacity of the tubing string in the vicinity of the wellhead, it can be seen that at the top of the upstroke there exists a section of tubing whose liquid volume may be calculated as the volume of tubing less the volume of sucker rods based upon their respective cross sectional areas multiplied by the length of the pumping stroke. On the downstroke, the volume of sucker rods within this upper section of tubing is replaced by the greater volume of the polish rod, which typically has a larger diameter than the rod string. Thus, on the downstroke of the pump, the polish rod acts to displace an additional volume of liquid to the surface. In similar fashion, this displacement acts in reverse on the upstroke to reduce the net volume of fluid exiting the wellhead.

The net effect of both displacements mentioned above is additive, and is offset somewhat by the fact that as fluid exits the working barrel into the tubing string at downhole pump elevation, there exists a slight reduction in the average upward velocity of liquid within the tubing since it is typically of larger diameter than the working barrel. Of further influence are the effects of leakage past the traveling and standing valves during the up and down strokes respectively, and the effects of possible leakage through a plurality of tubing joints. When all such displacements and inefficiencies are taken into account, it is frequently found that the typical downhole piston pump installation moves a considerable portion of its total pump capacity to the surface on the downstroke. Many wells, in fact, actually move more fluid on the downstroke than on the upstroke, depending on the physical dimensions and efficiencies of the particular equipment involved.

Whenever formation fluids enter the casing under optimum production conditions, the hydrostatic pressure acting upon these liquids is greatly reduced below the reservoir pressure "$P_f$". Because of this, gaseous hydrocarbons originally dissolved within the water and oil come out of solution and physically separate from the other constituents in accordance with their natural order of densities. Water, being the heaviest, falls immediately to the bottom of the well where it accumulates and eventually enters the pump first. Oil, being lighter, rises to float on top of the water and gas, being the lightest, rises to fill the remainder of the casing between liquid interface and wellhead.

Once inside the casing, the amount of gas that remains in liquid solution is dependent only upon the absolute pressure and temperature of the casing fluids at formation depth. If the wellhead gas pressure is not very high, then the gas pressure acting upon the fluid interface at the bottom of the hole will be essentially the same as the gas pressure measured at the surface. Due to the greater densities of water and oil, however, the hydrostatic pressure within each column of liquid increases linearly with depth below the gas/liquid interface. Thus, the amount of gas in solution within the combined liquid column also increases significantly with increasing depth of liquid accumulation. If, for example, casing gas is maintained at a pressure of 100 psig at the wellhead in order to deliver regulated gas into the pipeline, and if liquid is allowed to build within the casing to a height of 500 feet above the pump inlet before such equipment is actuated, then the initial hydrostatic pressure acting upon this column of liquid increases uniformly from 100 psig at the liquid surface to 300 psig at the pump inlet, assuming an average liquid pressure gradient of 0.40 psig per foot of depth. In this case the first liquid ingested into the pump will contain natural gas in solution at a pressure of 300 psig, and the last liquid ingested into the pump just prior to "pump-off" will contain natural gas in solution at a pressure of 100 psig.

Throughout the pumping cycle, liquid is sucked into the pump and discharged on top of the traveling valve, where the hydrostatic pressure within the tubing string is directly related to its setting depth below ground level. If the pump is located 5000 feet below the surface, for instance, then hydrostatic pressure within the tubing is approximately 2000 psig at pump elevation. At this pressure, the gas contained within the liquid column can not possibly come out of solution since it has previously out-gassed to a saturation pressure of between 100 and 300 psig as previously described. As this liquid is pumped to the surface, however, the hydrostatic pressure within the tubing string decreases by approximately 40 psig for every 100 feet of vertical rise; thus, when the first liquid ingested by the pump comes to within 700 feet of the surface, its hydrostatic pressure will have decreased to 300 psig assuming that the wellhead discharge pressure is 20 psig. As the liquid continues to rise above this depth, its hydrostatic pressure further decreases and gas begins to expand out of the super-saturated liquid. This escaping gas continues to expand as it approaches surface elevation, causing the liquid to "flow in head" or surge into the lead line. A similar out-gassing of all additional liquid ingested by the pump likewise occurs in this example at depths ranging from 700 to 200 feet below ground level, where the hydrostatic tubing pressure declines below the minimum casing saturation pressure of 100 psig.

This normal escapement and expansion of dissolved gas within the tubing string chills the liquid and increases its volume as it approaches and finally exits the wellhead. Such expansion causes paraffin to congeal within the tubing, and also causes the apparent volumetric efficiency of the downhole pump to increase since the final volume of separated gas and liquid exiting the wellhead is much greater than the original volume of gas-saturated liquid ingested at the pump inlet. By using a conventional fluid back-pressure valve in the liquid discharge line at the wellhead, as hereinafter disclosed, the hydrostatic liquid discharge pressure can be maintained greater than the greatest possible pump inlet pressure to avoid such problems.

When a well first starts to pump after being shut-down for a certain length of time, there is usually an excess reserve of liquid contained within its casing. Since the pump initially has plenty of liquid available to its inlet, fluid first exits the wellhead at an average rate that is identically equal to the pumping rate "$Q_p$" of downhole equipment. As the fluid level within the casing is reduced by pumping, additional liquids enter from the formation at an increasing rate that is determined solely by the changing pressure drive ($P_f - P_c$). Should the available fluid entry rate "$Q_F$" be greater than the established pumping rate "$Q_p$", the hydrostatic casing pressure will eventually decline sufficiently to cause new liquids to enter at a rate that is identically equal to the pumping rate (i.e. $Q_F = Q_p$). Once equilibrium has been established, no further change in the average casing fluid level will occur except as dictated by a gradually changing reservoir pressure, or by a change in the actual pumping rate due to a degradation of the overall pumping efficiency. If the established pumping rate "$Q_p$" is greater than the maximum available fluid entry rate "$Q_F$", however, then the well will eventually "pump-off" when the pump's initial reserve of liquid is depleted from the casing. Following such event, the average rate of liquid exiting the wellhead can thereafter be no greater than the average rate of new fluids entering the casing from the formation. Accordingly, the energy expended by the prime mover will be inefficiently utilized by the downhole pump if it continues to operate after fluid "pump-off".

Regardless of the type of mechanical pumping equipment used, the downhole pump can be severely damaged if it is operated for any appreciable length of time without a substantial head of liquid available to its inlet. If a piston pump depletes all of the liquid from the casing, for instance, it will thereafter operate in a condition referred to as "fluid pounding" wherein there is insufficient liquid available to the pump on its suction stroke to completely fill the pump barrel with liquid. Under such conditions the pump barrel fills partially with gas, and heavy shock loads are then developed on each successive downstroke as the traveling valve abruptly slams into the liquid interface. These shock loads tend to unscrew the sucker rods which are typically screwed together in 25 feet lengths, thereby causing rod separation that requires a time consuming and expensive "fishing job" to repair. Also, without a substantial charge of liquid passing through the pump on each stroke, wear on the traveling valve cups or metal plunger is accelerated due to insufficient lubrication and the tendency for sand and other solids to precipitate out of the fluid stream. The resulting shock loads due to fluid pounding are also very detrimental to the structural integrity of surface pumping equipment.

In similar fashion, when a downhole submersible pump depletes all of the liquid from the casing, it will thereafter operate at reduced efficiency due to the effects of cavitation induced by the ingested gas. Not only does the pump motor receive insufficient cooling, but the centrifugal pump vanes can be severely damaged by shock loads induced by the collapse of gas bubbles as they travel through the pump. The rubber stator and polished metal mandrel of a rotary screw pump can also suffer similar damage if not operated with a full head of liquid available to its inlet. Sustained fluid pounding also tends to prematurely wear out the stuffing box seals as a result of improper lubrication. This situation will frequently result in a loss of considerable fluid through these worn seals, thereby threatening the adjacent environment and necessitating shut-down of equipment while repairs and clean-up are effected. For these reasons, it is imperative that no type of mechanical downhole pump be operated for any sustained period of time in a severe "pumped-off" condition.

Whenever a downhole mechanical pump is allowed to operate for any length of time in a "pumped-off" condition, the degree of severity of fluid pounding or cavitation is determined by the dimensionless ratio of fluid entry rate "$Q_F$" divided by the pumping rate "$Q_p$". By definition, the fluid entry rate "$Q_F$" that is used throughout this disclosure shall include any volume of solid particular contaminants that might be suspended within, and transported with, the volume of produced liquids. If the established ratio of "$Q_F/Q_p$" is just slightly less than 1.0, then the pump receives essentially a full charge of liquid on each suction stroke or revolution, and the effects of fluid pounding or cavitation are almost imperceptible. If the ratio "$Q_F/Q_p$" is near 0, however, then the pump receives very little liquid in relation to its capacity, and the effects of fluid pounding or cavitation are quite severe. Between these two extremes is a transition zone wherein the detrimental effects of fluid pounding or cavitation become more severe as the ratio "$Q_F/Q_p$" approaches zero. By contrast, whenever the ratio "$Q_F/Q_p$ is greater than 1.0, the well will never "pump-off" inasmuch as fluid can continuously enter the casing at a rate greater than the actual pumping rate of the downhole equipment. Accordingly, in this situation, the production potential of the well will be limited by the capacity of the pumping equipment installed, rather than by the ability of the formation to deliver fluids.

From the above discussion, it should be obvious that the greatest production of oil and gas is obtained at the least operating expense by equipping a well with a downhole pump that has a capacity "$Q_p$" which is identically equal to the maximum available fluid entry rate "$Q_F$". Unfortunately, this result is practically impossible to achieve (and even harder to maintain) in actual practice since both the pumping rate and fluid entry rate of any given well completion will vary considerably from day-to-day due to the effects of changing pump efficiency, reservoir pressure and average fluid viscosity. For this reason, most operators elect to install pumping equipment whose actual volumetric capacity is greater than the maximum available fluid entry rate of the well, and then attempt to control the operating cycle of their prime mover (i.e. electric motor or gas/diesel engine) by the use of a timing device that is manually set to provide for the periodic operation of such equipment. By so doing, the effective pumping capacity of downhole equipment is reduced by the "Duty Cycle" of the prime mover, which is easily controlled from the surface by selecting the desired relationship between "Run Time" and "Rest Time" as follows:

$$\text{Cycle Time} = \text{Rest Time} + \text{Run Time} \quad (4)$$

$$\text{Duty Cycle} = \text{Run Time}/\text{Cycle Time} \quad (5)$$

From a theoretical standpoint, the required Duty Cycle of both downhole and surface pumping equipment is equal to the computed value of the dimensionless ratio "$Q_F/Q_p$". To derive this relationship, it is convenient to assume that each repetitive operating cycle of the pump will begin at the start of the "rest period" and will end at the conclusion of the following "run period". Under these conditions, the start of each operating cycle is marked by the onset of "fluid pounding" or "cavitation", which begins when the casing liquid level has been reduced to the pump inlet. Since fluid is neither created nor destroyed by the pumping process, and since the inventory of liquids within the casing is always the same at each instant of time when "pump-off" is first reached, "cycle time" and "run time" are closely related to the average values of "$Q_F$" and "$Q_p$" as follows:

$$(Q_F)^*(\text{Cycle Time}) = (Q_p)^*(\text{Run Time}) \quad (6)$$

This continuity equation assumes that "$Q_F$" is essentially constant throughout the entire operating cycle, and further assumes that fluid only exits the casing during periods of actual pump operation. Both of these assumptions are fairly realistic for a properly run well that utilizes a fluid back-pressure valve to minimize the effects of gas expansion in the tubing string, as previously discussed, and that utilizes short rest times to prevent fluid from building excessively within the casing during the rest period. This equation also assumes that fluid exits the wellhead at a constant average rate "$Q_p$" whenever the downhole pump is actuated by the prime mover, even though such equipment rarely performs in this ideal fashion for reasons hereinafter discussed. By making such an assumption, however, the limiting value of the required duty cycle for both downhole and surface equipment can be readily calculated by combining equations (5) and (6) to yield:

$$\text{Duty Cycle} = \text{"}Q_F/Q_p\text{"} \quad (7)$$

Unfortunately, the actual values of "$Q_F$" and "$Q_p$" are rarely known by the operator to any degree of accuracy. Thus, the operator has little choice but to guess at the correct setting for "run time" and "rest time" when programming a conventional timing device, unless he is willing to pay the price to conduct frequent and expensive production tests to measure the average value of "$Q_F$" and "$Q_p$" based on actual fluid delivery into a calibrated tank. Also, conventional timing devices are generally programmable only in discrete increments of fifteen minutes or more, which means that accurate selection of the desired duty cycle is not possible in most situations with such equipment.

Even when the correct values of "$Q_F$" and "$Q_p$" are accurately known, total fluid production into a tank or pipeline is less than optimum when pumping equipment is controlled by a conventional timing device that is programmed according to the dimensionless ration "$Q_F/Q_p$". Such devices, being passive in nature, make no allowance for the transients of initial start-up, or for the fact that selected "rest times" may be inadvertently lengthened, or "run-times" improperly shortened, by unforeseen power interruptions. Such devices additionally make no allowance for the fact that fluid will frequently "fall-back" into the casing during periods of equipment "rest" as the result of leaks in the tubing string or downhole pumping valves, and make no allowance for the transient effects of sand and/or gas that frequently interrupt normal pump operation as they pass through the suction chamber together with formation fluids.

Because of these considerations, the proper selection and regulation of the required duty cycle for any particular well completion is quite difficult to achieve using conventional timing equipment that must be manually programmed by the operator. Accordingly, most wells are either under-pumped or over-pumped to some degree, with an attendant reduction in either fluid production or operating efficiency respectively.

If optimum production is to be maintained by a mechanical pump without the adverse effects of fluid pounding or cavitation, then it is essential that a proper "rest time" be selected for programming into the motor control device that is used to regulate the duty cycle of downhole equipment. This may be clearly understood by considering the fact that the rate of fluid entry ($Q_F$) into the casing decreases exponentially with time as the available pressure drive ($P_f - P_c$) diminishes with increasing fluid height. Since the greatest fluid buildup occurs during the first few minutes of liquid accumulation, the average daily fluid entry rate into the casing will be severely affected by the "rest time" selected for its pumping equipment. A well that requires five hours, (i.e., 300 minutes) to accumulate 500 feet of liquid during the "rest period", for instance, will require only 6.2% of this time (i.e., 19 minutes) to accumulate 25% of this volume, and will require only 15% of such time (i.e., 45 minutes) to accumulate 50% of this volume. For this reason, it is imperative that the total daily "rest time" of any pump be limited in duration and uniformly distributed throughout each 24 hour operating period.

The optimum "rest time" for any well is a function of its casing size, tubing size, fluid entry rate, bottom hole pressure, oil cut, gas/oil ratio, fixed overhead expense, energy cost, maintenance expense, pumping rate and certain other factors such as the water disposal cost and prevailing market price for oil and gas production. In general, long "rest times" result in lost production whereas short "rest times" result in excessive maintenance problems due to the frequent cycling of surface and downhole equipment. With few exceptions the optimum "rest time" for any particular well results in a slight but almost imperceptible trade-off of production revenue for a greatly reduced expense of energy consumption and equipment maintenance. "Rest times" on the order of a few minutes to several hours are usually appropriate for most wells, depending on the established value of $Q_F/Q_p$, although greater intervals may safely be used whenever fluid entry rates are extremely low and/or formation pressures extremely high.

Various types of "pump-off detectors" have been devised over the years to control the operating cycle of a producing well. Some of the most common "pump-off" detection systems utilize a vibration sensor mounted on the Sampson post or gear box of the pumping unit to detect the slight change in system oscillation that normally occurs at the onset of fluid pounding or cavitation. Other systems utilized a strain-gauge mounted on the polish rod, walking beam or pitman arm to detect the change in time-averaged rod loading which results from less fluid being moved to the surface after "pump-off". Solid-state motor current sensors have recently been used to detect the slight reduction in average power output of the prime mover that normally occurs at the onset of fluid pounding or cavitation, and fluid flow switches have been utilized to indirectly detect the change in pumping rate of downhole equipment which occurs when the reserve of liquid is first depleted from within the casing. Certain other devices attempt to avoid "pump-off" altogether by measuring the actual fluid level within the casing; these systems typically operate by means of a downhole float switch mounted on the tubing string immediately above the pump inlet, or by means of a surface generated acoustic signal that is reflected off of the liquid/gas interface within the casing.

Unfortunately, all of the above methods for detecting "pump-off" require that a sensing circuit be accurately calibrated for the specific installation at hand. Fluid switches, for instance, typically operate by detecting a change in the average or peak flow line pressure at the wellhead, or by detecting a change in the average or peak pressure differential across an orifice plate installed in said line. When the average fluid exit pressure (or pressure differential across the orifice plate) decreases below a preselected trigger point, or when the peak pulsating pressure amplitude or pressure differential ceases to rise above this preselected reference point, then the system automatically assumes that "pump-off" has occurred. Selection of the correct trigger point for each application requires that the operator have a detailed knowledge of the pumping characteristics of his well, since the typical "before" and "after" fluid exit pressures (or pressure differentials across the orifice plate) must be known with reasonable accuracy for proper calibration of equipment at time of installation. Similar considerations will also apply to "pump-off" detection systems that operate on the basis of changing rod load, equipment vibration or prime mover power output. Thus, the correct trigger point for each well installation can only be determined by trained engineers or technicians in the field, where conventional "pump-off" detection equipment must be accurately calibrated for each particular set of operating conditions.

Perhaps the greatest deficiency of conventional "pump-off" detection equipment concerns their inability to automatically respond to normal changes in both reservoir and downhole equipment performance. Once a conventional sensing circuit has been calibrated to a specific set of operating conditions, it can thereafter only respond to changes in the measured parameter (i.e. pressure, load, vibration or power) that occur relative to the selected point of reference. Most of these parameters change on a daily basis throughout the operating life of a well, however, and thus frequent recalibration of conventional "pump-off" detection equipment is required for dependable operation.

Still another problem with conventional "pump-off" detection equipment concerns their inability to operate with great sensitivity in situations where the well is operating at a high ratio of "$Q_F/Q_p$". As previously discussed, the effects of fluid pounding or cavitation decreases with increasing values of "$Q_F/Q_p$", and disappear completely when the well is operated at a ratio of 1.0 or higher. Also, slight changes in the pumping rate of downhole equipment normally occur prior to the initiation of "pump-off" due to the changing level and viscosity of fluids within the casing. Unfortunately, the operator rarely knows the actual operating conditions of his well, and thus he can not depend on conventional equipment to perform properly under all situations. This limitation severely restricts the widespread use and application of conventional "pump-off" detection equipment, regardless of their construction or mode of operation.

SUMMARY OF THE INVENTION

From the foregoing discussion it should be readily apparent that a new and improved method and apparatus for detecting the onset of fluid pounding or cavitation at "pump-off" would be quite beneficial to the efficient operation of most producing wells. The present invention is directed toward providing that method and apparatus.

An embodiment of the present invention measures, computes and displays all important reservoir and equipment performance parameters, and automatically alerts the operator if the production potential of either well or pumping equipment falls below a minimum acceptable level of performance. The system accurately detects the onset of fluid pounding or cavitation for any ratio of "$Q_F/Q_p$" greater than 0.0 and less than a reasonable upper limit of approximately 0.95, which is only slightly less than the upper limiting value of $Q_F/Q_p=1.0$ below which fluid "pump-off" will always occur. A manual override circuit is provided to bypass automatic operation of the well should the operator so desire.

The system accurately monitors the performance of both fluid reservoir and downhole pumping equipment, and automatically regulates the Duty Cycle of all pumping equipment based upon the established value of "$Q_F/Q_p$", so as to optimize total fluid production and minimize operating expense by limiting downhole pump operation to times when a full head of liquid is available to its inlet. Provision is made to automatically compensate for the transient effects of gas or sand passing through the pump, and to compensate for the detrimental effects of supply-line power interruptions and fluid fall-back in the tubing string.

The system accurately measures the established duty cycle of both surface and downhole pumping equipment, together with total production time, total run time, and total number of operating cycles for any specified production period that a well is under its control. These parameters are displayed in digital format with frequent automatic update for benefit of the operator, regardless of whether the well is automatically or manually controlled.

In addition, the system accurately measure the average rate "$Q_F$" that incompressible solids and liquids are entering the casing from the formation, and displays this performance information in digital format with frequent automatic update for benefit of the operator. The system additionally measures the current average incompressible fluid pumping rate "$Q_p$" of all downhole equipment associated with the well, without regard to whether the resulting flow is steady-state or pulsating (i.e. highly transient) in nature. This information is used by the system to automatically compute and display the resulting overall volumetric efficiency of all downhole pumping equipment.

In order to provide for accurate and reliable control of the well under situations where the dimensionless ratio "$Q_F/Q_p$" is quite high (i.e. near the upper limiting value of 1.0 for "pump-off"), the system automatically adjusts its control of a well to compensate for the slight but perceptible change in the average incompressible pumping rate "$Q_p$" of downhole equipment that typically occurs as the result of changing fluid levels and viscosities within the casing during pump operation. Additional compensation is made on an automatic basis to adjust for the gradual change in pumping rate that normally occurs as the average oil cut and gas saturation of produced liquids changes throughout the operating life of a well.

In order to correctly document the production history of a well, the system accurately measures and records the incompressible volume of all liquids exiting the wellhead during a specified production period, and displays this important performance information in digital format with frequent automatic update for the benefit of the operator. System accuracy is essentially independent of average fluid viscosity, density, temperature, gas saturation, oil cut and ambient weather conditions, without regard to whether such flow is steady-state or pulsating (i.e. highly transient) in nature.

All system hardware is mounted above ground for economy of installation and maintenance, and is designed for fast and simple connection to either new or existing wells. Such equipment is designed to operate safely and reliably at any supply-line voltage normally encountered in the field. All electronic circuits are protected against transient power surges and voltage spikes caused by lightning discharge near the well-site, and the entire system is capable of accurate and reliable operation over the entire range of ambient temperatures and weather conditions that might normally be encountered in the oil patch.

All system apparatus is self-calibrating to any well regardless of the type of mechanical equipment installed (i.e. reciprocating piston, centrifugal or rotary screw pump), and regardless of the theoretical displacement and volumetric efficiency of such equipment. No special programming skills or prior knowledge of well performance or downhole pump conditions is required of the operator in order to achieve efficient and automatic control of any well, and the fluid sensor is self-cleansing of all contaminants normally associated with production formation liquids.

All elements of the invention are designed to function automatically, in direct response to the measured rate that produced liquids are extracted from the casing. This rate is determined by a fluid sensor that is mounted in the tubing discharge line of the wellhead to constantly monitor the flow characteristics of such production. By accurately measuring the true instantaneous rate that all incompressible liquids exit the wellhead at each instant of time, and then integrating this rate over a reasonable production interval that is sufficiently large to dampen out the transient characteristics of pulsating or variable flow, the time-averaged rate of fluid discharge may be accurately determined for any selected production interval.

Primary control of all pumping equipment is automatically established by means of unique "pump-off" detection apparatus that requires no special calibration at time of installation, and that automatically adjusts for normal changes in the operating characteristics of both well and equipment throughout the production life of the reservoir. This novel system accurately determines the onset of fluid pounding or cavitation by sensing the rather abrupt decrease in average downhole pumping rate that typically occurs when the excess reserve of stored formation liquids is first depleted from within the casing at time of "pump-off". During periods of normal pump operation, incompressible fluids exit the wellhead at an average rate "$Q_p$" that is precisely determined by the mechanical displacement and volumetric efficiency of downhole pumping equipment. Once the stored reserve of excess liquids has been removed from the casing, however, fluids thereafter exit the wellhead at an average rate that is solely determined by the established fluid entry rate "$Q_F$" of new production. It is this extremely predictable behavior that allows for the accurate determination of fluid "pump-off" for any well regardless of the flow characteristics of its reservoir, and regardless of the condition or configuration of downhole pumping equipment installed.

For efficient regulation of the well under all normal production circumstances, automatic control of the prime mover is divided into four distinct control intervals that are sequentially advanced by the system during each complete operating cycle of the pump. These control intervals are referred to as the 1) Rest Period, 2) Prime Period, 3) Production Period and 4) Verification Period. These four sequencing intervals will be defined in greater detail hereinafter in connection with the description of the preferred embodiments of the present invention.

For purposes of the present discussion, the "Rest Period" of normal pump operation begins when the prime mover is automatically shut-down by the "pump-off" detector following confirmed identification of this event. This period is considered to be the initial phase of each repetitive operating cycle, and is included in the control sequence to provide sufficient time for a new reserve of liquid to build within the casing prior to activation of pumping equipment. The duration of this interval is controlled by a timing circuit that is manually programmed by the operator based on his general knowledge of production characteristics for the area surrounding his lease. The actual "Rest" time selected for programming is not critical as long as it falls within the general guidelines set forth in the preceding discussion. Following termination of this "Rest Period", a signal is automatically sent to the motor control circuit of the system to initiate operation of all pumping equipment.

The "Prime Period" of normal pump operation begins immediately upon termination of the "Rest Period", when pumping equipment first starts to operate, and continues until such time as a steady (though perhaps pulsating) stream of liquids emerge from the wellhead at an average stabilized rate that is solely regulated by the average pumping rate "$Q_p$" of all downhole equipment. This "Prime Period" is included in the control sequence of pump operation to allow for the fact that liquids will frequently "fall back" into the tubing string during the "Rest Period", and to compensate for the fact that pumping equipment may be initially "gas-locked" when first activated due to the prior ingestion of casing gas at the conclusion of the previous operating cycle. Transient effects within the tubing string such as fluid separation or gas expansion near the wellhead are also compensated for during this second important phase of automatic pump control.

The "Production Period" of normal equipment operation begins immediately upon termination of the "Prime Period", following automatic system determination that the average fluid exit rate has stabilized at the wellhead. Once this operating sequence begins, the system automatically measures the actual pumping rate "$Q_p$" of all downhole equipment in order to establish a meaningful baseline of reference for the "pump-off" detection circuit previously described. This rate, which is a function of the operating characteristics and physical condition of downhole equipment, is also used to automatically compute the overall volumetric efficiency of all downhole equipment based on the known value of mechanical pump displacement that is programmed into the system by the operator at time of installation. The resulting value of "Pump Efficiency", which is computed only once during each operating cycle, is then displayed in digital format for benefit of the operator.

Throughout the "Production Period" the system will continuously upgrade its stored baseline of reference to allow for the progressive decrease in average pumping rate that normally occurs as the fluid level within the casing is reduced, and to compensate for the abrupt decrease in pump efficiency that normally occurs when the pump finally removes all stored water from the casing and begins to ingest the pad of oil that floats on top. This baseline rate is an average composite of all pumping rates measured during the previous few minutes of pump operation, and thus does not immediately reflect the abrupt change in pumping rate that typically results when the downhole pump finally removes all liquids from the casing.

During all periods of normal pump operation, the system continuously monitors the current average rate of fluid exit from the wellhead and compares this average rate with the baseline rate in order to determine the onset of fluid pounding or cavitation. Before "pump-off" the current rate and baseline rate will be essentially the same; after "pump-off" the current rate will be less than the baseline rate by an amount that is linearly related to the dimensionless ratio "$Q_F/Q_p$" previously discussed. By sensing this change and allowing for normal transients caused by the passage of gas or other contaminants through the pump, the advent of fluid pounding or cavitation will be quickly and accurately detected for any well regardless of its reservoir and equipment characteristics.

Following any preliminary indication that "pump-off" has occurred, the system automatically enters a short "Verification Period" of controlled pump operation in order to properly confirm that all excess liquids have indeed been removed from the casing. This last sequential phase of each pumping cycle is required to compensate for any non-typical transient effects within the tubing string that might temporarily reduce the average fluid discharge rate at the wellhead. Such transients might be caused by the passage of sand, gas or other contaminants through the downhole pump, or by the momentary surge of liquids due to gas expansion at the wellhead. During this "Verification Period" the automatic termination of pump operation is delayed to provide sufficient time for such transients to stabilize. Should the measured pumping rate return to normal before the conclusion of this "Verification Period", then the control sequence is immediately reversed to reenter and extend the preceding "Production Period"; in this case it is properly assumed that a transient was responsible for the false indication of "pump-off", and thus the erroneous signal is ignored. If, on the other hand, the average fluid discharge rate does not return to the previously measured baseline rate within the "Verification Period" allowed, then the initial indication of "pump-off" is assumed to be correct and the present operating cycle is terminated. In this case the pump is immediately de-energize so that the well can enter its next sequential "Rest Period" as herein described.

In order to minimize expensive production downtime that frequently results from the unexpected malfunction of pump or control equipment, the invention is provided with an automatic warning system that alerts the operator whenever 1) the volumetric efficiency of all downhole pumping equipment falls below a minimum acceptable value, 2) the fluid flow-sensing element of the control circuit ceases to operate properly, or is improperly sized for the particular installation, or 3) normal control-system power is interrupted. Provision is also made for the more rapid sequencing of each pump cycle so that prime mover operation is limited in duration and eventually terminated in situations where an adequate flow of liquids can not be properly established or maintained from the wellhead. This last feature restricts the operation of pumping equipment in situations that might otherwise cause damage to the downhole pump or stuffing box rubbers, or in situations where an excessive amount of power is being wasted by inefficient pumping.

Since it is a primary object of the invention to present the operator with a complete set of meaningful performance information that can be used to assist him with the efficient control of his well, the present invention automatically records the total number of operating cycles that are initiated by the control circuit during any specified production period. The total duration of this production interval is also recorded, as is the total time of prime mover operation and the total volume of liquids removed from the casing. By measuring the net change in total fluid production and prime mover operating time on a frequent basis throughout the specified production period, the current average fluid entry rate "$Q_F$" and duty cycle of pump operation are also calculated automatically. All of this performance information, together with the current pump efficiency, is then displayed in digital format with frequent updates.

In accordance with another aspect of the present invention, the fluid sensing assembly includes a housing that contains an internal flow passage separated into inlet and discharge chambers by a rigid barrier wall that contains a fixed-area orifice for controlling and directing the passage of any acceptable homogeneous mixture of solids, liquids and gases from one chamber to the other. A clapper plate assembly mounts within the discharge chamber of the housing, in close proximity with, and parallel to, the discharge plane of the orifice. This clapper assembly pivots on its integral shaft in linear angular response to the instantaneous volumetric discharge rate of such mixture as it passes through the orifice to strike the clapper plate. By definition, an acceptable homogeneous mixture is one that imparts the same angular response to the clapper plate as would be imparted by a stream of pure incompressible liquid having the same average mass-density and viscosity as the stream of said homogeneous mixture. Thus, small amounts of undissolved gases and relatively small particles (i.e., small relative to the orifice size and clapper mass) may be included within the homogeneous mixture without affecting the accuracy of the clapper response to any noticeable extent, provided that the average mass-density and viscosity of such mixture is known for calibration purposes.

A permanent magnet, rigidly attached to the pivot shaft of the clapper assembly, is contained within a third chamber of the housing into which the clapper shaft extends. A linear Hall-effect sensing element mounts within a fourth chamber of the housing, near the magnet but separated therefrom by a thin non-magnetic pressure barrier that isolates the sensing element from fluid contact. The sensing element and magnet sense the instantaneous angular position of the pivot shaft and its attached clapper plate. Electronic circuitry contained within the fourth chamber, or any other dry chamber of the housing, amplifies and compensates the output signal of the Hall-effect sensor to obtain a calibrated output voltage signal that is linearly related to the instantaneous volumetric flow-rate of the known homogeneous mixture as it passes through the orifice, without regard to the ambient temperature acting upon the outside of said housing, or to the temperature of the mixture passing therethrough.

It is to be noted that such a device, when properly constructed and calibrated for a mixture of known pressure and viscosity, produces an output signal "$V_s$" that is accurately related to the instantaneous volumetric flow-rate "Q", orifice area "A", average fluid density "$D_F$" and clapper density "$D_c$" by a constant of proportionality "k" as follows:

$$V_s = (k^*Z/A)^* \sqrt{D_F/(D_c - D_F)} \tag{8}$$

Thus, for any given fluid density, clapper density and orifice configuration, the calibrated output voltage "$V_s$" of any such device is linearly related to the volumetric flow-rate "Q" of the known mixture passing through it, provided that the flow-rate "Q" is less than some maximum limiting value which typically corresponds to a clapper displacement of between 25° and 30°. The actual range of linearity for any particular clapper/orifice geometry may be readily determined by laboratory testing with the homogeneous mixture in question. Such testing will also determine the correct value of the constant of proportionality "k", which is primarily related to the internal geometry of the sensor assembly, and to its physical orientation relative to the Earth's gravitational field. This factor also includes the variable effects of pressure and viscosity upon clapper response, which are of secondary importance when the sensor is used to monitor the volumetric flow-rate of a known homogeneous mixture of incompressible solids and liquids.

The calibrated sensor assembly described above may also be utilized to accurately monitor the volumetric flow-rate of any other homogeneous mixture of solids, liquids and gases having a different pressure, density and/or viscosity than the mixture used for sensor calibration. Properly constructed, the response of the clapper plate will be essentially independent of the average viscosity of the homogeneous mixture that strikes it, since the moment arm of frictional forces acting upon the clapper will be negligibly small about the pivot shaft. If such mixture is comprises entirely of solids and incompressible liquids, then the factor "k" will also be essentially independent of the internal static pressure of the flowing mixture. Whenever the mixture includes large quantities of undissolved gas bubbles, however, then it will cease to behave as an incompressible mixture. In such situations the constant of proportionality "k" must be evaluated to include the effects of fluid compressibility, which are related to the internal geometry of the sensor and to the static pressure of the flowing mixture. Such effects may be readily determined at time of sensor calibration, when the instantaneous output voltage signal is determined based upon a known standard of reference. Once such calibration is achieved, the sensor may then be used with other homogeneous mixtures of known pressure, density and viscosity in order to accurately monitor the instantaneous volumetric flow-rate of such mixtures as they pass through the sensor having. In such situations the correct volumetric flow-rate "Q" may be accurately determined at each instance of time by adjusting the instantaneous output signal of the sensor for the known effects of pressure, density and viscosity as hereinafter described.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 1A and 1B comprise a schematic elevation showing how the invention is used in a typical oil well installation.

FIGS. 7A through 7D comprise a block diagram of the electronic circuits of the subject invention.

FIGS. 8A through 8D comprise a schematic diagram of detailed electronic circuitry of the subject invention.

DETAILED DESCRIPTION OF THE PREFERRED EMBODIMENTS

Figure 2:
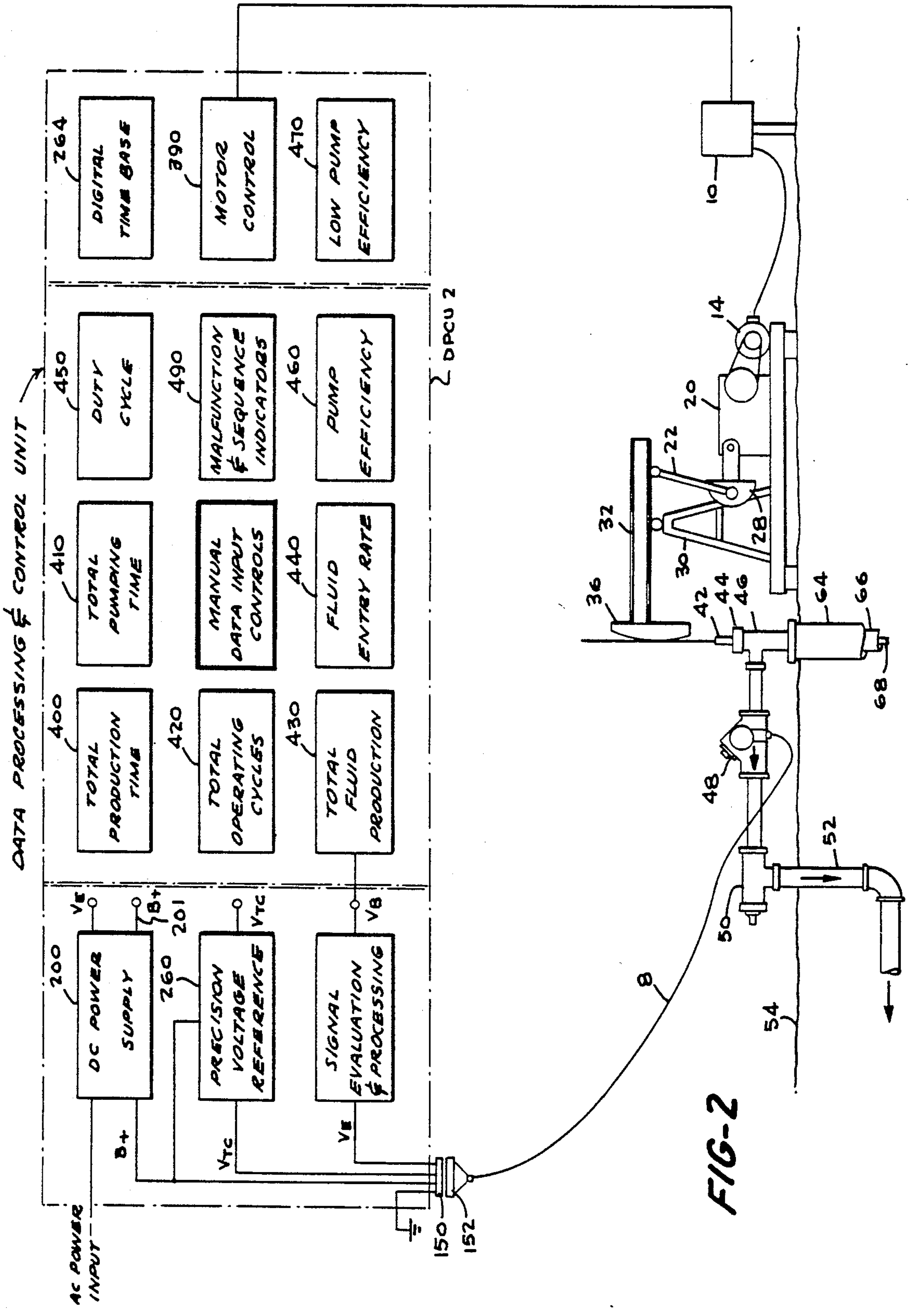
FIG. 2 is a schematic elevation of the invention showing some of the circuit elements found in the data processing and control unit.

With reference to FIG. 2, the digital well-control system (DWCS) of the present invention is comprised of four basic hardware assemblies that are referred to herein as the fluid sensor 48, cable 8, data processing and control unit (DPCU or control unit) 2, and back-pressure valve 50. Each of these components is surface mounted near the wellhead or existing motor control panel, and each works in conjunction with the other to monitor and control the performance of both downhole and surface mounted pumping equipment, as hereinafter described.

As depicted on FIGS. 1 and 2, a typical well installation has a string of production casing 64 that extends downward from the surface of the earth 54 to some completion depth 78 that lies below a producing fluid reservoir 84. The annulus between the open bore-hole 72 and casing 64 is filled with a cement slurry 80 from the bottom of the completion interval 76 to some point 74 well above the fluid reservoir 84 in order to consolidate the hole and keep unwanted formation fluids from communicating with the producing reservoir 84. Cement 80 and casing 64 are both selectively perforated at multiple location 82 to provide permeable flow-channels through which desired fluids may enter the casing. 64 from the reservoir 84. If necessary, the reservoir 84 may be stimulated by acid or hydraulic fracture 86 to enhance the rate of fluid entry into said casing 64.

Contained within casing 64 is a string of production tubing 66 that hangs from wellhead 62 and extends downward to a depth 88 that is near the producing reservoir 84. Attached to the bottom of this tubing string 66 is a piston pump assembly 98 that is comprised of a barrel 92, a traveling ball valve 90, a standing ball valve 94 and a pump inlet 96. The pump 98 is actuated by a string of sucker rods 68 that attach to traveling valve 90 and extend upward within the tubing string 66 to connect with a polish rod assembly 42 near the surface 54. The polish rod assembly 42 passes through production tee 46 and stuffing box 44 of the tubing assembly 66 to connect with horsehead 36 of the pumping unit assembly 34 by means of bridle assembly 38 and polish rod clamp 40 that supports the entire rod assembly 42 and 68 and fluid column 70 within the tubing string 66.

Horsehead 36 of the pumping unit assembly 34 is connected to rocking arm 32 that rests upon and pivots about the top of sampson post 30. This assembly rests upon the base structure 24 of the pumping unit assembly 34, to which is also mounted the prime mover 14 and speed-reduction gearbox 20. The input shaft of gearbox 20 is driven by prime mover 14 that delivers power to sheave 18 by means of flexible power transfer belts 16. The rotating output shaft of gearbox 20 is connected to crank arms 26 that impart a reciprocating motion to rocking beam 32 by means of pitman arms 22. Attached to crank arms 26 are balance weights 28 that serve to balance the combined static load of rod string 68 and fluid column 70 as such fluids are pumped from depth 88 to surface 54. All pumped fluids exit production tee 46 and pass through fluid sensor 48 and fluid back-pressure valve 50 before entering a fluid transfer line 52 that transports both liquids and their dissolved gas constituents to either tank or pipeline (not shown).

The average static discharge pressure of all fluids passing through sensor 48 is established by means of back-pressure valve 50, and is measured by means of pressure gauge 58. Casing gas flows directly into gas pipeline 56 at an average static discharge pressure that is measured at wellhead 62 by pressure gauge 60. Gasses and liquids are later separated and measured by equipment not shown. Stuffing box 44 serves as a packing gland to prevent pressurized tubing fluids from leaking out of production tee 46 as pumping unit 34 imparts a reciprocating up-and-down motion to polish rod 42, rod string 68 and traveling valve 90 which in turn lifts fluid column 70 to the surface 54.

Mounted at surface elevation 54 near prime mover 14 is the Data Processing and Control Unit (DPCU) 2. This unit receives unregulated AC line power by means. of cable 6, and delivers highly regulated DC power to fluid sensor 48 by means of wire harness 8. Fluid sensor 48 measures the instantaneous volumetric flow-rate of all incompressible liquids exiting production tee 46, and sends this information back to the DPCU 2 by means of wire harness 8 for fluid density correction and further processing. DPCU 2 uses measured flow-rate information to establish efficient automatic control of prime mover 14 by means of control line 12 and magnetic starter 10. Measured flow-rate information is also used by DPCU 2 to evaluate the production performance of fluid reservoir 84 and all downhole pumping equipment, including downhole pump 98, tubing string 66 and sucker rods 68. All meaningful performance parameters are automatically computed and displayed in digital format by DPCU 2 with frequent update for benefit of the operator as previously described. Should the performance of either reservoir 84 or downhole equipment (66, 68 or 98) fall below certain reasonable limits, then DPCU 2 will automatically terminate the resulting inefficient operation of prime mover 14, and will simultaneously actuate a horn and/or strobe light 4 to advise the operator of his need to perform maintenance on the well.

Figure 3:
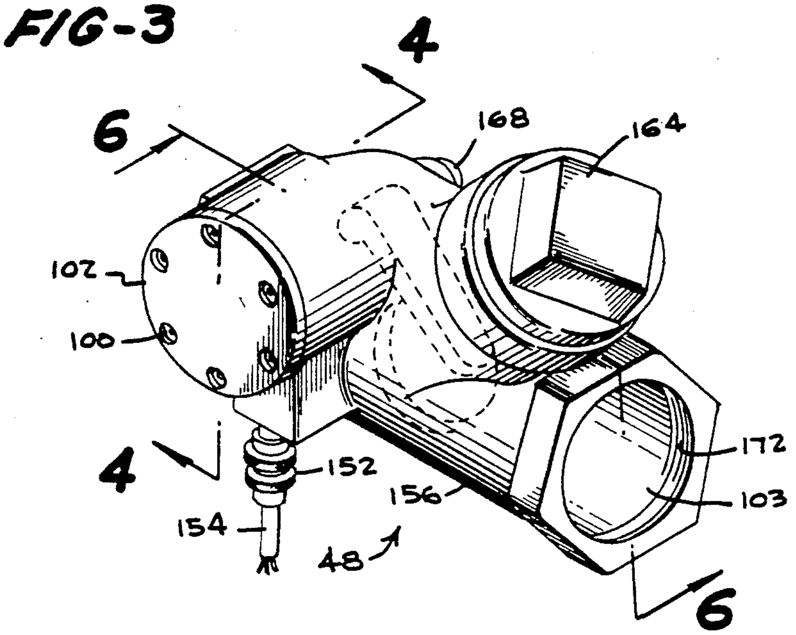
FIG. 3 is an external perspective view of a preferred embodiment of the flow sensor, constructed in accordance with the invention.

The fluid sensor 48 mounts in the liquid discharge line 52 of the wellhead, immediately downstream of production tee 46, and basically comprises housing 156 (FIG. 3) that controls the flow of fluids as they exit the tubing string 66. A sensing element 158 responds to the instantaneous volumetric flow-rate of the fluids as they pass through the housing. Electronic amplification and referencing circuitry 120 (FIG. 4) contained on PCB 106 converts the measured flow-rate response into a temperature compensated output voltage signal that is linearly related to the absolute magnitude of the highly variable fluid discharge rate.

The cable 8 is used to interconnect the fluid sensor 48 with the control unit 2. The cable includes a conventional wire harness 154 that contains four insulated electrical conductors which are surrounded by braided metal shielding. The shielding is encapsulated within an oil-proof vinyl covering. Each end of the cable terminates with a polarized weatherproof electrical connector 152 that quickly and easily interfaces with the fluid sensor and DPCU in the field. The four shielded conductors of the cable are used to provide the sensor with: 1) regulated "B+" power of approximately 15 pvdc; 2) a temperature compensated precision voltage reference "Vtc" of approximately 12 vdc; 3) a common 0 vdc earth ground buss; and 4) an output channel over which the analog flow-rate signal "$V_f$" is continuously transmitted to the DPCU for further amplification and evaluation processing.

The control unit 2 (DPCU) provides regulated DC power to all system components; monitors, computes and displays the downhole performance of the fluid reservoir and all pumping equipment based upon measured flow-rate information; and controls the operating cycle of the prime mover to optimize the production efficiency of the well.

The backpressure valve 50 is of conventional design and construction, being comprised of a spring loaded ball or plunger (not shown) that automatically regulates the fluid exit area of a fixed discharge orifice contained within the valve's housing assembly. This valve is mounted in the liquid discharge line of the wellhead, downstream of the fluid sensor 48, and is manually adjusted at installation to keep all formation gasses in complete liquid solution within the tubing string 66 at all times. By so doing, the total incompressible volume of all produced liquids may be accurately computed using flow-rate information measured by sensor 48 without the need of signal adjustment for the effects of compressibility. To achieve this result, the wellhead discharge pressure must be maintained at or above the greatest bottom hole pressure that will act upon the downhole pump inlet at any time during the operating cycle. This pressure is equal to the summation of the measured casing gas pressure at the wellhead, plus the hydrostatic pressure of fluid buildup within the casing immediately following each successive rest period. This last component may be readily computed knowing the casing volume factor, fluid entry rate, rest time and average fluid density of produced formation liquids. All of these factors are either known by the operator with sufficient accuracy at time of few days of actual pump operation.

With reference to FIGS. 3–6, the fluid sensor housing 156 may be constructed of bronze, stainless steel, fiberglass, ceramic or any other high-strength and dimensionally stable material that is non-magnetic and corrosion resistant. The housing is configured similar to that of a conventional Y-pattern check valve, with the inlet chamber 101 and discharge flow chamber 103 being separated by a rigid barrier wall 105 that contains a fixed area orifice 107 through which all produced formation liquids must pass. Machined into the barrier wall is a smooth annular seating surface 109 that surrounds the discharge edge of the orifice to provide a tight seal with the mating surface of a (pivoting clapper disk 158. The disk and its attached clapper arm 160 should rotate as an integral unit about a pivot axis 111 that is located above and perpendicular to the longitudinal flow axis 113 of the housing, and which is parallel to the plane of the orifice seat 109. In order that gravitational forces might always act to keep the clapper disk in close proximity with the orifice discharge plane, the seating surface and barrier wall should both be inclined by approximately 45 degrees from the horizontal.

The clapper disk 158 and its integral pivot arm 160 are rigidly attached to a smooth, round pivot pin 138 that mounts within a bore-hole 115 that, is machined crosswise through the housing body 156. This precision bearing surface 115 is drilled and reamed concentric with the desired pivot axis 111 in order to accurately position the clapper assembly relative to its orifice seat in order to minimize the effect of viscous drag upon the rotational response of the clapper the axis of the pivot shaft 138 is located as close as possible to the plane of the orifice seat 109. One side of the bearing surface 115 extends through the external housing wall to provide easy access to the pivot shaft 138 during assembly and calibration operations; the hole is plugged by a cap 168 and gasket 166 when the operations are completed. The other side 117 of bore-hole 115 extends through the opposite wall of the housing into a third pressure chamber 146 that contains a small cylindrical U-shaped magnet 124 which is permanently attached to the end of the pivot shaft 138 at time of assembly. The chamber 146 is machined into a solid boss 148 that extends in a horizontal direction from the side of housing 156, and which is cast or forged as an integral part of this supporting member.

Located adjacent to this inner pressure chamber 146 is a fourth outer chamber 144 that serves to contain a small printed circuit board (PCB) 106 upon which are mounted various electronic components 120. Both of these chambers are preferably cylindrical in shape, and machined concentric with the pivot axis of the clapper assembly in order to provide for the proper fit and operation of all components that will be mounted therein.

Prior to forming bearing surface 115, the clapper member 158 is positioned and restrained within the housing after both the orifice seat 109 and clapper seat have been machined smooth and flat. By line drilling both mating parts together, a good metal-to-metal seal is readily achieved at the clapper/orifice interface. Following completion of this operation, chambers 144 and 146 can then be machined to their proper dimensions by using the resulting shaft bore-hole as a pilot for the required cutters. To facilitate the installation of a cylindrical baffle-plate 116 and O-Ring 134 that serves as a pressure barrier between both compartments 144 and 146, the inner magnet chamber 146 should be of smaller diameter than the outer PCB chamber 144. In this manner the baffle-plate assembly 116 can be readily mounted at the bottom of the PCB chamber 144 by a plurality of small cap screws 110 that engage the seating surface 125 which then surrounds the inner magnet chamber. This construction also minimizes the pressure forces that act upon the baffle-plate mounting screws 110, while still providing ample room for the PCB 106 and its electrical components 120. For obvious reasons, the desired orifice 107 diameter should be machined into the flow-chamber barrier wall at the same time that the orifice seating surface 109 is cut and finished.

In assembling the sensor assembly, the magnet 124 is bonded with epoxy or other acceptable adhesive material to one end of the clapper shaft 138. A thin low friction thrust washer 132 is positioned around the shaft 138 immediately adjacent to the rear edge of the magnet, and this entire assembly is inserted through the housing borehole 117 and 115 to engage the clapper arm 160 which holds this member in position. The baffle-plate 116 is installed at the bottom of the PCB chamber 144 using an O-Ring 134 and cap screws 110 to provide a secure barrier between both chambers. The lower baffle-plate protrusion 118 extends into the interior of the hollow cylindrical magnet 124 to engage the end of its pivot shaft to limit the axial play of this assembly.

Once the pivot-pin 138 and baffle-plate 116 assemblies have been installed, the completed PCB 106 with all electronic components is mounted on three small standoffs 114 with screws 104 that serve to position this assembly within the outer PCB chamber. Due to space limitations, all solid-state components with the exception of the linear Hall-effect sensor 112 and its adjacent temperature compensating zener diode 108 are mounted on the top surface of the PCB, away from the baffle-plate 116 and magnet 124. One such Hall-effect sensor is made by Texas Instruments under product No. TL-173. This construction provides for easy access to several trim pots during calibration operations.

By contrast, the Hall-effect sensor 112 and zener diode 108 are mounted on the lower surface of PCB 106 so they are contained within the hollow baffle-plate protrusion 118 that extends between the poles of the magnet 124. In this manner the Hall-effect sensor 112 can readily sense the angular position of the magnet 124, and both Zener diode 108 and Hall-effect sensor 112 are exposed to the same operating temperature at all times. A weatherproof electrical connector 150 is permanently installed within the lower wall 127 of the PCB chamber 144 to provide for proper input/output of the four electrical channels previously referenced. All pins of connector 150 are connected with the proper PCB terminals by means of short jumper wires 129 and solder connections.

Once the PCB assembly has been installed and interfaced with its electrical connector, final assembly and calibration of the sensor assembly can begin. The first adjustment that must be made concerns proper phasing of the magnet 124 and shaft 138 relative to the Hall-effect sensor 112 and orifice seat 109. By removing cap 168 and reaching through the open end of the pivot-pin bore-hole, shaft 138 and its attached magnet may be easily rotated by means of screwdriver slot 136 to properly orient both components so that the output voltage signal of the Hall-effect sensor will be at its average null position when the clapper is resting upon seat 109. Properly phased, the output voltage of the sensor increases with increasing pivotal lift of the clapper. For reasons later discussed, the angular position of shaft 138 is then adjusted by a negative rotation of approximately 12 degrees in order to obtain the desired phasing for a zero flow condition. Once this phasing has been accomplished, the clapper member is permanently attached to the pivot shaft by a set screw 162 and adhesive material introduced into the clearance between shaft and clapper boss. After such bonding, the housing access port 170 and shaft bore-hole 115 are then plugged with removable caps 164 and 168, respectively, using either thread compound, O-Rings or gaskets as desired.

Figure 4:
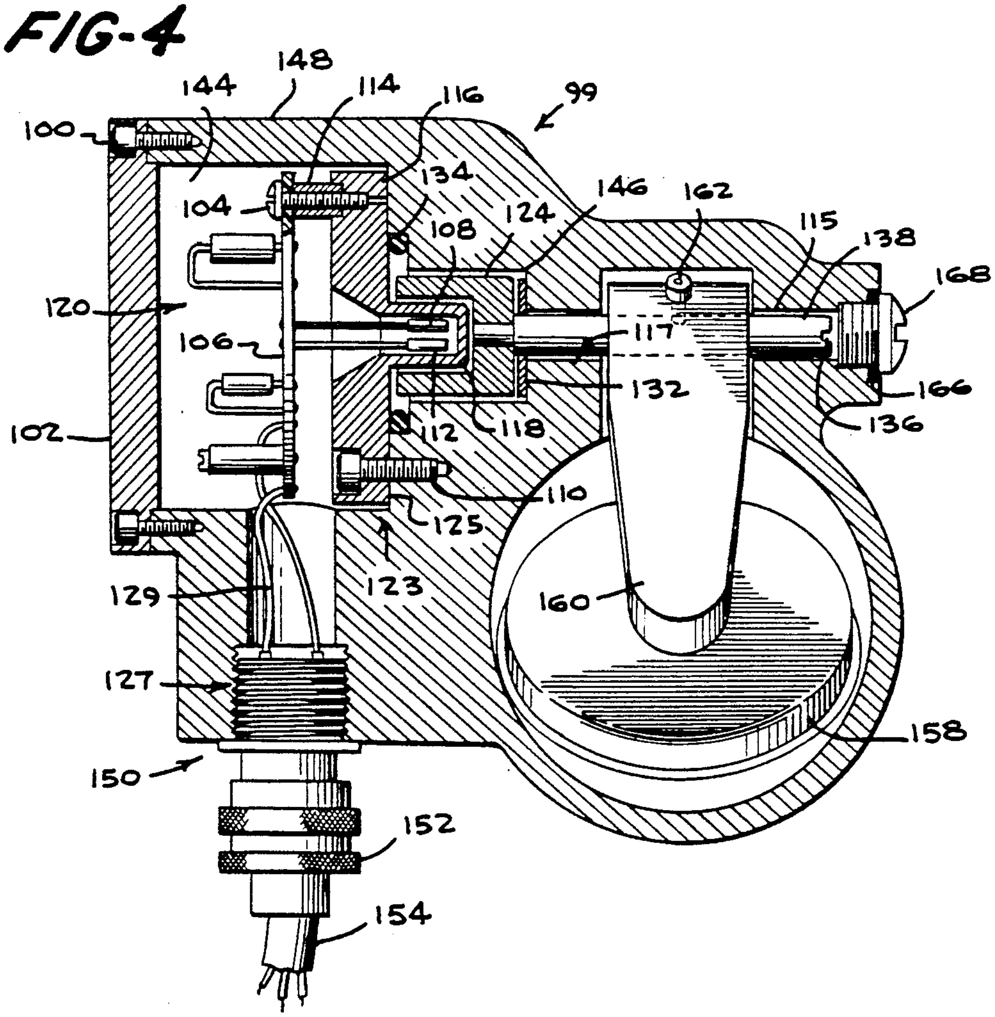
FIG. 4 is a cross-sectional view of the fluid sensor assembly taken along line 4—4 of FIG. 3.

Before continuing with a detailed discussion of final sensor calibration, it is first necessary that the general operating characteristics of the mechanical and electrical flow-rate sensing elements used in this invention be described in sufficient detail to provide a basic understanding of the response that is to be derived from these components. With reference to FIG. 4, the fluid sensor contains the linear Hall-effect sensor 112 that detects the angular orientation of the permanent magnet 124 which is rigidly attached to the pivoting clapper shaft 138.

Theoretical considerations, confirmed by actual laboratory tests, indicate that the instantaneous angular displacement "$O_c$" of the clapper assembly relative to its orifice seat is linearly related to the instantaneous volumetric flow-rate "Q" of any homogeneous fluid mixture that passes through the orifice to strike the clapper plate, provided that such mixture behaves within the sensor as an incompressible fluid from a fluid mechanics standpoint. Theory also indicates that this deflection is related to the orifice area "A", average fluid density "$D_F$", and clapper density "$D_c$" by a constant or proportionality "k" that relates all of the above parameters as follows:

$$O_c = (k^*Q/A)^* \sqrt{D_F/(D_c - D_F)} \tag{9}$$

As previously disclosed, the constant of proportionality "k" may be readily determined in the laboratory at time of sensor calibration by using a homogeneous incompressible liquid of known average mass-density to establish a meaningful standard of reference for the particular sensor in question. If the sensor is properly constructed, the measured value of "k" will be a primary function of sensor geometry only, and will not be greatly affected by the actual value of fluid pressure or viscosity selected for the calibration liquid. Once calibrated, the rotational response of the clapper plate and its attached pivot pin will thereafter be accurately described by the above equation (9) whenever the sensor is used to monitor the instantaneous volumetric flow-rate of any other incompressible homogeneous liquid of known average mass-density, the instantaneous angular response of the clapper assembly is linearly related at all times to the instantaneous volumetric flow-rate of any such liquid passing through the sensor, provided that the linear deflection range of the assembly is not exceeded.

Due to the effects of the rotating magnetic field, the output signal of the Hall-effect sensor 112 is sinusoidal in nature, being a primary function of the magnetic flux angle "$O_c$" of the pivot shaft. Because of trigonometric considerations, however, the output of this sensing device is essentially linear with angular rotation of the clapper assembly for any reasonable positive or negative displacement about the "0" degree null position. This linear relationship is maintained with considerable accuracy for relatively large angular displacements in either direction, such accuracy gradually decreasing from 100% at a displacement of "0" degrees to approximately 99% at a displacement of ±14°. By phasing the calibrated "no-flow" position of the clapper/magnet assembly to correspond with the negative 12 degree angular position of sensor 112, and then restricting the operation of this assembly to flow-rates that cause an angular rotation of no more than 24 degrees, the output voltage of the Hall-effect sensor 112 is then linearly related to the actual volumetric flow-rate of all incompressible fluids measured with a high degree of accuracy. Thus, for any specific orifice size "A", fluid density "$D_F$" and clapper density "$D_c$", the instantaneous output signal "$V_f$" of such temperature compensated circuitry is linearly related to the instantaneous volumetric flow-rate "Q" of any incompressible homogeneous liquid by a new constant of proportionality "K" that is essentially independent of fluid pressure and viscosity as follows:

$$V_f = (K^*Q/A)\sqrt{D_F/(D_c - D_F)} \qquad (10)$$

Figure 5:
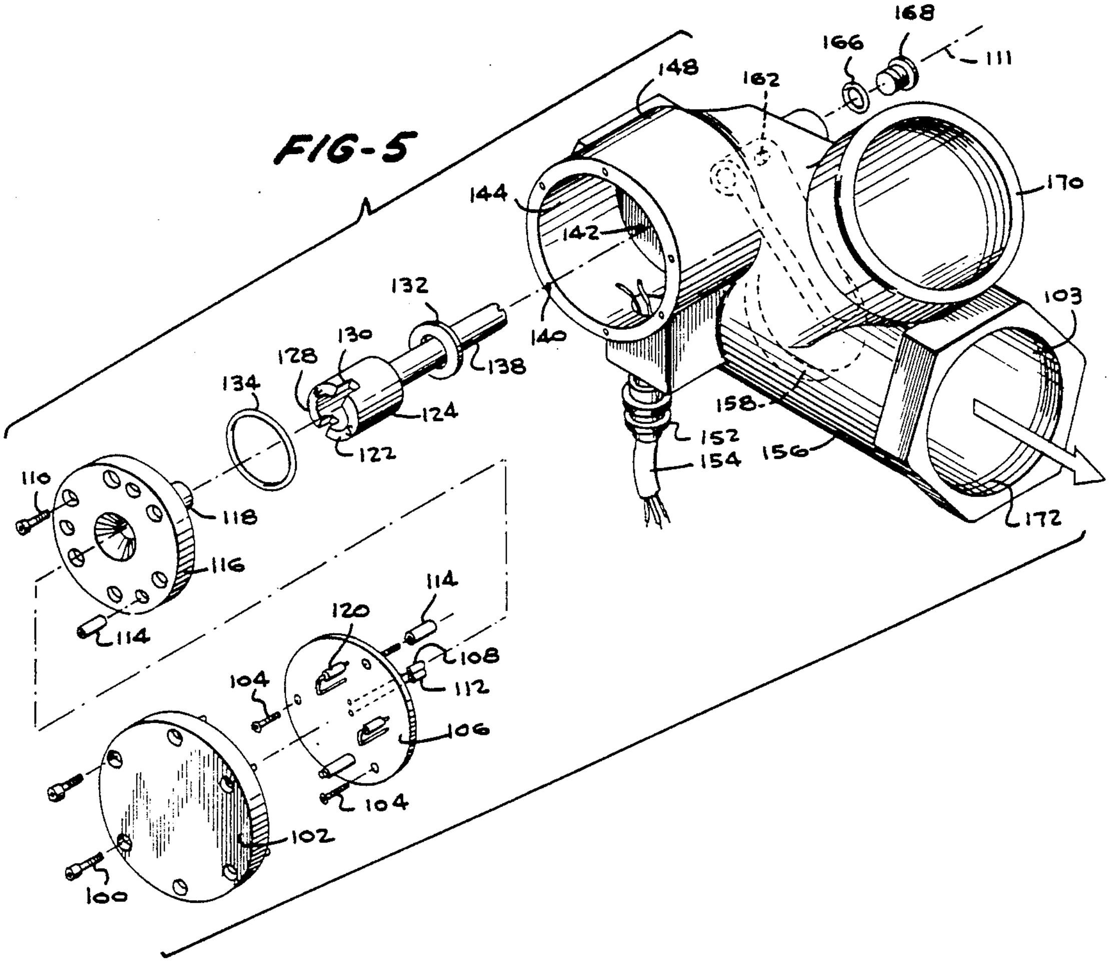
FIG. 5, is an exploded perspective view of the sensor assembly of FIG. 3.
Figure 6:
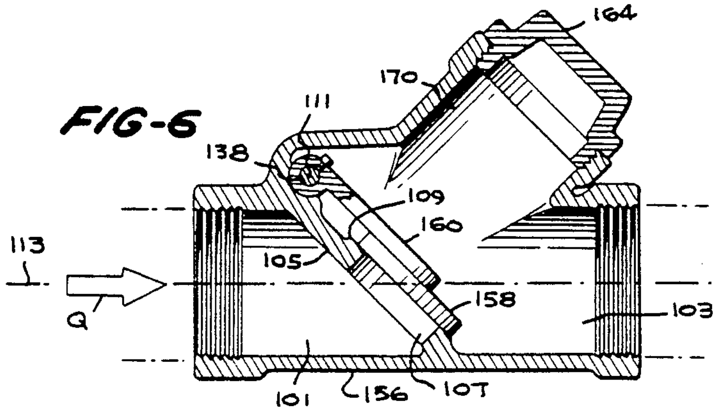
FIG. 6 is a cross-sectional view of the fluid sensor assembly taken along line 6—6 of FIG. 3.
Figure 9:
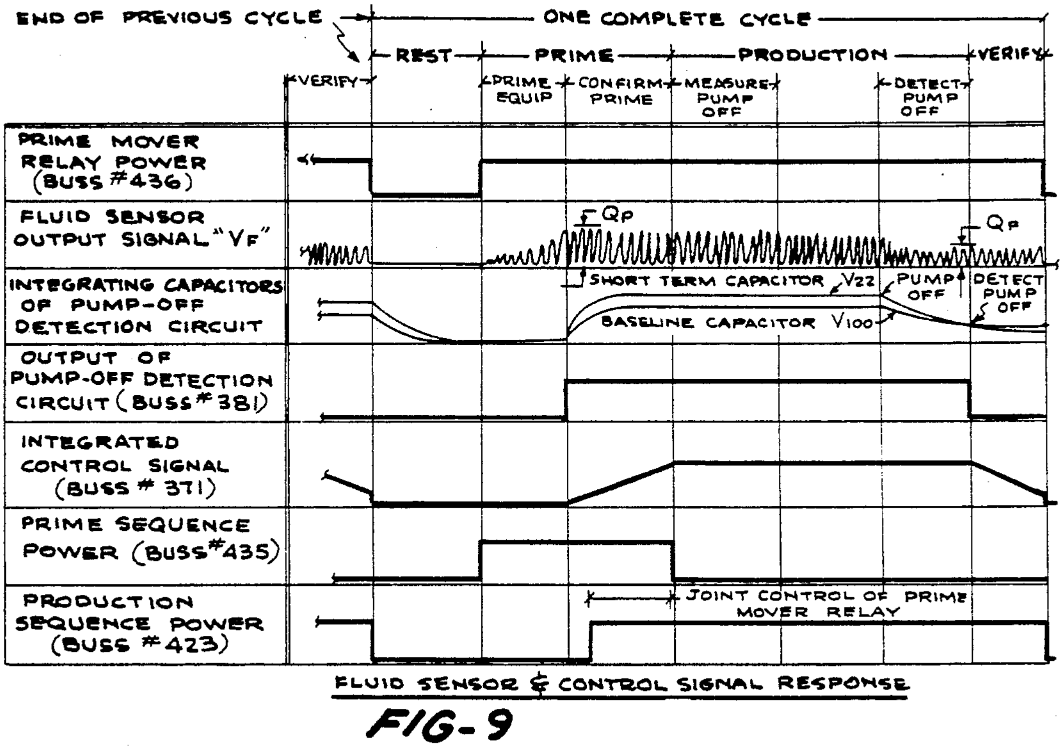
FIG. 9 is a graphic depiction of the various control signal responses of the preferred embodiment of the invention.

The electronic circuitry 120 contained on the Sensor PCB 106 of FIG. 5 is designed to provide an accurate linear output response over the entire range of calibrated flow-rates, from a "no-flow" condition of 0.0 gpm to some limiting value that can be readily determined on the flow-bench for each specific orifice size, based upon a known orifice area "A", clapper density "$D_c$", and calibrating fluid density "$D_F$".

Accurate temperature compensation of Hall-effect sensor 112 is achieved by means of an electronic circuit that matches the linear temperature drift of the zener diode 108 to the temperature characteristics of the Hall-effect sensor 112. Because no two devices are exactly alike, compensation is accomplished by an adjustable resistor network that trims the greater positive temperature coefficient of the selected diode with the lesser positive temperature coefficient of the actual Hall-effect sensing device 112 used in this assembly. Properly calibrated, the adjusted zener voltage has the same temperature response (+B*dT) as the Hall-effect sensing element. Both output signals are then applied to one stage of a voltage differencing amplifier 202, which continuously subtracts the trimmed reference voltage (Vr+B*dT) from the sensor output voltage (Vs+B*dT) to derive a new output voltage "Vo" that is non-temperature dependent as follows:

$$Vo = (Vs + B^*dT) - (Vr + B^*dT) = (Vs - Vr) \qquad (11)$$

In order that both input signals to amplifier 202 always change together with changing operating temperatures, the Hall-effect sensor 112 and zener diode 108 are mounted immediately adjacent to one another in the same hollow protrusion 118 previously described. Calibration of the temperature compensating circuit is achieved by adjusting a trim pot 204 on the zener voltage division network 206 so that the reference voltage applied to the input resistor 208 of the negative input of op-amp 202 has the same temperature characteristic as the sensor voltage applied to the input resistor 211 of the positive input. Since the operating characteristics of the op-amp 202 chip must also be stabilized for variable ambient temperatures, and for any variations in fluid temperature that act upon the housing and its contained electrical circuit, the op-amp is located within a small oven enclosure 212 that maintains a constant chip temperature of approximately 150° F. at all times.

With reference to FIG. 8A, the output signal "Vo" of the first voltage differencing amplifier 202 is next be applied to the input of a second op-amp 215 in order to amplify the temperature compensated signal and reference it to ground potential. Basic amplification of the input voltage is accomplished by means of the various fixed resistances 217 utilized on the input and feedback loops of this second op-amp, and final calibration of signal gain is achieved by means of a trim pot 216 on the output of op-amp 215. Proper ground reference is achieved by adjusting the voltage tap 218 on the negative input bias circuit of Op-amp 215 so that the second stage output voltage is exactly 0.0 vdc at a measured flow-rate of 0.0 gpm. Following this operation, a known flow-rate "Q" is then passed through the sensor housing so that the output signal of the second op-amp can be correctly adjusted by potentiometer 216 for the particular flow-rate orifice size and fluid density in question. Properly calibrated, the sensor output voltage "$V_f$" will be exactly 0.000 vdc at 0.0 gpm and 10.000 vdc at the maximum linear flow-rate specified for that orifice size. For any given flow-rate, this output signal remains constant with changing fluid temperatures and ambient conditions. In order for these objectives to be met, it is necessary that the Hall-effect sensor and zener diode be driven by a highly stabilized precision reference voltage "Vtc", which is supplied together with B+ voltage by the control unit 2 through cable 8. All input leads are protected against power surges and lightning strikes by transient voltage suppressor 222 as shown, and the entire PCB assembly is then fully encapsulated in epoxy following final calibration. After encapsulation, a cover plate 102 is installed over the PCB chamber 144 to provide additional protection and aesthetic appeal to the entire assembly.

Proper selection of the correct orifice size for each particular well installation is determined by the average pumping rate of all downhole equipment, since the maximum instantaneous rate that fluid flows through the sensor 99 should never exceed the maximum linear rate specified for the selected orifice size. In order to allow for the variable effects of fluid density and pump efficiency, and for the quasi-sinusoidal characteristics of pulsating flow, actual sensor capacity should always be selected at least 10% greater than the theoretical capacity of any installed centrifugal or rotary screw pump, and at least 85% greater than the theoretical displacement of any piston pump. Four different sensor sizes (A through D) have been selected for efficient coverage of practically all stripper well installations; these relative sizes, together with their rated capacity for the accurate measurement of both pulsating and steady-state flow, are as follows:

| Sensor Size | Pulsating Capacity | Steady-State Capacity |
|---|---|---|
| A | 75 BFPD | 125 BFPD |
| B | 150 BFPD | 250 BFPD |
| C | 300 BFPD | 500 BFPD |
| D | 600 BFPD | 1000 BFPD |

The regulated "B+" power supply 200 (FIG. 8A) contained within DPCU 2 basically comprises an AC step-down power transformer 224 with 115-230-460 vac primary input voltage taps that provide a nominal secondary output of approximately 22 vac with 90% regulation at a steady current delivery of 3.0 amps $D_c$. A full-bridge diode rectifier 226 converts AC power to DC. A regulating DC filter capacitor 228 of approximately 6800 micro-farad capacity is connected across rectifying circuit 226 to dampen-out the voltage transients imposed by the AC charger. A "first-pass" NPN power transistor 230 with controlling zener diode 232 provides a regulated output of approximately 19 vdc. A manual DPDT switch 234 is connected to the emitter of transistor 230. A "second-pass" NPN power transistor 214 is controlled by an voltage sensing op-amp 250 with feedback loop and voltage regulating zener diode 240 to provide for a highly regulated "B+" output voltage of approximately 15.0 vdc.

The emergency "$V_e$" power supply 210 of the DPCU 2 regulates the automatic shutdown of all critical system components whenever total interruption of normal operating power is warranted. This system, which connects to the 19 volt power buss of the previously described "B+" power supply, serves as both a latching relay and crowbar circuit to sequentially apply emergency "$V_e$" power to a malfunction indicator control circuit, and to remove normal B+ power from all other pumping and control system components, following positive activation of either the four-cycle Shutdown 554 or the Excess B+ current detector 553. By so doing, this protective system guards against wasteful power consumption and equipment damage that might otherwise occur due to the unforeseen failure of mechanical or electrical equipment, or due to operator negligence.

With reference to FIG. 8A, the emergency "$V_e$" Power supply 210 basically comprises a regulated NPN power transistor 242 with controlling zener diode 244 that provides emergency "$V_e$" power when activated by voltage sensing Op-amp 238. This Op-amp has a reference voltage of approximately 6 vdc applied to its negative input pin by resistive network 249, and the two previously referenced triggering signals applied to its positive input terminal. A time-delaying RC circuit 246 with blocking output diode 248 interrupts normal B+ power by driving the negative input of regulating op-amp 250 high.

The excess "B+" current detector shown in FIG. 8A includes a 1/10th ohmn dropping power resistor 437 that is placed in series within the 19 volt power buss of the B+ power supply to provide for an instantaneous voltage response that is proportionately related to the amount of DC current flowing through this buss. A voltage sensing op-amp 253 switches "high" when the DC current passing through resistor 437 exceeds a certain limiting value of approximately 3.5 amps. A voltage dividing trim potentiometer 439 is adjusted to apply a calibrating reference voltage to the positive input of the voltage comparator 253, and a time-delaying RC circuit 252 is used to dampen the output response of the control circuit by approximately one (1) second in order to provide for the normal passage of reasonable transients without false triggering. The output of the current detection is connected to the crowbar latch of the Emergency "$V_e$" power supply by way of the non-volatile CMOS memory chip 553 (FIG. 8B) that is used to drive the LED indicating light for this circuit. Once this circuit has been activated, normal operation of all system components can thereafter only be reinstated by a manual reset of this memory chip followed by a momentary interruption of DC control power by switch 234 (FIG. 8A).

The "Vtc" precision voltage reference 260 shown in FIG. 8A provides a precisely calibrated reference voltage for use by the temperature stabilizing oven thermostat, and by the flow-rate and low pump efficiency monitors herein described. The voltage reference 260 includes precision voltage reference chip 255 bearing the product designation No. LM3999 and made by National Semiconductor. Voltage reference 255 controls the output of an NPN power transistor 254 by means of a switching op-amp 256 with voltage dividing feed-back loop 258. This feed-back loop is used to amplify the nominal 7 VDC signal supplied by the voltage reference 255, and to impart greater current output capability to the resulting reference voltage. The required "Vtc" reference voltage is determined by selection of the voltage dividing resistors 258 used to construct the regulating feed-back loop of the op-amp. Accurate temperature stabilization of this circuit is achieved by means of compensating circuitry located within the voltage reference 255 itself, and by the physical mounting of all electrical components within a temperature stabilized oven enclosure 262.

The motor controller and performance monitors of FIGS. 8C and 8D are sequenced by a digital time clock that delivers a precisely regulated square wave output which oscillates at a constant frequency of 6.666667 Hz whenever DC power is applied. This pulse is generated by a 3.579545 MHz XTAL Quartz oscillator 266 that drives pulse shaping circuitry located within the oven enclosure 262 and by external circuitry 268 that digitally divides the resulting square wave pulses by a constant value of approximately 536,931 to deliver the 0.15 second pulse referenced above. The stabilized signal then passes through various digital dividers, rotary switches and electronic gates to establish the proper sequencing for all control and performance measuring circuits to be described.

The temperature stabilizing oven 262 accurately regulates the operating characteristics of certain system components. These components include the digital quartz oscillator 266 (FIG. 8D), precision voltage reference 260 (FIG. 8A) and the two voltage controlled oscillator (VCO) 535 and 403 (FIG. 8C) that are required for the accurate measurement of pump efficiency and total produced fluid volume, respectively. A network of internally mounted heating resistors 276 (FIG. 8A) receive electrical energy from an externally mounted NPN power transistor 278 to maintain a constant operating temperature within the oven 262.

As depicted in FIG. 8A, the governing oven controller 530 includes a voltage sensing amplifier 280 that drives the base of power transistor 278 through a current limiting resistor 282, and a voltage dividing resistance network 284 that contains a negative temperature coefficient thermistor 286 which serves as the temperature sensing element. The voltage which is applied to the plus input of the controlling op-amp 280 decreases with increasing oven temperature due to the decreasing resistance of the thermistor 286. Thus, by selecting the proper resistance network 284, the op-amp can be calibrated to interrupt power to all heating elements at an internal oven temperature of approximately 150° F. This temperature may typically be held to within plus or minus 2 for any ambient temperature within the anticipated range of −40° to +120° F. In order to maintain such calibrated accuracy during actual field operation, the resistance network 284 must be powered by the stabilized "Vtc" reference voltage 257.

The power-on delayed-pulse generator 290 shown in FIG. 8D assures the proper sequencing of all motor control and performance measuring circuits following initial application of DC power. The generator 290 is controlled by a dual programmable timer 292 with supporting resistors, capacitors and diodes that function together as one unit to deliver a "positive-going" output pulse after a reasonable delay of several seconds. This delay provides sufficient time for the B+ power supply 200 and all system components to power-up and achieve their normal operating state before initial sequencing is effected. Following this delay, an initializing pulse is automatically transmitted to the various electronic circuits that control the pump efficiency monitor 548, the duty cycle monitor 520, the fluid entry rate monitor 510, the prime period controller 350, the production sequence controller, and the four-cycle shutdown 500 in order that each might begin their operation in proper sequence. Pulse generator 290 is similar in design to a second pulse-delaying circuit 506 that is included to reset the digital counters every 1440 minutes for the periodic measurement and digital display of average duty cycle and fluid entry rate every 24 hours.

As previously noted, the output voltage signal "$V_f$" of the fluid sensor is linearly related to the instantaneous flowing velocity "Q/A" of all produced liquids that pass through its fixed-area orifice, and to the square-root of the density ratio "$D_F/(D_c-D_F)$" that controls the acting clapper response mechanism. Because of this dependency on both the orifice area "A" and the average fluid density "$D_F$", the incoming flow-rate signal "$V_f$" must be adjusted by the system for each of these controlling parameters in order to obtain an accurate measure of the true volumetric flow-rate that exits the wellhead at each instant of time. Similar adjustments may also be required for the effects of fluid pressure and viscosity, depending on the internal geometry of the sensor assembly and the degree of compressibility of the flowing homogeneous mixture. The required steps for processing this signal may be easily $$Q = V_f \cdot \sqrt{(D_c - D_F)/D_F} \cdot (A/k) \tag{12}$$

For simplicity of design and operation, both analog and digital compensating means are utilized within the DPCU 2 to correctly adjust the resulting flow-rate signal for the controlling orifice function (A/k). Such compensation is performed on a selective basis within each performance measuring circuit as required, and is initiated by means of a 3-pole four-position rotary switch 294 (FIG. 8C) that selects the correct processing channels for each of the previously referenced orifice sizes A through D. The specific means utilized within each particular circuit for such flow-area compensation will be discussed in greater detail hereinafter.

Compensation for average fluid density "$D_F$" is accomplished at the same time for all circuits by analog fluid density amplifier 300 that adjusts the gain of the incoming flow-rate signal "$V_f$" before this signal is buffered and distributed for further processing. With reference to FIG. 8A, this amplifier is comprised of a voltage differencing op-amp 302 with a variable resistance voltage tap 308 connected to its positive input and a fixed resistance voltage divided feed-back loop 306 connected to is negative input. The particular resistance values selected for construction of this amplification circuit are based on a curve fit of the required signal gain for fluids having an average specific gravity (ASG) of between 0.80 and 1.10 relative to fresh water. For simplicity of operation, the input control knob of the variable resistance potentiometer 308 used in this circuit is also calibrated in units of specific gravity. This input parameter must be computed by the operator using the proper oil cut (OC), oil specific gravity (OSG) and water specific gravity (WSG) for the well as follows:

$$ASG = (OC)^*(OSG) + (1 - OC)^*(WSG) \tag{13}$$

Fortunately, the average oil cut and specific gravities of produced formation fluids are typically known with sufficient accuracy to allow for the accurate determination of all affected performance parameters. Fluid densities, for instance, may be readily measured by the use of a calibrated hydrometer, and average oil cut may be easily computed by dividing the known oil production rate of the well by the total fluid production rate measured by the DPCU. The construction and operation of both the Fluid Pressure Amplifier 301 and Fluid Viscosity Amplifier 303 of FIGS. 7A and 8A are similar to the construction and operation of Fluid Density Amplifier 300 described above. All three of these circuits may be incorporated within the electronic circuitry 120 of the sensor PCB 106 if desired, and means may also be incorporated within such circuitry for automatically adjusting the required inputs to each amplifier based upon the continuous measurement of pressure, density and viscosity by conventional means.

Prior to further processing by the various performance measuring and control circuits, the amplified flow-rate signal must first be buffered to strengthen its ability to reference many additional circuits without loss of accuracy. Such buffering is accomplished by means of a voltage sensing op-amp 312 that drives the current limiting base resistor 314 of an NPN power transistor 316 whose output voltage is connected by way of a feed-back loop 310 to the negative input of the op-amp. In this manner the op-amp and transistor function together as a voltage following circuit that supplies a buffered output signal "Vb" from the B+ power supply of FIG. 8A.

The sensor size confirmation circuit 320 depicted in FIG. 8A provides an automatic visual warning whenever the fluid sensor 48 is operated at an instantaneous flow-rate that exceeds the maximum linear rate specified for the selected orifice size. A fixed resistance voltage dividing network 322 applies a constant reference voltage of approximately 10.0 vdc to the negative input of a voltage sensing op-amp 324 that drives an NPN power transistor 326 with current limiting base resistor 328. The transistor is used to power an LED warning light 327 with current limiting resistor 329. The buffered flow-rate signal "Vb" is continuously applied to the positive input of op-amp 324 so that the advisory LED is illuminated whenever this buffered voltage exceeds its linear limit of approximately 10 vdc.

The clapper motion detector 330 (FIG. 8B) limits the operation of both downhole and surface mounted pumping equipment should the fluid sensor 48 cease to function properly during any production period, as hereinafter described. A fixed-resistance voltage dividing network 332 applies an input control signal of approximately 99% of Vb to the positive input of a voltage sensing op-amp 334 that has a time-averaged reference voltage signal applied to its negative input from the buffered output "$V_{22}$" of a "short-term" pumping rate integrator 502. An RC circuit 331 with decaying time-constant of approximately 20 seconds is quickly charged by the output of op-amp 334. A second voltage comparing op-amp 333 has output of RC circuit 331 applied directly to its negative input pin. A fixed resistance voltage divider 335 applies a constant reference voltage of approximately 0.650 vdc to the positive input of op-amp 333. A blocking AND gate 337 passes the output signal of the second op-amp only during the Production Sequence. Two inverters 341, 343 deliver either a "high" or "low" output signal whenever their input signal is driven "low" or "high" by the AND gate 337.

The output of the first op-amp 334 switches "high" whenever the instantaneous pumping-rate signal "Vb" exceeds the "time-averaged" pumping-rate signal by 1% or more, as determined by integrator 502. Thus, if the clapper moves by more than 1% from its average deflected position, the RC circuit 331 will quickly charge to saturation voltage, and the output of the second op-amp 333 thereafter remains normally "low". Should the clapper cease to move from its average position for any reason, however, then the first op-amp 334 immediately switches "low" to prevent the capacitor from being recharged to saturation voltage. This action causes the output of the second op-amp 333 to switch "high" following a fixed decay period of approximately 60 seconds, as determined by the saturation voltage, cutoff reference voltage and RC time constant of the controlling circuit elements.

The resulting time-delay allows for the variable nature of pulsating flow, and compensates for any transient mechanical problems. Once the second op-amp 333 has been switched "high", this positive indication of a "stuck clapper" is allowed to pass through AND gate 337 during periods of normal pump operation to drive the "stuck clapper" control buss 338 "high". This buss then distributes the resulting control signal to the various other circuits in order to block the additional counting of flow-rate pulses normally delivered by the "Total Fluid Production" measuring circuit 430 (FIG. 8C), prevent automatic reset of the "4-cycle Shutdown" sequencer 500 (FIG. 8B), clock the "stuck clapper malfunction indicator" LED memory chip 551, and collapse the integrated "Verification Sequence" control signal 371 by way of transistor 433 so as to automatically terminate the established "Production Period" of pump operation.

Each operating cycle of the pump is divided into four sequential controlling modes of surface and downhole equipment operation that are referred to herein as 1) the Rest Period, 2) the Prime Period, 3) the Production Period and 4) the "Pump-Off" Verification Period. The Rest Period is required to provide formation fluids with sufficient time to build a new reserve of liquids within the casing prior to reactivation of the pumping equipment. This period, which follows the "Pump-Off" Verification Period of the last operating cycle, is controlled by a digital timing circuit 342 that is programmed by the operator using a single-pole, eight-position rotary switch 344 to select the desired rest interval, as shown in FIG. 8B. Rest times of 2, 4, 8, 16, 32, 64, and 128 minutes are available from a binary ripple counter 346 that receives a digital clock pulse at its input every 15 seconds from circuit 270. This pulse is obtained by passing the 0.15 second clock pulse on line 347 through two separate digital dividers 349 that each deliver one output pulse for every 10 input pulses received. The counter 346 is automatically reset to "0" and its output disabled by the Pump Relay Power Buss 436 during prime mover operation. Clocking of counter 346 can therefore only occur during the Rest Period when pump power is "off". The output pulse of the counter is then supplied to the "half-monostable" pulse generator 351 of the Prime Sequence control circuit 350, hereafter described, by way of the selected rotary switch pole 441. The resulting monostable pulse thereby initiates operation of both surface and downhole pumping equipment at the conclusion of each sequential rest period.

Under normal operating conditions the Prime Sequence requires approximately one minute to complete once a consistent stream of liquids exit the wellhead. An additional two minutes of steady pump operation thereafter are required to assure the proper evaluation of downhole equipment and fluid reservoir performance. For this reason, it is necessary that a sufficient reserve of liquid be allowed to accumulate within the casing during the Rest Sequence to provide for at least three minutes of uninterrupted pump operation at the time-averaged pumping rate "$Q_p$" of fluids being transported to the surface. The minimum rest time required to assure proper evaluation of all performance parameters on a continuing basis may therefore be computed for any given fluid entry rate "$Q_F$" by using conservation of mass considerations as follows:

$$\text{Minimum Rest Time} = 3^{*}(Q_p/Q_F - 1) \qquad (14)$$

The equation holds true for any value of the dimensionless ratio "$Q_p/Q_F$" greater than unity (i.e., $Q_p/Q_F > 1$). It is to be noted that this ratio "$Q_p/Q_F$" is the reciprocal of the ratio "$Q_F/Q_p$" previously referenced. When this reciprocal ratio is less than one, the well never "pumps-off" since new fluid enters the casing at a greater rate than the pumping capacity of installed downhole equipment. In such situations the fluid level within the casing stabilizes at some intermediate depth that restricts the entry of new liquids so that the time-averaged "$Q_F$" is equal to "$Q_p$".

If the programmed rest time is excessively long, however, then fluid production will be severely restricted by the unnecessary buildup of liquids within the casing. It is recommended, therefore, that rest times on the order of three to twelve times the minimum acceptable value computed by means of equation (14) be stored in the control unit 2 to provide for some margin of error. Such selection should result in pumping times of from 9 to 36 minutes per operating cycle, assuming that all gas is quickly purged from the downhole pump at the start of the Prime Period.

The Prime Period controller 350 (FIG. 8B) regulates the initial operation of surface and downhole pumping equipment during each pumping cycle until a consistent time-averaged stream of liquids exits the wellhead. This controller compensates for the transient effects of fluid fall-back and gas separation that may have occurred within the tubing string during the preceding Rest Period, and additionally compensates for the compressible effects of casing gas ingested by the downhole pump during the previous "Pump-Off" Verification Period. Such transients affect the accuracy of fluid measurements made at the wellhead by fluid sensor 48, and must therefore be stabilized before the next performance measuring and evaluation sequence of pump operation can begin.

With reference to FIG. 8B, a programmable timer 352 initiates pump operation at the start of each Prime Period, and limits the duration of pump operation to approximately 16 minutes if fluid can not be made to exit the wellhead in consistent amounts within this reasonable priming interval. A "half-monostable" pulse generator 351 triggers timer 352 at the start of each Prime Period. An NPN power transistor 356 with current limiting base resistor 358 and controlling signal invertor 362 supplies power to the prime power buss 435 in order to activate the prime mover relay control circuit. A voltage sensing op-amp 443 with verified control signal 371 applied to its positive input, and constant reference voltage of approximately 10 vdc applied to its negative input, initiates termination of the Prime Sequence upon conformation by the control signal integrator 370 that a consistent stream of liquids is exiting the wellhead. A time-based sequencing circuit 455 controls both the final termination of the Prime Period, and the start of the Production Period, so that the two-minute measure of downhole pump efficiency is properly regulated by node 349 of the digital clock circuit.

The amount of pumping time required to completely fill the tubing string with liquid, and thus establish a consistent time-averaged fluid exit rate at the wellhead, depends on many factors including the time to purge the downhole pump chamber 92 of any ingested casing gas, the pumping rate "$Q_p$" after such purge, the level of fluid within the tubing string 66 at the start of such pump operation, and the annular liquid storage area of the tubing string 66. Under normal production circumstances this transient pumping time interval is measured in terms of minutes or seconds, rather than hours. Following a prolonged shut-down of the well, however, the initial Prime Period could require many hours to complete; under these circumstances such priming is best accomplished by placing the controller 2 in its "manual" mode of operation by means of switch 234 so that the four-cycle shutdown circuit 500 will not automatically limit pump operation to four successive Prime Intervals of 16 minutes each. After completion of this initial Priming Period, the controller should then be placed in its "automatic" control mode to provide for the continued automatic regulation of the prime mover relay 445.

Upon direct application of DC control power at the start of system operation, the Prime Period controller 350 receives its first sequencing pulse from the power-on delayed-pulse generator circuit 290. Following completion of the initial operating cycle, controller 350 thereafter receives all further sequencing pulses from the Rest Period Time controller 342. Each sequencing pulse immediately triggers the timer 350 output "low" to drive the Prime Power Buss voltage "high" by way of invertor 362 and transistor 356, thereby initiating pump operation. Once activated, rest timer 342 continues to regulate operation of the prime mover relay 445 until timer 352 is reset and disabled by either its own 16 minute timing pulse, or by voltage comparator 443 as hereafter described. This op-amp is controlled by the verification control signal integrator 370, which receives its input signal from the "pump-off" detector 380. Once the integrated control signal 371 exceeds a negative-pin bias voltage of approximately 10 vdc, op-amp 443 immediately switches "high" to apply a steady Prime Sequence termination signal to one input of the AND gate 447 that interfaces with the timer 352.

The other input of AND gate 447 is connected to a "half-monostable" pulse generator 451 that, together with the AND gate 447, jointly comprise the time-based sequencing circuit 455. This circuit is periodically activated by a 1.5 second digital clock pulse on line 453. When sequencing circuit 455 receives its next "high" input pulse, the Prime Sequence termination signal generated by the voltage comparator 443 passes through AND gate 447 to reset and disable timer 352. This action causes the inverted output of the timer to go "low" thereby turning off transistor 356 that drives the Prime Period Power Buss 435. In this fashion the Prime Period is terminated in proper phase with the 0.15 second digital clock pulse to assure an accurate two-minute measure of downhole pump efficiency at the start of each Production Period.

The production period control circuit 360 depicted in FIG. 8B includes a voltage sensing op-amp 426 that regulates the continued operation of the prime mover power buss 436 following conclusion of each Prime Period. A fixed resistance voltage dividing network 357 applies a constant reference voltage of approximately 2 vdc to the negative input of op-amp 426. A digital timer 459 (FIG. 8D) limits duration of this basic production interval to 256 minutes of continuous pumping should fluid "pump-off" not be detected within this reasonable period of time. Since this circuit momentarily shares joint control of the motor relay power buss with the prime period controller 350, the output signal of each regulating circuit must be connected to the input pin of relay control op-amp 422 by means of a blocking diodes 355 as shown.

As with the Prime Period controller, normal operation of the Production Period controller is directly related to the performance of the Verification Control signal integrator 370. Following the initial prime of downhole equipment, the output voltage 371 of this integrator slowly increases from an initial value of 0 vdc towards a saturation level of approximately 12 vdc. When this signal 371 exceeds the 2 vdc reference voltage level that is applied to the negative input of the Production Period voltage comparator 426, the output of this op-amp switches "high" to jointly share control of the pump relay power buss with the Prime Period controller. Following a normal prime verification period of approximately 30 seconds, the integrated control signal 371 rises above the 10 vdc reference level applied to the negative input pin of Op-amp 443 to switch "off" this Prime Period voltage comparator. Once such switching has occurred, relay control circuit 390 is thereafter regulated solely by the production period voltage comparator in the manner described hereinafter.

Once initiated, the Production Period continues until it is terminated by either the 256 minute timer 459 or the voltage comparator 422. If the established pumping rate "$Q_P$" is greater than the maximum rate "$Q_F$" that new fluid can enter the casing from the formation, the well eventually "pumps-off" when all excess liquid has been removed from the casing. At this point in time the average fluid exit rate at the wellhead abruptly declines, and will thereafter be controlled by the average fluid entry rate "$Q_F$" rather than by the available pump capacity "$Q_p$". When "pump-off" detector circuit 380 (FIG. 8B) detects this abrupt change, it quickly terminates its "high" output signal to the verification integrator 370. Following such termination., the integrated control signal 371 begins to decline from, its 12 vdc saturation level to an "at rest" value of 0 vdc. If the previously measured pumping rate "$Q_P$" does not reestablish itself within an allowed Verification Period of approximately 30 seconds, the integrated control signal 371 continues its decline through the 2 vdc reference voltage level of comparator 426 to terminate the output of comparator 422. When the output of comparator 426 goes "low", the relay controller 390 is "switched off" to interrupt power to the prime mover relay 445 by the way of transistor 432 and the well then enters into its next sequential Rest Period.

Should normal pump-off detection not occur within 256 minutes from the start of the Prime Period, the Production Period is automatically terminated by a digital timing circuit 459 that artificially collapses the integrated control signal 371 by means of an NPN power transistor 433 that is connected to the negative input pin of the control signal integrator 382 as shown in FIG. 8B. This Digital Timer 459 is reset at the start of each Prime Period by the Pump Relay Power Buss 436, and pulses "high" after receiving a total of 1,024 input pulses from the 15 second digital clock 270. Such control is included to guard against the possible loss of the "baseline" pumping rate that is required for the "Pump-Off" detector 380 to perform properly.

Control of the "pump-off" Verification Period is regulated by a linear integrator 370 of FIG. 8B. A voltage differencing op-amp 382 with capacitive feed-back loop 384 has fixed resistance voltage taps 386 and 388 on both the positive and negative inputs, respectively. These two resistive networks control the different integrating time constants of capacitors 384 during periods of positive and negative integration as hereinafter described. The positive input of op-amp 382 is driven by the output signal on line 381 of the "pump-off" detector 380. Whenever fluid exits the wellhead at a time-averaged rate that remains essentially constant at some value other than "0", or that increases with time, this output signal switches from "low" to "high" to activate integrator 370. Following activation, integrator 370 immediately begins to increase its output voltage 371 from an "at rest" level of 0 vdc towards a saturation level of approximately 12 vdc. Once the integrated control signal 371 exceeds a base reference level of approximately 2 vdc, the production period voltage comparator 360 activates to assume joint control of the motor relay power buss 436 with the prime period control circuit. If the output control signal of the "Pump-Off" detector 380 remains "high" without interruption, then the integrator 370 requires approximately 30 seconds to increase its output voltage from 2 vdc to 10 vdc to "turn off" the Prime Period controller 350. Should this input signal be interrupted for any reason before such switching occurs, however, then verification integrator 370 reverses its direction of integration to reduce its voltage output so as not to terminate the established Prime Period. In this event, it is assumed that the downhole pump 98 and/or tubing string 66 of FIG. 1 is not properly primed, and that the output signal of the "Pump-Off" detector 380 is simply responding to the transient effects of gas or debris as they pass through the system.

Once the Prime Period has been properly terminated by a Verified control signal of approximately 10 vdc, operation of the prime mover relay 445 (FIG. 8D) is regulated only by the "high" or "low" state of the production period op-amp 426 (FIG. 8B) and the 256 minute timer 459 (FIG. 8D). Should the "pump-off" detector 380 (FIG. 8B) sense an abrupt decrease of more than approximately 4.4% in the average fluid exit rate at the wellhead at any time within the 256 minute operating period, then this primary motor controller immediately assumes that "pump-off" has occurred and switches its output signal from "high" to "low" accordingly. This response causes the verification integrator 370 to immediately begin to integrate its output voltage 371 "down" from approximately 12 vdc towards 0 vdc in order to terminate the Production Period at a reference voltage level of approximately 2 vdc. Once this switching occurs, the prime mover is turned off and the next Rest Period immediately begins. Should the average pumping rate return to its previously measured level before this series of events occurs, however, or should it stabilize at a new level that is at least 95.6% of the previous rate, then the Verification control signal quickly integrates back up to its previous saturation level of approximately 12 vdc to extend the length of the established Production Period.

The "pump-off" detector 380 includes an input signal buffer 383 that serves to impart a high reverse current sink impedance to the processed flow-rate signal, as viewed from the input nodes of the two analog integrators 402 and 502 discussed below. A primary analog signal integrator 502 delivers a buffered output voltage "V22" that is linearly related to the average "short-term" pumping rate of all downhole equipment. A secondary analog signal integrator 402 delivers a buffered output voltage "V100" that is linearly related to the long-term "baseline" pumping rate of all downhole equipment. A pumping-rate signal comparator 391 delivers a "high" output voltage signal whenever the average short-term pumping rate exceeds approximately 98% of the baseline pumping rate. A voltage comparator 393 with coupling diodes 397 and 401 improve the transient response time of the slower "baseline" pumping rate integrator 402 during the Prime and Verification Periods. This "pump-off" detector 380, which is responsible for primary control of the prime mover power relay 445 during all transient and steady-state pumping operations, connects directly to the verification control circuit integrator 370. Input signal buffer 389 of FIG. 8B is constructed using a voltage sensing op-amp 383 with direct feedback loop 385 between its output and negative input terminals. Connected to the positive input of op-amp 383 is the previously buffered "Vb" flow-rate signal on line 387. By constructing this input buffer as a voltage follower, its instantaneous output voltage "Vbo" will be equal to the input flow-rate signal at all times, and yet reverse-current will be blocked. This buffered voltage is applied directly to the input side of both the primary and secondary pumping-rate signal integrators 402 and 502.

The primary integrator (lower RC current path 502) is constructed using a 220K precision metal film resistor 392 and 100 micro-farad low-leakage electrolytic capacitor 394 to provide for an integrating time-constant of approximately 22 seconds. Due to the high impedance of this circuit, the integrated capacitor voltage is connected directly to the positive input of a voltage sensing op-amp 396 in order to provide a buffered output signal "V22" that is essentially identical to the time-averaged capacitor flow-rate signal. In order to compensate for the voltage drop of leakage current flowing through resistor 392 into capacitor 394, the feedback loop of the buffering op-amp 396 should be provided with an identical 220K current limiting resistor 398 to balance the circuit response.

The secondary "baseline" pumping-rate integrator (upper RC current path 402) is similarly constructed, except that it utilizes a 1.0 meg precision metal film resistor 404 in series with a 100 micro-farad low-leakage electrolytic capacitor 406 to provide for an integrating time-constant of approximately 100 seconds. This rather large time-constant is required to establish and maintain an accurate measure of the "baseline" pumping rate in a manner that is relatively insensitive to any abrupt change that might occur in the "short-term" pumping rate. The input to this second RC integrating circuit 402 is obtained from a voltage tap 408 that is constructed using a 220 ohm precision metal film resistor in series with a 10K precision metal film resistor so that approximately 97.85% of the buffered "Vbo" flow-rate signal from op-amp 383 will always be applied to the input side of the 1 Meg resistor 404. For reasons previously discussed, the feedback loop of the "baseline" signal buffer incorporates a resistor 412 of approximately 1.2 Meg to balance the voltage response of this circuit. The exact value of this resistor should be trimmed at time of manufacture to assure that the output voltage difference between both buffering op-amps is the same percentage of any steady input signal, to a high degree of accuracy, over the entire operating range of 0–10 vdc through which the output voltage of op-amp 383 will typically operate.

Following integration and buffering of the "short-term" and "baseline" pumping rate signals, the resulting output voltages "V22" and "V100" are then compared to one another by means of a voltage sensing op-amp 391 in order to obtain a unified control signal that is directly related to the pumping status of the specific well in question. Since the "baseline" voltage signal "V100" is connected to the negative input of op-amp 391, and the "short-term" signal "V22" to the positive input, the output voltage of this signal comparator is "high" whenever the "short-term" pumping rate exceeds 97.85% of the average "long-term" rate that fluid exits the wellhead. Should the "short-term" rate decrease abruptly below some limiting percentage of the "baseline" rate at any time after both capacitors 394 and 406 have been fully charged, then the output of comparator 391 immediately switches "low" to indicate that a change in the established pumping rate has been detected. Such change is always associated with the onset of fluid pounding or pump cavitation at time of liquid "pump-off". Due to the transient voltage response of both circuits 402 and 502, and the need for a reasonable verification period of approximately 30 seconds to confirm that "pump-off" has indeed occurred, such determination can be accurately made for any situation that might be encountered as long as the dimensionless ratio "$Q_F/Q_p$" is less than an upper limiting value of approximately 95.6%.

As previously noted, both integrating capacitors 406 and 394 of the signal-averaging circuits 402 and 502 are charged by the simultaneous application of the some buffered flow-rate signal "$V_{bo}$" to their respective inputs. When the output "$V_{bo}$" of op-amp 383 declines towards "0" from some instantaneous peak value, however, the high reverse current sink impedance of signal buffer 389 prevents the discharge of these two capacitors back into the source circuit. Thus, both capacitors are required to discharge their average voltage signals to the Ground Buss of the B+ Power Supply through the 10,220 ohm resistance network 408 of the "baseline" voltage tap. Since this resistance is much less than the 220K and 1.0M resistors 392 and 402 through which the capacitor current must also flow, the respective time-constants of discharge are essentially the same as the time-constants for charging both circuits. The 22 second time-constant specified for the "short-term" integrator is selected because reciprocating piston pumps may frequently be operated at speeds as low as 4 or 5 strokes per minute. Thus, the "short-term" integrating capacitor 394 always carries a voltage across it that is effectively related to the average pumping rate measured during more than one pumping stroke of any typical equipment installation.

In order for the "Pump-Off" detector 380 to function properly at high values of "$Q_F/Q_p$", the "baseline" capacitor 406 must be fully charged before all stored liquid is depleted from the casing. Unfortunately, charging this capacitor normally requires more than 8 minutes of continuous steady-state pumping to reach 99% of its desired operating voltage, since its controlling RC Time Constant must be selected reasonably high as previously noted for proper system performance under all anticipated operating conditions. Following "pump-off", a similar period of time is required to fully discharge the capacitor 406 before the next operating cycle of the pump can begin. Since it is not possible to guarantee such long integrating periods under all operating conditions, however, the transient voltage response of this "baseline" integrating circuit 402 must be artificially enhanced during the first few minutes of each start-up and shut-down sequence of the pump. Voltage coupler 393 limits the instantaneous voltage difference between "short-term" and "baseline" capacitors 394 and 406 during periods of significant positive and negative signal integration. To achieve the desired result, two separate current paths must be utilized within this special compensating circuit.

During periods of significant positive integration, the voltage spread between capacitors 394 and 406 is limited by a voltage sensing op-amp 395 that has its negative input connected directly to the output signal of the "baseline" voltage buffer 424 previously described. The positive input of this op-amp is connected to a fixed-resistance voltage divider 457 that receives its source signal from the output of the "short-term" integrator buffer 396. This voltage tap 457 is constructed using a 1K resistor in series with a 15K resistor so that 15/16ths of the "short-term" integrated signal is applied to the positive input of op-amp 395. Whenever the buffered "baseline" voltage "V100" is less than 93.75% of the buffered "short-term" voltage "V22", op-amp 395 switches "on" to quickly charge the "baseline" capacitor 406 through a blocking diode 397 and 10K current limiting resistor 399. In this manner the "baseline" capacitor 406 receives a rapid initial charge during each start-up sequence, before it is then allowed to stabilize by its normal response at 97.85% of the time-averaged pumping rate signal "$V_{bo}$". In similar fashion, the "baseline" capacitor voltage can never exceed the "short-term" capacitor voltage by more than 0.6 vdc during periods of significant negative integration since it is rapidly discharged into the more responsive "short-term" circuit by means of an interconnecting diode 401 and its associated current-limiting resistor 399. By constructing this circuit as shown in FIG. 8B, the transient response of the "baseline" integrator 402 will be greatly enhanced during the start-up and shut-down sequence, without sacrificing its novel ability to assist with the sensitive detection of "pump-off" at high values of "$Q_F/Q_p$".

Figure 10:
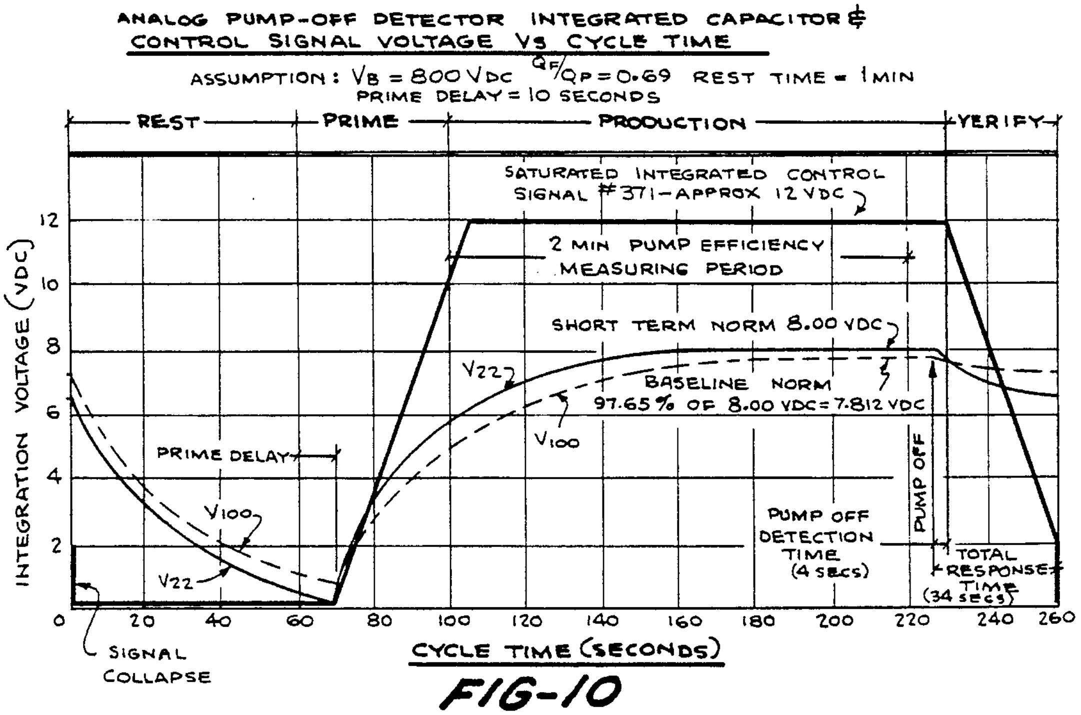
FIGS. 10 and 11 are graphs depicting the sequence of events of the pump-off detector control signals, in accordance with the invention.

The transient response characteristics of both the "short-term" and "baseline" integrators 402 and 502 and graphically presented in FIG. 10 for a typical operating situation that is based upon an arbitrarily selected total cycle time of 260 seconds. For purposes of illustration, this cycle is divided into a rest period of 60 seconds, prime period of 40 seconds, production period of 130 seconds and "pump-off" verification period of 30 seconds. Also presented on this graphic display is a curve for the integrated control signal 371 that is driven by the output of the "pump-off" detector 380. It should be noted that in this example a rest time of one minute is used for purpose of illustration, even through the shortest rest time available from the timing circuit 344 shown in FIG. 8D is two minutes.

It will be noted from FIG. 10 that the Rest Period begins at the end of the previous "pump-off" Verification Period, at a time "0" of the illustrated pumping cycle. Upon removal of power from the prime mover relay buss 436, the integrated control signal 371 artificially collapses to 0 vdc for reasons previously discussed. During the Rest Period, the buffered "short-term" capacitor voltage "V22" quickly decays due to its relatively short 22 second time-constant, and the buffered "baseline" capacitor voltage "V100" also decays quickly towards an "at rest" value of 0 vdc due to the beneficial effects of circuit coupling. At the end of the 60 second Rest Period, the timing circuit 344 initializes pump operation once again by means of the Prime Period controller 350.

In the example of FIG. 10 it is assumed that the pump operates for 10 seconds before fluid begins to exit the wellhead in consistent amounts. Once a consistent pumping rate has been established, the "short-term" capacitor 394 quickly integrates upward towards its illustrated steady-state value of Emax=8 vdc. Such integration requires approximately 110 seconds to reach 99% of this level, at a cycle time of approximately 180 seconds. When the buffered "short-term" capacitor voltage "V22" exceeds the decayed buffered "baseline" voltage "V100", the output of the "Pump-Off" detector 380 switches "high" to activate the control signal integrator 370. Due to the beneficial effects of circuit coupling, such switching occurs almost as soon as fluid first exits the wellhead, at a cycle time of approximately 70 seconds, and from that point on the integrated control signal 371 begins to increase linearly towards its illustrated saturation level of 12 vdc.

After a 30 second Prime Verification Period, the system enters into its normal Production Period of pump operation at an illustrated cycle time of 100 seconds. It should be noted that a sufficient reserve of liquid is now available to the pump to assure continuous pump operation during the two-minute performance measuring period that follows Prime Verification. During this period of time the buffered "baseline" capacitor voltage "V100" is quickly charged to approximately 96% of its ultimate level by voltage coupler 393. This circuit ceases to function after approximately 97 seconds of continuous operation, at an illustrated cycle time of approximately 167 seconds, when the normal rate of "baseline" voltage increase finally exceeds the coupled rate of increase. Two-hundred and twenty-six (226) seconds into this operating cycle, "pump-off" is achieved when the casing is finally depleted of all excess liquids. At this point in time the pumping rate abruptly drops according to the ratio "$Q_F/Q_p$", and the integrated voltages "V22" and "V100" of both "short-term" and "baseline" capacitors immediately start to decay exponentially towards their new steady-state values of:

$$V22=(Q_F/Q_P)*(Emax) \text{ and } V100=(V22)*(97.85\%).$$

Since the buffered "short-term" capacitor voltage "V22" is initially 5% greater than the buffered "baseline" capacitor voltage "V100" in this example, a short period of time is required for the more responsive "short-term" voltage to decay below the falling "baseline" voltage. This "pump-off detection time" has been computed by iterative methods to be approximately 4 seconds for the example illustrated in FIG. 10. Once the "short-term" voltage decays below the "baseline" voltage, the output of the "Pump-Off" detector 380 then switches "low" to begin the "Pump-Off" Verification Period. During this 30 second interval of time, the integrated control signal 371 steadily declines towards a termination level of 2 vdc, as determined by voltage comparator circuit 360, and each buffered capacitor voltage declines towards the new steady-state value previously given. If the initial pumping rate is not reestablished within the 30 second Verification Period, the prime mover shuts down to begin the next sequential operating cycle as illustrated at a cycle time of 260 seconds.

The relationship that exists between fluid exit time, "Pump-Off" time, fluid entry rate "$Q_F$" and pumping rate "$Q_p$" is clearly illustrated by the graphic presentation of FIG. 10. During the preceding "Pump-Off" Verification Period new liquids were removed from the casing at the same time-averaged rate "$Q_F$" that they entered from the formation. Because of this, there can be no excess reserve of liquids within the casing at the start of the illustrated operating cycle. During the first 226 seconds of this cycle, new liquids continue to enter from the formation at the same average rate "$Q_F$" as before, assuming that the Rest Sequence is not excessively long so as to allow an inordinate amount of liquid to build within the casing to restrict such entry. This fluid must then be removed by 156 seconds of continuous pump operation as shown, at an average rate "$Q_p$", in order to achieve "pump-off" once again. Since no fluid will exit the wellhead during the assumed 10 second initial Prime Period, continuity considerations indicate that $226^* Q_F=156^*Q_p$, which yields the illustrated value of $Q_F/Q_p=69\%$.

Figure 11:
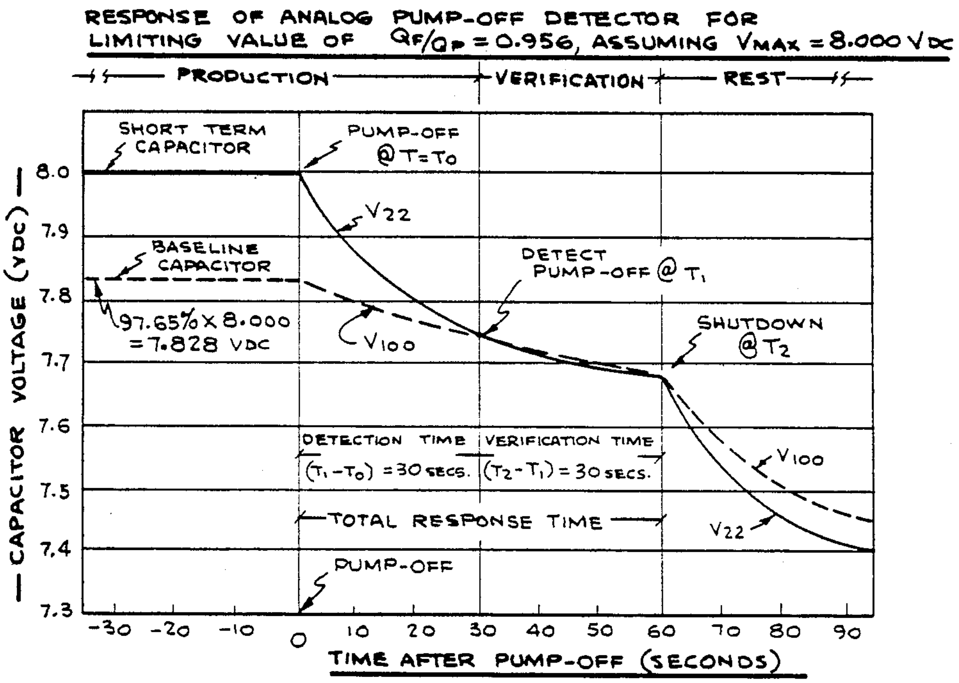
Figure 12:
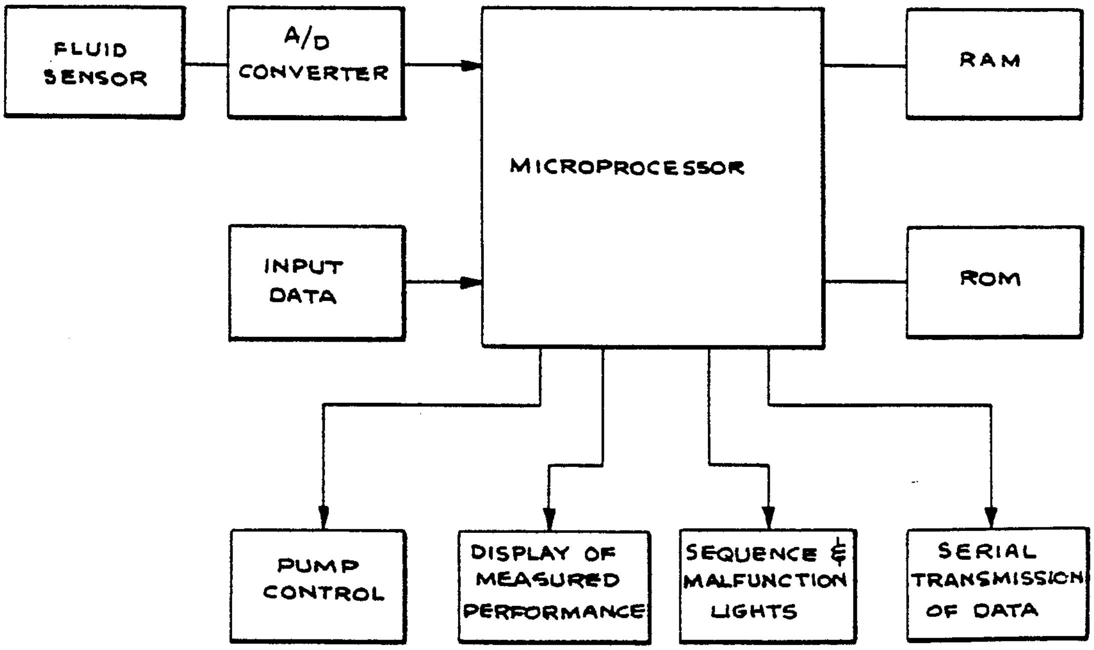
FIG. 12 is a block diagram of the electronic circuits of a microprocessor controlled embodiment of the subject invention.

With reference to FIG. 11, the total amount of time required for the motor controller to respond to fluid "pump-off" may be computed as the summation of an initial "Pump-Off" detection time interval $(T_1-T_0)$ and a final verification time interval $(T_2-T_1)$. Since the verification time interval always remains fixed by circuit design at approximately 30 seconds, the detection times for the two illustrated examples of FIGS. 10 and 11 must be 4 seconds and 30 seconds respectively. The basic relationship that controls circuit response immediately following fluid "pump-off" is:

$$\text{Response Time} = \text{Detection Time} + \text{Verification Time} \quad (15)$$

The required detection time for any operating situation is a function only of the dimensionless ratio "$Q_F/Q_p$", since this ratio controls the shape of the two capacitor decay curves "V22" and "V100" for the "short-term" and "baseline" pumping rate integrators 402 and 502. The actual detection time required for any specific value of "$Q_F/Q_p$" may be computed by noting that the "short-term" and "baseline" voltages are always equal to each other at the start of each Verification Period. Thus, control circuit switching is initiated whenever "V22"="V100". By using conventional iterative methods to solve the two exponential equations that describe the "short-term" and "baselines" capacitor voltage curves, the required detection time interval $(T_1-T_0)$ may be accurately computed for any selected value of "$Q_F/Q_p$".

It will be noted from FIG. 11 that whenever the buffered capacitor voltages "V22" and "V100" are allowed to decay for a sufficiently long period of time, the "short-term" voltage "V22" quickly stabilizes at a new level that is once again greater than the decreasing "baseline" voltage "V100". Thus, the exponential expression for V22=V100 actually has two solutions "$T_1$" and "$T_2$" for each value of "$Q_F/Q_p$" below an upper limiting value of unity (i.e. 1). For proper control system response to be initiated, the switching interval $(T_2-T_1)$ must be greater than the constant specified "Pump-Off" Verification Period of 30 seconds. The length of time that transpires between initial switching at time "$T_1$" and final switching at time "$T_2$" can be shown to decrease as the controlling value of "$Q_F/Q_p$" increases. Should this time interval be less than the required 30 second Verification Period, then the integrated control signal 371 will reverse its course of direction before the Verification Period can be terminated, thereby preventing the incorrect shutdown of the prime mover. The limiting value of "$Q_F/Q_p$" for proper control system response is therefore determined by switching times "$T_1$" and "$T_2$" that differ by the exact duration of the Verification Period. This value, as previously reported, has been computed to be 0.956 using the iterative methods and time-constants set forth above. Whenever the established pumping ratio is above this limiting value, the system can not respond adequately to fluid "pump-off". At this .upper limiting value of 0.956, system response time is computed to be approximately 60.3 seconds. Below this limiting value, system response increases rapidly with decreasing "$Q_F/Q_p$" to a lower limit of approximately 30.6 seconds. Such limitation is of no serious consequence, however, since the pump will be receiving essentially a full charge of liquid on each stroke when operated at a ratio of $Q_F/Q_p=0.956$ or greater.

The prime mover power relay controller 390 of the DPCU 2 includes a voltage sensing op-amp 422 that receives its positive input signal from either the prime power buss 435, Production Sequence op-amp 426, or from the second pole of DPDT manual override switch 234 as shown in FIGS. 8A and 8B. Op-amp 422 has a constant reference voltage of approximately 6 vdc applied to its negative input by a fixed-resistance voltage dividing network 428. Op-amp 422 drives an NPN power transistor 432 by means of a current-limiting base resistor 434 to supply DC power to the motor control relay power buss 436 whenever it is desired that the prime mover 14 be turned on to lift fluid to the surface.

The total production time monitor 400 (FIG. 8D) is designed to count 1 minute clock pulses whenever normal operating power is provided by the B+ Power Supply of the DPCU. A non-resettable binary counter 438 divides the 15 second digital clock pulse previously referenced by a constant ratio of 4 to deliver an accurate 1 minute output pulse to one input of AND gate 442. The other input of this AND gate is connected directly to the B+ Power Buss so that the input clock pulse passes through this device whenever B+ power is "high". AND gate 442 drives a circuit-grounding NPN transistor 444 by way of current-limiting base resistor 446 to trigger a manually resettable six digit display counter 448. This counter is of conventional design, being provided with an internally mounted battery that continuously drives its CMOS memory and LCD display even when power is removed from the system. Due to the construction of this circuit, each 1 minute clock pulse is registered by the counter whenever normal system operation is in effect, regardless of the position of the DC control switch. Should B+ power be interrupted for any reason by the emergency "$V_e$" power circuit 210 however, then the automatic counting of such pulses immediately ceases in order to provide the operator with meaningful information concerning the time of such power interruption.

The total pumping time monitor 410 (FIG. 8D) is designed to count 1 minute clock pulses whenever DC power is supplied to the prime mover relay controller 445. AND gate 452 has one input connected to the 1 minute clock pulse from divider 438, and the other input connected to the pump relay power buss 436. The output of AND gate 452 drives NPN transistor 454 by way of resistor 456 to trigger a manually resettable display counter 458 that is similar to counter 448. Each 1 minute clock pulse is registered by counter 458 only when DC power is supplied to the prime mover relay control buss 436.

The total operating cycle monitor 420 (FIG. 8C) includes a pulse-shaping AND gate 462 that has one input connected to the B+ power buss 201 and the other input connected to the prime power buss 435. The output of this device drives a circuit-grounding NPN Transistor 466 by means of current-limiting resistor 468 to trigger a manually resettable counter 472 that is similar to counter 448. Counter 472 is indexed by one digit whenever power is first applied to the prime power buss 435 at the start of each pumping cycle, regardless of the position of the DC control switch.

The total fluid production monitor 430 (FIG. 8C) computes and records the total cumulative volume of all liquids that exit wellhead 62 and pass through fluid sensor 48 during any selected production interval. This circuit includes a temperature stabilized voltage controlled oscillator (VCO) 403 that accurately converts the previously buffered "Vb" analog flow-rate signal 387 into a pulse-shaped digital output signal, the frequency of which is linearly related at all times to the exact instantaneous magnitude of the density corrected flow-rate signal "Vb". The output frequency of this VCO is calibrated at time of manufacture to 2,489 HZ for an input voltage signal of exactly 10 VDC, and 0 HZ for an input voltage signal of exactly 0 VDC. Accuracy of this calibration is maintained under all operating conditions by enclosing VCO 403 within the temperature stabilized oven enclosure 262.

AND gate 474 allows the output frequency signal of VCO 403 to pass only when proper operation of the fluid sensor 48 is confirmed by clapper motion detector 330 (FIG. 8B). Binary ripple counter 476 (FIG. 8C), interconnected with one pole of rotary switch 294, serves to reduce the VCO output frequency by a constant division of either 4096, 2048, 1024, or 512 in order to properly compensate for the installed orifice size A through D of fluid sensor 48. A second division circuit 478 controlled by DPDT switch 488 divides the fluid volume frequency signal by a constant factor of 42 whenever units of barrels rather than gallons are desired.

Circuit grounding NPN transistor 482 with current-limiting resistor 484 triggers resettable counter 486 to totalize all resulting fluid-volume pulses. This counter, which is similar to counter 448, is indexed by one digit whenever 1/10th of a gallon or 1/10th of a barrel of liquid passes through fluid sensor 48, depending on the position of switch 488. This DPDT switch also serves to automatically reset counter 486 whenever the operator elects to change the recorded units of volume from barrels to gallons, or visa versa, or whenever the operator elects to begin a new production interval of record.

The fluid entry rate monitor 440 of FIG. 8D computes and displays the average daily rate, in barrels of fluid per day (BFPD), that produced formation liquids are exiting the wellhead. Since matter will neither be created nor destroyed by the pumping process, this exit rate will be essentially the same as the rate of new fluid entry into casing 64 from reservoir 84. In order to compensate for minor fluctuations in the instantaneous fluid entry rate that normally occur during each operating cycle of the pump, this computation is made using flow-rate measurements that are averaged over a 24 hour production interval of 1,440 minutes. The accuracy of this computation will be quite high in situations where the stored reserve of liquids within the casing does not change appreciably during this 24 hour measuring period, or in situations where any net change in downhole fluid inventory is a small percentage of the total volume of liquids that are produced during such period of time. The greatest potential error associated with this method of fluid entry rate computation is a function only of the "Rest Time" selected for programming by the operator, as follows:

$$\text{Max Potential Error} = \pm(100\%)*(\text{Rest Time}/1{,}440) \quad (16)$$

With reference to FIG. 8D, it will be noted that the fluid entry rate monitor 440 includes a divider 492 that reduces the fluid volume pulse frequency obtained from line 428 by a factor of 10 in order to deliver a single input clocking pulse to counter 494 for each barrel of liquid that exits the wellhead. Resettable BCD counter 494 (Motorola #MC14553) totalizes all such fluid volume pulses thus received during each 24 hour counting period, and upon receipt of a latching pulse from NOR gate 504, stores the resulting BCD count in its internal memory for further processing by the BCD-to-seven segment decoder/driver 508. This decoder/driver (Motorola #MC14511) powers a three digit common-cathode LED display 510 to present the results of the previous 24 hour pulse count to the operator while the current fluid entry rate is being registered by counter 494. This new count will subsequently be displayed during the next 24 hour production interval, and will be updated every 24 hours thereafter in similar fashion.

It will be noted from FIG. 8D that counter 494 is reset to "0" at the start of each 24 hour counting period by the output of delayed-pulse generator 506, which is similar in construction to previously described delayed-pulse generator 290. This second pulse generator 506 receives its triggering input pulse from NOR gate 504, which also latches counter 494. Pulse generator 506 serves to delay the reset of counter 494 by a few milliseconds whenever NOR gate 504 issues its sequencing output pulse, in order that counter 494 might first latch its existing pulse count in memory before resetting to start a new fluid entry rate measurement.

As previously noted, NOR gate 504 receives its first triggering pulse from delayed pulse generator 290 shortly after DC power is applied to the control circuit of the DPCU 2. This same initializing pulse resets dividers 498, which thereafter pulses "high" every 24 hours to trigger half-monostable pulse generator 499. The resulting output sequencing signal of pulse generator 499 is then applied to NOR gate 504 in order to latch and reset the BCD counter 494 every 24 hours as previously described.

The Duty Cycle Monitor 450 (FIG. 8D) computes and displays the average percentage of total production time that the downhole pump 98 must be operated in order to transport all produced formation liquids to the surface. This circuit is similar in construction and operation to fluid entry rate monitor 440, and shares all of the same sequencing components for latch and reset of counters 514 as previously described for counter 494. Divider 518 reduces the 0.15 second input clock frequency from line 347 by a constant factor of 576 in order to provide exactly 1,000 output pulses to AND gate 516 for every 1,440 minutes of continuing operation. AND gate 516 passes these pulses to the input clock pin of resettable BCD counter 514 (Motorola #MC14553) only during periods of prime mover operation, when buss 436 is switched "high". Counter 574 totalizes and stores the resulting pulse count, which is updated every 24 hours by the sequencing circuit previously described. While a new pulse count is being recorded, BCD-to-seven segment decoder/driver 522 (Motorola #MC14511) drives a three-digit common cathode LED display 520 to provide the operator with an accurate presentation of the average duty cycle (%) measured during the previous 24 hour operating period.

The Pump Efficiency Monitor 460 (FIG. 8C) computes and displays the total volumetric efficiency of all downhole pumping equipment (i.e. rods 68, tubing 66 and pump 98 of FIG. 1) based on the theoretical displacement of such equipment as observed at the wellhead. This displacement, expressed in units of BFPD, must be programmed into the data processing and control unit (DPCU) 2 of the invention by the operator at time of field installation using control knob 534 of mechanical display 467. The theoretical displacement in barrels of fluid per day (BFPD) of any reciprocating piston pump may be easily computed from the known piston diameter (inches), stroke (inches) and frequency of cyclic operation (cps) as follows:

$$\text{Displacement}=(0.117)(D^2)(\text{stroke})(\text{frequency}) \quad (17)$$

Similar commutations may be made for centrifugal and rotary screw pumps, based on their theoretical displacement at 100% volumetric efficiency. It is important to note that the recognized effects of rod elasticity may be included in the above calculation if desired, although such allowance is not necessary for the accurate measure of pump efficiency relative to the programmed pump displacement. For excellent accuracy to be achieved with any type of mechanical pump, it is only necessary that the "Rest Time" selected for programming into the DPCU 2 be sufficiently long to provide for at least three minutes of uninterrupted pump operation once fluid begins to exit the wellhead in consistent amounts following each sequential rest period.

With reference to FIG. 8C, performance monitor 460 includes a fixed-resistance analog voltage division network 556 with associated center-pole of the four-position rotary switch 294 that serves to divide the buffered "Vb" flow-rate signal 387 by a constant factor that is proportional to the programmed sensor size (A, B, C or D) currently in use. A variable-resistance analog voltage division network 526, with associated signal buffer 528, serves to calibrate the operating characteristics of this circuit at time of manufacture. A second variable-resistance analog voltage division network 532 with calibrated mechanical input dial 467, potentiometer 413, fixed resistor 465 and amplifier 463, serves to divide the buffered input flow-rate signal by a variable denominator that is proportional to the pump displacement programmed in the field by means of knob 534. A temperature-stabilized voltage controlled oscillator (VCO) 535 converts the resulting analog voltage signal into a pulse-shaped digital output signal, the frequency of which is linearly related at all times to the instantaneous value of the density corrected flow-rate signal "Vb" divided by the programmed pump displacement. The output frequency of this VCO circuit is calibrated at time of manufacture to 2,133 HZ for an input voltage signal of exactly 10 vdc, and 0 HZ for an input voltage signal of exactly 0 vdc. Accuracy of this calibration is maintained under all operating conditions by enclosing VCO 535 within the temperature-stabilized oven enclosure 262.

Divider 536 delivers one output pulse to AND gate 538 for every 256 digital input pulses that it receives from VCO 535. AND gate 538 passes all such clocking pulses to resettable BCD counter 542 only when activated by pump relay power buss 436 of motor control circuit 390. Counter 542 (Motorola #MC14553) totalizes all such normalized flow-rate pulses received during the first 120 seconds of pump operation immediately following proper termination of each verified prime period, and upon receipt of a latching pulse from half-monostable pulse generator 461, stores the resulting BCD count in its internal memory for further processing by the BCD-to-seven segment decoder/driver 546. This decoder/driver (Motorola #MC14511) powers a three-digit common-cathode LED display 548 to present the resulting pump efficiency measurement to the operator. This measurement, which is expressed as a percent (%) of the programmed pump displacement, is upgraded during each operating cycle.

It will be noted from FIG. 8C that pump efficiency counter 542 is disabled by prime power buss 435 during each sequential priming period of cyclic pump operation. Following each verified prime period, power buss 435 switches "low" to enable the register of counter 542 and to trigger half-monostable pulse generator 495. The resulting "high" output pulse of this sequencing circuit simultaneously resets the output of divider 555, NOR latch 409, counter 542, and divider 536 "low". Upon receipt of the next 800 input pulses from the 0.15 second digital clock buss 347, following two minutes of steady pump operation, the output of divider 555 pulses "high" to trigger half-monostable pulse generator 411. The resulting "high" output sequencing pulse of this circuit triggers NOR latch 409 at the end of the two minute pump efficiency measuring period thus defined. Once the output of latch 409 triggers "high", it will thereafter remain "high" until reset "low" by pulse generator 495 at the start of the next two-minute measuring period for the following pump cycle. The resulting output pulse of NOR latch 409 triggers half-monostable pulse generator 461, which then issues a single "high" output pulse to latch counter 542 at the end of each two-minute measuring period as previously described. This entire sequencing circuit is initialized by power-on delayed pulse generator 290, upon application of initial DC power to the control circuit of the DPCU 2.

Operation of pump monitor 460 is best understood by considering the total number of pulses that are recorded by counter 542 during each two-minute measuring period, whenever fluid passes through sensor 48 at a steady rate that is exactly equal to the rated steady-flow capacity of the controlling sensor orifice. To simplify this illustration, assume that the theoretical capacity of the downhole pump is identically equal to the rated capacity of the sensor, and that all downhole equipment is operating at 100% volumetric efficiency. Under these conditions, the buffered output voltage of the sensor is exactly 10.0 vdc, following proper correction for fluid density. This analog voltage signal 387 is applied directly to the second pole of rotary switch 294 as shown in FIG. 8C, and is thereafter divided by the appropriate resistance network 556 and 526 that adjusts the applied flow-rate signal "Vb" for the selected orifice size, as follows:

$$V_{524} = V_B * \left( \frac{\text{steady-state sensor capacity}}{1000\ BFPD} \right) \quad (18)$$

Once flow-rate signal "Vb" has been adjusted for the rated sensor capacity and trimmed by factory calibration potentiometer 526, it is then buffered by voltage follower 528 so that further processing of this signal will not affect the accuracy of analog division networks 556 and 526. The resulting buffered signal "V528" is then applied to the input of variable-resistance divider 532 that serves to normalize the signal for the programmed pump displacement. Analog divider 532 is comprised of a precision 100k ten-turn linear potentiometer 413 that has one end of its resistance element left open-circuit as shown in FIG. 8C, and that has its wiper element connected to the DC ground buss of the control circuit by means of a 2.0k resistor 465. Input knob 534 and its mechanically linked counter 467 are phased with potentiometer 413 at time of factory calibration so that a numerical reading of 20 BFPD on counter 467 corresponds to a wiper resistance of 0 ohms, and a reading of 1,000 BFPD corresponds to a wiper resistance of 98k ohms. By constructing this circuit as described, the resulting output voltage signal "V465" of the wiper is always equal to the input signal "V528" multiplied by a displacement amplification ratio of (20 BFPD/displacement). Thus, the output voltage "V465" of potentiometer 413 will at all times be defined as follows:

$$V_{465} = (0.02 * V_B) \text{ (sensor capacity/displacement)} \quad (19)$$

Under the assumed operating conditions of this particular illustration, the output voltage "V465" of potentiometer 413 will be a constant 0.20 vdc. This signal is then amplified by a constant gain of 50, by means of op-amp 463, before being applied to the input of VCO 535. It may be seen, therefore, that VCO 535 will always be driven by an input signal of 10.0 vdc whenever the downhole pump is operating at 100% volumetric efficiency relative to the programmed pump displacement. This fact, which holds true regardless of the selected sensor size and actual pumping rate "$Q_p$", may be readily confirmed by similar mathematical analysis of other steady-state examples. The resulting signal (V465=10.0 vdc at 100% pump efficiency) causes VCO 535 to deliver a steady output frequency of 2,133 hz, which is then divided by a constant factor of 256 by means of divider 536 in order to apply a steady frequency (in this steady-state example) of 8.333 hz to the input of counter 542. Such frequency causes counter 542 to register a total of (8.333×120)=1,000 digital pulses during the two-minute data acquisition period that begins at the start of each normal production period of cyclic pump operation. Since each pulse corresponds to 1/10th of a percentage point, LED display 548 will correctly indicate a pump efficiency of 100.0% under these assumed operating conditions.

The response of monitor 460 may be further illustrated by assuming that the steady-state pumping rate "$Q_p$" of all downhole equipment is reduced to 50% of the programmed pump displacement, which for this second example should once again remain equal to the rated capacity of the installed sensor. Since the average fluid discharge rate has been cut in half, the output of sensor 48 is now 5.0 vdc rather than 10.0 vdc as previously assumed. This means that the output voltage signals of resistance networks 556 and 526, buffer 528, potentiometer 413 and amplifier 463 will also be reduced by 50%. Likewise, the output frequency of VCO 535 will be reduced by 50% in this example, since its output signal always varies linearly with the applied input voltage. The output of VCO 535 will therefore be (50%)(2,133 hz)=1,067 hz in this particular situation. This frequency, when divided by a factor of 256, results in only 500 digital pulses being recorded by BCD counter 542 during each 120 second pump efficiency measuring period. At the conclusion of each such computation, this pulse count is correctly displayed to the operator as a pump efficiency of 50.0% which is identical to the assumed volumetric efficiency of downhole equipment in this second illustration. In general, monitor 460 always records a digital count that is equal to the average measured pumping rate "$Q_p$" divided by the programmed pump displacement entered into counter 467 by the operator by means of knob 534. This result holds true even when the flow is of a pulsating nature, since BCD counter 542 integrates the resulting instantaneous digital frequency over its 120 second counting period to arrive at a true average value of the normalized "Vb" flow-rate signal upon which the measure of downhole pump efficiency is based.

The Low Pump Efficiency Monitor 470 (FIG. 8C) is designed to automatically terminate the established production period of normal pump operation whenever the measured pumping rate "$Q_p$" of all downhole equipment is determined to be less than an arbitrarily assigned value of 25% of the programmed pump displacement. With reference to FIG. 8D, it will be noted that monitor 470 includes a conventional digital-to-analog (D/A) converter 361 that receives its input clocking pulse from the divide-by-1024 digital output node of total fluid production frequency divider 476, by way of AND gate 419. D/A converter 361 is configured as a linear stair-step generator, being comprised of a resettable binary counter 479 and associated "R-2R" resistive ladder network 481. Ladder network 481 includes a calibrating potentiometer 483, with output wiper voltage "V483" being applied directly to the positive input terminal of amplifier 429. This amplifier, which imparts a constant gain of approximately 140% to the input voltage signal "V483", is comprised of voltage sensing op-amp 485 with resistive feed-back network 487 connecting its output and negative input terminals to ground. D/A converter 361 is calibrated at time of manufacture by means of potentiometer 483 so that the output voltage "V429" of op-amp 485 becomes exactly 10.000 vdc whenever counter 479 is indexed by 486 clocking pulses following reset of its input register.

The reset of D/A counter 479 is automatically accomplished during periods of cyclic pump operation by means of voltage invertor 415 that receives its input control signal from the pump relay power buss 436. Such reset will be periodically achieved following termination of each "pump-off" verification period, and upon initial application of DC control power to the various electronic circuits of the DPCU by means of switch 234 (FIG. 8A). Following such reset, AND gate 419 is sequentially enabled/disabled by NOR latch 409 and voltage invertor 417 so that clocking pulses from frequency divider 476 are registered by counter 479 only during the two-minute pump efficiency measuring period that immediately follows proper termination of each verified prime period. The resulting output voltage "V429" of op-amp 485 is applied directly to the positive input of voltage comparator 473 as shown in FIG. 8C. This voltage is proportional to the established pumping rate "$Q_p$" of all downhole equipment, divided by the rated steady-state flow capacity of the installed fluid sensor 48.

Connected to the negative input terminal of voltage comparator 473 is a temperature-stabilized precision reference voltage "V471" that is at all times proportional to the programmed volumetric displacement of downhole pump 98, divided by the rated steady-state flow capacity of the installed fluid sensor 48 (FIG. 1). Reference voltage "V471" is obtained by means of an analog voltage division network that is programmed by the operator in the field using sensor size selector switch 294 and knob 534 of pump displacement counter 467. This analog division network is comprised of a fixed-resistance network 524 and grounding potentiometer 471 (FIG. 8D) that are connected to the left-hand pole of four-position rotary switch 294 as shown in FIG. 8C. Rotary switch 294 and its associated voltage dropping resisters are used to divide the applied 12.0 vdc precision reference voltage "vtc" by factors of 1, 2, 4, and 8 for sensor sizes A through D respectively. Thus, the input voltage to potentiometer 471 will be either 12.0 vdc, 6.0 vdc, 3.0 vdc or 1.5 vdc depending on the position of rotary switch 294 for the selected sensor size. Since the wiper arm of potentiometer 471 (FIG. 8D) is mechanically linked to the input programming knob 534 of counter 467 (FIG. 8C), the output wiper voltage "V471" of this analog division circuit will always be proportional to the programmed pump displacement divided by the rated steady-state flow capacity of the installed fluid sensor. This fact may be readily confirmed by mathematical analysis of several different examples for each selected sensor size.

Due to proper selection of the D/A converter input clocking frequency division ratio and output voltage signal amplification ratio at time of manufacture, by means of divider 476 (FIG. 8C) and amplifier 429 (FIG. 8D), respectively, as previously described, both input voltages "V429" and "V471" of voltage comparator 473 will be exactly equal to each other at the conclusion of each two-minute pump efficiency measuring period whenever the established pumping rate "$Q_p$" is exactly 25% of the programmed pump displacement. Any pump efficiency greater than 25% will result in "V429" being greater than "V471", and any efficiency less than 25% will result in "V429" being less than "V471", at the conclusion of the two-minute pulse counting period. Thus, the output of voltage comparator 473 will be switched and maintained "low" throughout the rest and prime periods of each pump operating cycle by the combined action of sequencing inverters 415 and 417, and will only switch "high" during the two-minute pump efficiency measuring period of that operating cycle, if the volumetric efficiency of all downhole pumping equipment is determined to be greater than the value of 25% arbitrarily selected for the control circuit of the preferred embodiment. Once the output of comparator 473 switches "high", however, it will thereafter remain "high" until reset at the start of the next operating cycle at the conclusion of the "pump-off" verification period.

With reference to FIGS. 8B and 8D, it will be noted that the output signal of voltage comparator 473 is applied to the reset terminal of four-cycle shutdown counter 569 by way of AND gate 571. This signal serves to reset the four-cycle shutdown 500 hereinafter described whenever pump efficiency is determined to be greater than 25%, provided that proper fluid sensor operation is confirmed by clapper motion detector 330 (FIG. 8B) that enables AND gate 571 by way of invertor 343. The output of comparator 473 (FIG. 8C) is also used to terminate the established operating cycle at the end of each two-minute pump efficiency measuring period whenever pump efficiency is determined to be less than the minimum acceptable value of 25%. This is accomplished by means of invertor 427 and AND gate 425 that apply a "high" sequencing signal to the control buss of transistor 433 (FIG. 8B) by way of diode 431 in order to collapse the integrated control signal 371 that activates op-amp 426. Such actions can only take place after termination of the two-minute pump efficiency measuring period, since AND gate 425 is disabled until that time by the actions of AND gate 421, in response to the output of NOR latch 409 and pump mode discriminator 513.

Operation of the above described circuit is best understood by considering the following example for a typical well installation. Assume that the displacement of the downhole pump is 150 BFPD, and that such equipment is operating at 25.2% volumetric efficiency. Further, assume that sensor size "B" is properly installed in the fluid discharge line of the wellhead, together with a properly adjusted fluid back pressure valve 50, and that rotary switch 294, and pump displacement counter 467 are properly set for the maximum rated capacity of such equipment. In this situation, voltage comparator 473 (FIG. 8D) of the low pump efficiency monitor 470 is supplied with a constant reference voltage of 0.900 vdc, computed as follows:

$$\text{Reference voltage} = (12.0)(\tfrac{1}{2})(150/1{,}000) = 0.900 \text{ vdc} \quad (20)$$

At the start of each rest period, the output voltage of D/A converter 361 will be reset to "0" by the actions of invertor 415, in response to the "low" voltage state of pump relay power buss 436. Such action causes the output of voltage comparator 473 to switch "low", and its inverted output to switch "high". This inverted output signal is blocked by AND gate 425, however, which remains disabled throughout the rest, prime and pump efficiency measuring periods by the controlling actions of AND gate 421. During the rest and prime periods, the output of comparator 473 remains "low" since the input clock register of counter 479 is disabled by AND gate 419. At the start of the production period, the output of NOR latch 409 switches "low" to disable AND gate 421 and enable AND gate 419. During the next 120 seconds, the clock register of counter 479 will be pulsed 44 times in this example by the combined actions of VCO 403 and divider 476 in response to the average output voltage of fluid sensor 48 as follows:

$$\text{Pulses} = \frac{(25.2\% * 150\ BFPD)(2489\text{ hz})(120\text{ seconds})}{(250\ BFPD)(1024)} = 44.1 \quad (21)$$

The register of 44 pulses by D/A converter 361 during the two-minute pump efficiency measuring period causes the output voltage of amplifier 429 to rise from its initial value of 0 vdc to a final value of (44/486)(10.0 vdc)=0.905 vdc. Since this amplified output voltage is greater than the 0.900 vdc reference voltage signal that is applied to the negative input terminal of comparator 473, the output of comparator 473 will switch "high" before the end of the two-minute pump efficiency measuring period. This action causes the reset of four-cycle shutdown 500 (FIG. 8B) and, additionally, causes the output of invertor 427 to switch "low" to prevent the early termination of the production period when AND gate 425 (FIG. 8D) is enabled at the end of this measuring period. Any pump efficiency in excess of 25% will cause the same system response, since the total number of pulses recorded by the D/A converter 361 during its two-minute counting period will increase as the average pumping rate "$Q_p$" increases. Should pump efficiency fall below the limiting design value of 25%, however, then the output of comparator 473 will remain "low" for the entire operating cycle. Such action will initiate early termination of the production sequence by way of AND gate 425, and will prevent the reset of four-cycle shutdown 500 (FIG. 8B), for reasons previously described.

The control sequence light circuit of the DPCU is provided to apprise the operator of the current status of pump operation. A rest period LED display 501 with current-limiting input resistor 503 and driving NPN transistor 505 is actuated by a signal invertor 507 that receives its input signal from the output of op-amp 422 as shown in FIG. 8B. A prime period LED display 509 with current-limiting input resister 511 and blocking diode 523 receives its input signal from prime control buss 435. A production period LED display 517 with current-limiting input resister 519 and blocking diode 521 receives its input signal from the output buss 423 of a pump mode discriminator 513. This discriminator is comprised of a signal invertor 527, AND gate 529, and NPN transistor 531 with current-limiting base input resister 533. Pump mode discriminator 513 receives its two input control signal from prime control buss 435 and op-amp 422. This discriminator delivers a "high" output signal to buss 423 only during the normal production period of pump operation. All signal to buss 423 only during the normal production period of pump operation. All three LED lights referenced above may be checked for proper operation by activation of momentary lamp test switch 525 that delivers DC power to these lights by way of three blocking diodes shown but not numbered on FIG. 8B.

The malfunction indicator light circuit of the control unit 2 has been designed to provide the operator with a positive visual indication of the most recent motor control sequencing action taken by each of the four error-detection circuits herein referenced. As shown in FIG. 8B, individual circuits 541 through 544 are provided to indicate the current output status of the clapper motion detector 330, the low pump efficiency monitor 470 (FIG. 8D), the excess B+ current detector 252 (FIG. 8A) and the four-cycle shutdown 500 (FIG. 8B), respectively. Each of these individual circuits is controlled by its assigned flip-flop memory device 551-554 that delivers a "high" output signal whenever its input clock register is pulsed by the output signal of the corresponding error-detection circuit. Due to the internal operating characteristics of each flip-flop and the non-volatile nature of its CMOS memory, a "high" output signal from any circuit will be permanently maintained until such time as the controlling flip-flop is reset "low". This feature enables the operator to determine which malfunction has caused the shut-down of system operation, upon reapplication of B+ control power.

With reference to FIG. 8B, the malfunction indicator light circuit referenced above includes two Dual-D flip-flops with memory that are connected to a common DC power buss 515 that receives continuous DC power from either the normal "B+" power supply 200 or the emergency "$V_e$" power supply 210 depending on which supply is currently activated. Regulated power is supplied to the common buss 515 by way of two blocking diodes 563 and 565 that prevent the direct interaction of one power supply with the other. Each memory chip contains two electrically isolated dual D-Type flip-flops that have their signal controlling "D" input pins connected to the common power buss 515 and their individual "set" pins connected to the ground buss of the DPCU 2. The "Q" output of each flip-flop is connected to an NPN power transistor with current-limiting base resistor that also receives DC supply power from power buss 515 in order to drive an LED indicating lamp by way of its current-limiting input resistor.

Inasmuch as the detection of improper clapper motion and/or low pump efficiency will only be used by the motor controller to terminate the established Production Period early, and since such measure will not be directly used within the control unit 2 to cause the immediate and permanent cessation of all further pumping operations except by way of the four-cycle shutdown 500, the corresponding flip-flop circuits 551 and 552 for these two control parameters are always reset during each successive Prime Period by the "positive going" output signal of the production sequence controller 426. By contrast, the two flip-flop circuits 553 and 554 that are respectively activated by a "high" output signal from the excess B+ current detector 252 (FIG. 8A) and the four-cycle shutdown 500 (FIG. 8B), must be manually reset by the operator as shown using the manual reset switch 561 prior to continued pump operation. Since the output from each of these circuits 553 and 554 is applied directly to the input switching buss of the emergency "$V_e$" power supply by way of two blocking diodes 563 and 565, this design assures that the cause of unscheduled equipment shutdown will be brought to the operator's attention before further operation of the pump is attempted.

The four-cycle shutdown 500 (FIG. 8B) of the DPCU 2 is provided to terminate the automatic operation of all downhole and surface mounted pumping equipment whenever the measured performance of either the fluid sensor or downhole pump is determined to be unacceptable during each of four consecutive operating cycles. A pulse-shaping AND gate 567 has both of its inputs connected to the prime control buss 435, and its output connected to the input clock register of decade counter 569. The reset of this counter is connected to a signal blocking AND gate 571 that has one input connected to the inverted output of the clapper motion detector 330, and the other input connected to the non-inverted output of the low pump efficiency evaluator 470 (FIG. 8D). The reset terminal of counter 569 (FIG. 8B) is also connected by way of a signal blocking diode 573 to the output node of the power-on delayed pulse generator 290 (FIG. 8D). The fifth sequential output node of decade counter 569 (FIG. 8B) is connected to the input clock register of the four-cycle flip-flop 554.

Upon initial application of B+ power, the power-on pulse generator 290 (FIG. 8D) resets all outputs of counter 569 (FIG. 8B) to their initial output state of 0 vdc in order to initialize the four-cycle shutdown 500 herein described. Thereafter, decade counter 569 is indexed forward by one count at the start of each successive Prime Period by the pulse-shaping AND gate 567 that is connected to its input clock register as shown in FIG. 8B. Whenever clapper motion and pump efficiency are both deemed to be within their acceptable limits following their respective data acquisition periods, counter 569 is reset by AND gate 571 so that all counter outputs once again return to their initial "low" state before the start of the next operating cycle. Should either clapper motion or pump efficiency be judged unacceptable by their respective evaluation circuits, however, then such reset will not occur; in this situation the next sequential output of counter 569 will be indexed "high" at the start of the next Prime Period.

If the measured performance problem does not correct itself within four consecutive operating cycles, then the fifth output of counter 569 eventually pulses "high" at the start of the fifth sequential Prime Period. This response actuates the input switching buss of the emergency "$V_e$" power supply in order to terminate all further operation of the pump. This response also actuates the input clock register of four-cycle flip-flop 554 in order to activate the input switching buss of the emergency "$V_e$" power supply to advise the operator of such action. Upon such actuation, the voltage level of the emergency "$V_e$" power supply buss is latched "permanently high" by the non-volatile memory of flip-flop 554. Such latching also occurs whenever the "Q" output of the excess B+ current detection flip-flop is switched "high". Once such actuation has occurred, both flip-flops must then be manually reset by the operator using switch 561 before operation of the prime mover can be resumed.

Although the functions set forth above are described as being implemented using hard wired circuitry and discrete electronic components, which is preferred in the electrically noisy environment within which the system is designed to operate, it is to be understood that functions could alternatively be carried out by computer implementation. Thus, it is contemplated that a standard microprocessor such as a type Z-80 could be programmed by firmware in a read-only memory (ROM) and be connected to a random access memory (RAM) 456 for temporary storage of data, in a conventional manner. An output of the microprocessor could control the well pump and the various displays and alarm strobes described above. Control inputs, such as toggle switches, keyboards, etc., to tailor the operation of the device would be applied to the microprocessor which could also regulate the serial transmission of stored data by conventional microwave or telephone systems as depicted in FIG. 13.

Although the present invention has been shown and described in terms of a specific preferred embodiment, it will be appreciated by those skilled in the art that changes or modifications are possible which do not depart from the inventive concepts described and taught herein. Such changes and modifications are deemed to fall within the purview of these inventive concepts.

What is claimed is:

1. In a system for preventing damage resultant from pump-off of a well pump for pumping an essentially incompressible fluid mixture made up of a substantially homogeneous mingling of solids, liquids and gases, said liquids constituting the major portion of said mixture, the relative proportions of said solids, liquids and gases being subject to change over time, from a well casing replenished by the fluid mixture from a surrounding earth formation, a flow-rate sensor for measuring in real time the volumetric flow-rate of the fluid mixture, said sensor comprising:

housing means having an internal fluid passageway, and inlet and outlet ports, said passageway for directing said fluid mixture between said inlet and outlet ports;

a backpressure valve means in fluid communication with said passageway for maintaining a wellhead discharge pressure at or above the highest bottom hole pressure that will act upon the downhole inlet of the well pump at any time during a regular pump operating cycle as said mixture passes through said passageway;

a barrier wall defined within said passageway, said wall including a fixed area orifice through which all of said mixture passes from said inlet port to said outlet port;

a smooth seating surface surrounding the outlet side of said orifice;

a flow-sensing element mounted for movement within said passageway and operative between first and second positions, said element oriented to assure that the movement of said element from said first position is proportional to the velocity of said mixture as said mixture passes through said passageway from said inlet port to said outlet port, said element including a substantially planar surface that completely covers said fixed area orifice when said element is in said first position, said planar surface having a sealing surface that mates with said seating surface for providing a tight seal when said element is in said first position; and transducer means for producing an electrical signal that is continuously proportional to the real time movement of said sensing element.

2. The flow-rate sensor of claim 1, further comprising signal-compensating means for adjusting the magnitude of said electrical signal to take into account variations in at least one of the pressure, temperature, density and viscosity of said fluid mixture.

3. The flow-rate sensor of claim 1, wherein said flow-sensing element is in said first position when the velocity of mixture is at zero.

4. The flow-rate sensor of claim 1, further comprising means for calibrating said electrical signal to a known standard of reference.

5. The flow-rate sensor of claim 4, wherein said standard of reference is the known average mass-density and viscosity of said fluid mixture.

6. The flow-rate sensor of claim 1, wherein said angle of deflection is linearly related to said velocity of said mixture.

7. The flow-rate sensor of claim 1, wherein said transducer means comprises:

magnetic field generating means connected to said flow-sensing element for pivotal movement therewith; and magnetic field sensing means positioned adjacent said magnetic field generating means for producing said electric signal that is continuously proportional to the angular deflection of said sensing element.

8. The flow-rate sensor of claim 7, wherein said magnetic field sensor means comprises a Hall-effect sensor.

9. The flow-rate sensor of claim 7, wherein said housing further comprises a chamber for isolating said magnetic field sensing means from said fluid mixture.

10. The flow-rate sensor of claim 9, wherein said magnetic field sensing means is in close proximity to said magnetic field generating means and a portion of said chamber is made up of a non-magnetic barrier disposed between said sensing means and said means for accomplishing the isolation of said sensing means from said fluid mixture.

11. The flow-rate sensor of claim 1, further comprising compensating means for adjusting said electrical signal to produce a calibrated output signal that is linearly related to the volumetric flow-rate of the fluid mixture as it passes through said passageway.

12. The flow-rate sensor of claim 11, further comprising means for rendering said compensating means insensitive to ambient temperature outside of said housing and to the temperature of the fluid mixture.

13. The flow-rate sensor of claim 1, wherein said backpressure valve means is located downstream of said passageway.

14. The flow-rate sensor comprising:

a check valve having a housing containing an internal chamber, with inlet and outlet openings for directing fluid through said chamber, and a flapper pivotally mounted within said chamber and exposed to fluid flowing therethrough, an angle of deflection of the flapper being a function of the instantaneous rate of fluid through said chamber;

an enclosure extending from said valve housing and containing a cylindrical magnet and Hall-effect sensor;

a pivot pin passing through said housing and said enclosure and connected to said flapper and said magnet;

one end of said magnet having an axial bore formed therein, the Hall-effect sensor positioned within said bore, the magnetic poles of said magnet formed on opposite sides of said end of said magnet; and said Hall-effect sensor being located within a jacket formed of a non-magnetic material, the jacket in turn positioned within said enclosure, a fluid impervious seal being retained between said jacket and said enclosure.

15. The flow-rate sensor of claim 14, further comprising temperature sensing means positioned within said jacket in close proximity to said Hall-effect sensor so that said temperature sensing means and said Hall-effect sensor are exposed to the same temperature at all times.

16. The flow-rate sensor of claim 14, wherein said temperature sensing means comprises a zener diode.

17. The flow-rate sensor of claim 14, further comprising compensating means for adjusting said electrical signal to produce a calibrated output signal that is linearly related to the volumetric flow-rate of the fluid mixture as it passes through said passageway.

18. The flow-rate sensor of claim 17, further comprising means for rendering said compensating means insensitive to ambient temperature outside of said housing and to the temperature of the fluid mixture.

* * * * *